(12) United States Patent
Kovacs et al.

(10) Patent No.: US 12,486,313 B2
(45) Date of Patent: *Dec. 2, 2025

(54) GENE ARMORING

(71) Applicant: GammaDelta Therapeutics Ltd, London (GB)

(72) Inventors: Istvan Kovacs, London (GB); Andre Goncalo do Espirito Santo Simoes, London (GB); Sam Illingworth, London (GB); Jyothi Kumaran, London (GB); Oliver Nussbaumer, London (GB); Rajeev Karattil, London (GB)

(73) Assignee: GammaDelta Therapeutics Ltd, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,874

(22) Filed: Oct. 4, 2024

(65) Prior Publication Data
US 2025/0101081 A1 Mar. 27, 2025

Related U.S. Application Data

(63) Continuation of application No. PCT/IB2023/053435, filed on Apr. 4, 2023.

(60) Provisional application No. 63/482,755, filed on Feb. 1, 2023, provisional application No. 63/371,860, filed on Aug. 18, 2022, provisional application No. 63/327,230, filed on Apr. 4, 2022.

(51) Int. Cl.
| | | |
|---|---|---|
| A61K 40/30 | (2025.01) | |
| A61K 40/11 | (2025.01) | |
| A61K 40/31 | (2025.01) | |
| A61K 40/35 | (2025.01) | |
| A61K 40/42 | (2025.01) | |
| C07K 14/54 | (2006.01) | |
| C07K 14/715 | (2006.01) | |
| C07K 16/28 | (2006.01) | |
| C07K 16/30 | (2006.01) | |
| C12N 5/0783 | (2010.01) | |

(52) U.S. Cl.
CPC ......... *C07K 14/7155* (2013.01); *A61K 40/11* (2025.01); *A61K 40/30* (2025.01); *A61K 40/31* (2025.01); *A61K 40/35* (2025.01); *A61K 40/4211* (2025.01); *A61K 40/4255* (2025.01); *C07K 14/5443* (2013.01); *C07K 16/2803* (2013.01); *C07K 16/30* (2013.01); *C12N 5/0636* (2013.01); *C07K 2319/02* (2013.01); *C12N 2501/2315* (2013.01); *C12N 2510/00* (2013.01)

(58) Field of Classification Search
None
See application file for complete search history.

(56) References Cited

U.S. PATENT DOCUMENTS

| | | | |
|---|---|---|---|
| 4,683,195 A | 7/1987 | Mullis et al. | |
| 6,136,597 A | 10/2000 | Hope et al. | |
| 9,272,002 B2 | 3/2016 | Powell, Jr. et al. | |
| 9,499,788 B2 | 11/2016 | Santos et al. | |
| 9,629,877 B2 | 4/2017 | Cooper et al. | |
| 2018/0200299 A1* | 7/2018 | Cooper | A61P 35/00 |
| 2021/0060068 A1* | 3/2021 | Garcia | A61K 38/1793 |
| 2022/0162314 A1* | 5/2022 | Yeung | C07K 16/2815 |
| 2024/0344024 A1 | 10/2024 | Kovacs | |
| 2025/0025555 A1 | 1/2025 | Kovacs et al. | |

FOREIGN PATENT DOCUMENTS

| | | |
|---|---|---|
| AU | 2021245153 A1 | 2/2022 |
| EP | 3561053 A1 | 10/2019 |
| EP | 3822342 A1 | 5/2021 |
| WO | WO-2007046006 A2 | 4/2007 |
| WO | WO-2016198480 A1 | 12/2016 |
| WO | WO-2017072367 A1 | 5/2017 |
| WO | WO-2019160956 A1 | 8/2019 |
| WO | WO-2020095058 A1 | 5/2020 |
| WO | WO-2020095059 A1 | 5/2020 |
| WO | WO-2020172555 A1 | 8/2020 |
| WO | WO-2021133959 A2 | 7/2021 |
| WO | WO-2021207290 A1 | 10/2021 |
| WO | WO-2021259237 A1 | 12/2021 |
| WO | WO-2022049550 A1 | 3/2022 |
| WO | WO-2023194915 A1 | 10/2023 |

OTHER PUBLICATIONS

ThermoFisher Scientific, "Recombinant Protein Definition and Information," downloaded from the internet on May 2, 2025 at www.thermofisher.com/us/en/home/life-science/cell-culture/cell-culture-learning-center/recombinant-protein-information, pp. 1-3. (Year: 2025).*
Brondyk et al., Methods in Enzymology, vol. 463, 2009, pp. 131-147. (Year: 2009).*

(Continued)

*Primary Examiner* — Zachary S Skelding
(74) *Attorney, Agent, or Firm* — Sterne, Kessler, Goldstein & Fox P.L.L.C.

(57) ABSTRACT

The present disclosure provides compositions and methods for engineering γδ T cells (e.g., vδ1 T cells and vδ2 T cells) with an IL-15 receptor β subunit (IL-15Rβ), e.g., by transduction with a viral vector, to restore IL-15 responsiveness. Further provided are populations of engineered γδ T cells and methods of using the same.

30 Claims, 24 Drawing Sheets

Specification includes a Sequence Listing.

(56) References Cited

OTHER PUBLICATIONS

Yu et al. (Proc Natl Acad Sci U S A. Apr. 17, 2012;109(16):6187-92). (Year: 2012).*
Villarreal et al. (Oncotarget, 2017, vol. 8, (No. 65), pp. 109151-109160). (Year: 2017).*
Makkouk et al. (J Immunother Cancer 2021;9:e003441). (Year: 2021).*
Jones et al. (Hum Gene Ther. Jun. 2009;20(6):630-40). (Year: 2009).*
Keller et al. (J Immunol. Jun. 15, 2020;204(12):3227-3235). (Year: 2020).*
Izumi et al. (Cytotherapy, 2013; 15: 481-491, and Supplemental pp. 1-15). (Year: 2013).*
Corpuz et al. (The Journal of Immunology, 2017, 199: 2366-2376). (Year: 2017).*
Won et al. (Front Immunol. May 14, 2021;12:642856). (Year: 2021).*
Parker, M.E., and Ciofani, M., "Regulation of γδ T Cell Effector Diversification in the Thymus," Frontiers in Immunology 11:42, Frontiers Research Foundation, Switzerland (Jan. 2020).
Cao, B., et al., "Use of chimeric antigen receptor NK-92 cells to target mesothelin in ovarian cancer," Biochemical and Biophysical Research Communications 524(1):96-102, Elsevier, Netherlands (Mar. 2020).
Gao; Y.L., et al., "gammadelta T cells express activation markers in the central nervous system of mice with chronic-relapsing experimental autoimmune encephalomyelitis," J Autoimmun 17(4):261-71, Elsevier, Netherlands (Dec. 2001).
International Search Report and Written Opinion for International Application No. PCT/IB2023/053431, European Patent Office, Netherlands, mailed on Sep. 1, 2023, 17 pages.
Morello, A., et al., "Mesothelin-Targeted CARs: Driving T Cells to Solid Tumors," Cancer Discov 6 (2):133-146, American Association for Cancer Research, United States (Feb. 2016).
Van Acker, H.H., et al., "The role of the common gamma-chain family cytokines in γδ T cell-based anti-cancer immunotherapy," Cytokine & Growth Factor Reviews 41:54-64, Elsevier, Netherlands (Jun. 2018).
Almeida, A., et al., "Delta One T Cells for Immunotherapy of Chronic Lymphocytic Leukemia: Clinical-Grade Expansion/Differentiation and Preclinical Proof of Concept," Clin. Cancer Res. 22: 5795-804, American Association for Cancer Research, United States (Dec. 2016).
Cavrois, M., et al., "A sensitive and specific enzyme-based assay detecting HIV-1 virion fusion in primary T lymphocytes," Nat Biotechnol. 11:1151-1154, Springer, Germany (Nov. 2002).
Chng, J., et al., "Cleavage efficient 2A peptides for high level monoclonal antibody expression in CHO cells," MAbs, 7:403-41, Taylor and Francis, United Kingdom (2015).
Clark-Lewis, I., et al., "Platelet factor 4 binds to interleukin 8 receptors and activates neutrophils when its N terminus is modified with Glu-Leu-Arg," PNAS 90:3574-3577, National Academy of Sciences, United States (Apr. 1993).
De Witte, M.A., et al., "NK Cells and γδT Cells for Relapse Protection after Allogeneic Hematopoietic Cell Transplantation (HCT)," Curr Stem Cell Rep 3:301-311, Springer, Germany (Oct. 2017).
Delenda, C., "Lentiviral vectors: optimization of packaging, transduction and gene expression," The Journal of Gene Medicine, 6:S125-S138, John Wiley & Sons, United States (Feb. 2004).
Deniger, D.C., et al., "Clinical applications of gamma delta T cells with multivalent immunity," Front Immunol 5:636, Frontiers Research Foundation, Switzerland (Dec. 2014).
Genbank, "interleukin-15 isoform 1 preproprotein [Homo sapiens]," Accession No. NP000576.1, accessed at https://www.ncbi.nlm.nih.gov/protein/NP_000576.1/, accessed on Dec. 22, 2023, 3 pages.
Genbank, "interleukin-15 isoform 2 preproprotein [Homo sapiens]," Accession No. NP_751915.1, accessed at https://www.ncbi.nlm.nih.gov/protein/NP_751915.1/, accessed on Sep. 27, 2024, 3 pages.
Genbank, "interleukin-15 preproprotein [Mus musculus]," Accession No. NP 001241676.1, accessed at https://www.ncbi.nlm.nih.gov/protein/NP_001241676.1/, accessed on Dec. 22, 2023, 3 pages.
Genbank, "interleukin-15 receptor subunit alpha isoform 1 precursor [Homo sapiens]," Accession No. NP_002180.1, accessed at https://www.ncbi.nlm.nih.gov/protein/NP_002180.1/, accessed on Sep. 26, 2024, 3 pages.
Genbank, "interleukin-15 receptor subunit alpha isoform 2 [Mus musculus]," Accession No. NP_001258426.1, accessed at https://www.ncbi.nlm.nih.gov/protein/NP_001258426.1/, accessed on Sep. 27, 2024, 3 pages.
Genbank, "interleukin-15 receptor subunit alpha isoform 2 precursor [Homo sapiens]," Accession No. NP_751950.2, accessed at https://www.ncbi.nlm.nih.gov/protein/NP_751950.2/, accessed on Sep. 26, 2024, 3 pages.
Genbank, "interleukin-15 receptor subunit alpha isoform 3 [Homo sapiens]," Accession No. NP_001230468.1, accessed at https://www.ncbi.nlm.nih.gov/protein/NP_001230468.1/, accessed on Sep. 26, 2024, 3 pages.
Genbank, "interleukin-15 receptor subunit alpha isoform 4 [Homo sapiens]," Accession No. NP_001243694.1, accessed at https://www.ncbi.nlm.nih.gov/protein/NP_001243694.1/, accessed on Sep. 26, 2024, 3 pages.
Genbank, "interleukin-15 receptor subunit alpha isoform 5 [Homo sapiens]," Accession No. NP_001338024.1, accessed at https://www.ncbi.nlm.nih.gov/protein/NP_001338024.1/, accessed on Sep. 26, 2024, 3 pages.
Genbank, "interleukin-2 receptor subunit beta precursor [Homo sapiens]," Accession No. NNP_000869.1, accessed at https://www.ncbi.nlm.nih.gov/protein/NP_000869.1/, accessed on Sep. 26, 2024, 4 pages.
Genbank, "interleukin-2 receptor subunit beta precursor [Homo sapiens]," Accession No. NP_001333151.1, accessed at https://www.ncbi.nlm.nih.gov/protein/NP_001333151.1/, accessed on Sep. 26, 2024, 4 pages.
Genbank, "interleukin-2 receptor subunit beta precursor [Homo sapiens]," Accession No. NP_001333152.1, accessed at https://www.ncbi.nlm.nih.gov/protein/NP_001333152.1/, accessed on Sep. 26, 2024, 4 pages.
Genbank, "interleukin-2 receptor subunit beta precursor [Mus musculus]," Accession No. NP_032394.1, accessed at https:/www.ncbi.nlm.nih.gov/protein/NP_032394.1/, accessed on Sep. 27, 2024, 4 pages.
Grabstein, K.H., et al., "Cloning of a T cell growth factor that interacts with the beta chain of the interleukin-2 receptor," Science 264(5161):965-969, American Association for the Advancement of Science, United States (May 1994).
Hurton, L. V., et al., "Tethered IL-15 augments antitumor activity and promotes a stem-cell memory subset in tumor-specific T cells," PNAS, 113:E7788-E7797, National Academy of Sciences, United States (Nov. 2016).
International Search Report and Written Opinion for International Application No. PCT/IB2023/053435, European Patent Office, Netherlands, mailed Jul. 18, 2023, 10 pages.
Klump, H., et al., "Retroviral Vector-Mediated Expression of HoxB4 in Hematopoietic Cells Using a Novel Coexpression Strategy," Gene Therapy 8(10):811-817, Nature Publishing Group, United Kingdom (May 2001).
Lin, Y., et al., "An Effective Way of Producing Fully Assembled Antibody in Transgenic Tobacco Plants by Linking Heavy and Light Chains via a Self-Cleaving 2A Peptide," Front. Plant Sci., 9:1379, Frontiers Research Foundation, Switzerland (Sep. 2018).
Liu, E., et al., "Cord blood NK cells engineered to express IL-15 and a CD19-targeted CAR show long-term persistence and potent antitumor activity," Leukemia, 32:520-531, Springer, Germany (Feb. 2018).
Lu, X., et al., "Safe two-plasmid production for the first clinical lentivirus vector that achieves >99% transduction in primary cells

(56) References Cited

OTHER PUBLICATIONS using a one-step protocol," Journal of Gene Medicine 6:963-973, John Wiley & Sons, United States (Sep. 2004).

Osborn, M.J., et al., "A picornaviral '2A-like' sequence based tricistronic vector allowing for high level therapeutic gene expression coupled to a dual reporter system.," Molecular Therapy 12:P569-574, Cell Press, United States (Sep. 2005).

Szymczak, A., et al., "Development of 2A peptide-based strategies in the design of multicistronic vectors," Expert Opin. Biol. Ther., 5:627-638, Taylor and Francis, United Kingdom (May 2005).

Szymczak, A.L., et al., "Correction of Multi-Gene Deficiency in Vivo using a Single 'Self-Cleaving' 2A Peptide-Based Retroviral Vector," Nature Biotechnology 22(5):589-594, Springer Nature, United States (2004).

Xu, X., et al., "NKT Cells Coexpressing a GD2-Specific Chimeric Antigen Receptor and IL15 Show Enhanced In Vivo Persistence and Antitumor Activity against Neuroblastoma," Clin Cancer Res., 25:7126-7138, American Association for Cancer Research, United States (Dec. 2019).

Yang, J.C., et al., "The use of polyethylene glycol-modified interleukin-2 (PEG-IL-2) in the treatment of patients with metastatic renal cell carcinoma and melanoma. A phase I study and a randomized prospective study comparing IL-2 alone versus IL-2 combined with PEG-IL-2," Cancer 76:687-694, American Cancer Society, United States (Aug. 1995).

Yeku, O.O., et al., "Armored CAR T-cells: utilizing cytokines and pro-inflammatory ligands to enhance CAR T-cell anti-tumour efficacy," Biochem. Soc. Trans. 44(2):412-418, Portland Press, United States (Apr. 2016).

Van Acker, H.H., et al., "Interleukin-15 enhances the proliferation, stimulatory phenotype, and antitumor effector functions of human gamma delta T cells," Journal of Hematology & Oncology 9:101, Springer Nature, United Kingdom (Sep. 2016).

\* cited by examiner

| Group | Treatment | Vector ID | Strain | IL15 | N |
|---|---|---|---|---|---|
| 1 | Untreated | N/A | NSG | IP daily | 5 |
| 2 | IL2Rβ | V352 | NSG | IP daily | 5 +4 |
| 3 | IL15Rα + IL2Rβ | V316 | NSG | IP daily | 5 +4 |
| 4 | IL15Rα-mbIL15 + IL2Rβ | V317 | NSG | IP daily | 5 +4 |
| 5 | IL2Rβ | V352 | NSG | - | 4 |
| 6 | IL15Rα + IL2Rβ | V316 | NSG | - | 4 |
| 7 | IL15Rα-mbIL15 + IL2Rβ | V317 | NSG | - | 5 +4 |
| 8 | IL2Rβ | V352 | NOG-IL15 | Endogenous | 6 |
| 9 | IL15Rα + IL2Rβ | V316 | NOG-IL15 | Endogenous | 6 |
| 10 | IL15Rα-mbIL15 + IL2Rβ | V317 | NOG-IL15 | Endogenous | 6 |

GENE ARMORING

CROSS REFERENCE TO RELATED APPLICATIONS

This application is a continuation of International Application PCT/IB2023/053435, filed on Apr. 4, 2023, which claims the priority benefit of U.S. Provisional Application Nos. 63/327,230, filed Apr. 4, 2022; 63/371,860, filed Aug. 18, 2022, and 63/482,755, filed Feb. 1, 2023, each of which is incorporated herein by reference in its entirety.

REFERENCE TO SEQUENCE LISTING SUBMITTED ELECTRONICALLY VIA EFS-WEB

The content of the electronically submitted sequence listing in ASCII text file (Name: 3817_1700004_Sequence-listing_ST26; Size: 39,263 bytes; Date of Creation: Oct. 3, 2024), filed with the application, is incorporated herein by reference in its entirety.

FIELD OF DISCLOSURE

Traditional chimeric antigen receptor (CAR) armoring seeks to improve CAR+ cell persistence, growth, or other characteristics by having the cell also express IL-15 (either secreted or membrane-bound). Co-expression, either in the same construct or separately, of IL-15 by the CAR+γδ T cell reduces responsiveness of that cell to IL-15. Therefore, there is a need for new compositions and methods to reprogram γδ T cells to provide responsiveness to IL-15 in order to adapt these cells for various immunotherapies.

BACKGROUND

The growing interest in T cell immunotherapy for cancer has focused on the evident capacity of engineered T cells as therapeutic moieties. Gamma delta (γδ) T cells represent a subset of T cells that express on their surface a distinct, defining γδ T-cell receptor (TCR). This TCR is made up of one gamma (γ) and one delta (δ) chain. Human γδ T cells can be broadly classified as one or two types: peripheral blood-resident γδ T cells and non-haematopoietic tissue-resident γδ T cells. Most blood-resident γδ T cells express a Vδ2 TCR, whereas this is less common among tissue-resident γδ T cells, which more frequently use Vδ1 and/or other Vδ chains.

IL-15 is a cytokine and T-cell growth factor that binds to and signals through a receptor complex composed of an IL-15 receptor β subunit (IL-15Rβ, also known as IL-2Rβ), an IL-15 receptor α subunit (IL-15Rα), and a common γ chain. IL-15 is typically secreted by phagocytes following infection and induces the proliferation of certain immune cells (e.g., natural killer cells), which then go on to kill infected cells. Traditional chimeric antigen receptor (CAR) armoring seeks to improve CAR+ cell persistence, growth, or other characteristics by having the cell also express IL-15 (either secreted or membrane-bound). Co-expression, either in the same construct or separately, of IL-15 by the CAR+ Vδ1 T cell reduces responsiveness of that cell to IL-15. Accordingly, new compositions and methods are needed to reprogram γδ T cells to provide responsiveness to IL-15 in order to adapt these cells for various immunotherapies.

SUMMARY OF THE DISCLOSURE

In one aspect, the invention features a γδ T cell expressing a recombinant IL-15 receptor β subunit (IL-15Rβ) (e.g., wherein the IL-15Rβ is expressed without the co-expression of a recombinant IL-15 receptor α subunit (IL-15Rα) (e.g., without the co-expression of a recombinant IL-15 receptor α subunit (IL-15Rα), wherein the N-terminus of the IL-15Rα or fragment thereof is tethered to a C-terminus of the IL-15 or variant thereof).

In some embodiments, the γδ T cell further expresses a recombinant IL-15 receptor α subunit (IL-15Rα) or fragment thereof.

In some embodiments, the IL-15Rα or fragment thereof is tethered to an IL-15 or variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the IL-15Rβ and the IL-15Rα or fragment thereof are expressed in tandem. The IL-15Rβ and the IL-15Rα or fragment thereof may include a linker therebetween. The linker may include a cleavable peptide. The cleavable peptide may be, for example, a self-cleaving peptide, such as a 2A peptide. In some embodiments, the 2A peptide is a foot-and-mouth disease virus 18 2A (F2A) peptide, an equine rhinitis A virus 2A (E2A) peptide, a porcine teschovirus-1 2A (P2A) peptide, or a thosea asigna virus 2A (T2A) peptide.

In some embodiments, the γδ T cell further expresses a chimeric antigen receptor (CAR). The CAR may lack an intracellular signaling domain.

In some embodiments, the γδ T cell lacks an endogenous gene encoding IL-15.

In some embodiments, the γδ T cell further expresses a secreted IL-15 or variant thereof.

In another aspect, the invention features a γδ T cell expressing a recombinant IL-15Rβ and a recombinant IL-15 or variant thereof.

In some embodiments, the IL-15Rβ and the IL-15 or variant thereof are expressed in tandem. The IL-15Rβ and the IL-15 or variant thereof may include a linker therebetween. The linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the γδ T cell further expresses a recombinant IL-15Rα or fragment thereof. The fragment of the IL-15Rα may include, for example, a soluble fragment. The soluble fragment may include, for example, a sushi domain. The sushi domain may be attached to an Fc domain. In some embodiments, the IL-15Rα or fragment thereof is tethered to the IL-15 or variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the IL-15Rβ and the IL-15Rα or fragment thereof are expressed in tandem. For example, the IL-15Rβ and the IL-15Rα or fragment thereof may include a second linker therebetween. The second linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the IL-15Rβ, the IL-15 or variant thereof, and the recombinant IL-15Rα or fragment thereof are expressed in tandem.

In some embodiments, the γδ T cell further expresses a CAR. The CAR may lack an intracellular signaling domain.

In some embodiments, the γδ T cell lacks an endogenous gene encoding IL-15.

In another aspect, the invention features an isolated population of γδ T cells, wherein at least 10% (e.g., at least 20%, 30%, 40%, 50% 60%, 70%, 80%, 90%, 95%, 97%, or 99%) of the population of γδ T cells express a recombinant IL-15Rβ. In some embodiments, at least 50% of the population of γδ T cells express the recombinant IL-15Rβ.

In some embodiments, the isolated population of γδ T cells further express a recombinant IL-15Rα or fragment thereof.

In some embodiments, the IL-15Rα or fragment thereof is tethered to an IL-15 or variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the IL-15Rβ and the IL-15Rα or fragment thereof are expressed in tandem. The IL-15Rβ and the IL-15Rα or fragment thereof may include a linker therebetween. The linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the isolated population of γδ T cells further express CAR. The CAR may lack an intracellular signaling domain.

In some embodiments, the isolated population of γδ T cells lack an endogenous gene encoding IL-15.

In some embodiments, the isolated population of γδ T cells further express a secreted IL-15 or variant thereof.

In another aspect, the invention features an isolated population of γδ T cells, wherein at least 10% (e.g., at least 20%, 30%, 40%, 50% 60%, 70%, 80%, 90%, 95%, 97%, or 99%) of the population of γδ T cells express a recombinant IL-15Rβ and IL-15 or variant thereof. In some embodiments, at least 50% of the population of γδ T cells express a recombinant IL-15Rβ and IL-15 or variant thereof.

In some embodiments, the IL-15Rβ and the IL-15 or variant thereof are expressed in tandem. For example, the IL-15Rβ and the IL-15 receptor or variant thereof may include a linker therebetween. The linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the isolated population of γδ T cells further express a recombinant IL-15Rα or fragment thereof. The fragment of the IL-15Rα may include, for example, a soluble fragment. The soluble fragment may include, for example, a sushi domain. The sushi domain may be attached to an Fc domain. In some embodiments, the IL-15Rα or fragment thereof is tethered to the IL-15 or variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the IL-15Rβ and the IL-15Rα or fragment thereof are expressed in tandem. For example, IL-15Rβ and the IL-15Rα or fragment thereof may include a second linker therebetween. For example, the IL-15Rβ and the IL-15Rα or fragment thereof may include a second linker therebetween. The second linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the IL-15Rβ, the IL-15 or variant thereof, and the recombinant IL-15Rα or fragment thereof are expressed in tandem.

In some embodiments, the isolated population of γδ T cells further express a CAR. The CAR may lack an intracellular signaling domain.

In some embodiments, the isolated population of γδ T cells lack an endogenous gene encoding IL-15.

In another aspect, the invention features a method of producing a population of γδ T cells expressing a recombinant IL-15Rβ. The method includes (a) providing a population of γδ T cells; and (b) transducing the population of γδ T cells with a polynucleotide encoding the IL-15Rβ, thereby producing the population of γδ T cells expressing the recombinant IL-15Rβ.

In some embodiments, the polynucleotide includes an IRES operably connected to the IL-15Rβ.

In some embodiments, the method further includes transducing the starting population of γδ T cells with a polynucleotide encoding an IL-15Rα or a fragment thereof. In some embodiments, the IL-15Rα or fragment thereof is tethered to IL-15 or a variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the polynucleotide encodes the IL-15Rβ and the IL-15Rα in tandem. The polynucleotide may include a linker between the IL-15Rβ and the IL-15Rα. The linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiment, the method further includes transducing the cell with a polynucleotide encoding a CAR. In some embodiments, the polynucleotide encodes the CAR and the IL-15Rβ in tandem. For example, polynucleotide may include a linker between the CAR and the IL-15Rβ. The linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide.

In another aspect, the invention features a method of producing a population of γδ T cells expressing a recombinant IL-15Rβ and an IL-15 or variant thereof. The method includes (a) providing a population of γδ T cells; (b) transducing the population of γδ T cells with a polynucleotide encoding the IL-15Rβ; and (c) transducing the population of γδ T cells with a polynucleotide encoding the IL-15 or variant thereof, thereby producing the population of γδ T cells expressing the recombinant IL-15Rβ and the IL-15 or variant thereof.

In some embodiments, the polynucleotide includes an IRES operably connected to the IL-15Rβ and/or the IL-15 or variant thereof.

In some embodiments, the polynucleotide encodes the IL-15Rβ and the IL-15 or variant thereof in tandem. For example, the polynucleotide may include a linker between the IL-15Rβ and the IL-15 or variant thereof. The linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the method further includes transducing the starting population of γδ T cells with a polynucleotide encoding an IL-15Rα or a fragment thereof. The fragment of the IL-15Rα may include a soluble fragment. For example, the soluble fragment may include a sushi domain. In some embodiments, the sushi domain is attached to an Fc domain.

In some embodiments, the IL-15Rα or fragment thereof is tethered to the IL-15 or a variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In some embodiments, the polynucleotide encodes the IL-15Rβ and the IL-15Rα in tandem.

In some embodiments, the polynucleotide includes a second linker between the IL-15Rβ and the IL-15Rα. The second linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments, the polynucleotide encodes the IL-15Rβ, the IL-15 or variant thereof, and the recombinant IL-15Rα or fragment thereof in tandem.

In some embodiments, the method further includes transducing the cell with a polynucleotide encoding a CAR. The polynucleotide may encode the CAR and the IL-15Rβ in tandem. For example, the polynucleotide may include a linker between the CAR and the IL-15Rβ. The linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide.

In some embodiments of any of the methods described herein, the method includes providing a vector that includes the polynucleotide. The vector may be, e.g., a viral vector. The viral vector may be, for example, a Retroviridae family virus, an adenovirus, a parvovirus, a coronavirus, a rhabdovirus, a paramyxovirus, a picornavirus, an alphavirus, a herpes virus, or a poxvirus.

In some embodiments, the parvovirus viral vector is an AAV vector.

In some embodiments, the viral vector is a Retroviridae family viral vector. The Retroviridae family viral vector may be, e.g., a lentiviral vector. The Retroviridae family viral vector may be, e.g., an alpharetroviral vector or a gammaretroviral vector. In some embodiments, the Retroviridae family viral vector includes a central polypurine tract, a woodchuck hepatitis virus post-transcriptional regulatory element, a 5'-LTR, HIV signal sequence, HIV Psi signal 5'-splice site, delta-GAG element, 3'-splice site, and a 3'-self inactivating LTR.

In some embodiments, the viral vector is a pseudotyped viral vector. The pseudotyped viral vector may be, e.g., a pseudotyped adenovirus, a pseudotyped parvovirus, a pseudotyped coronavirus, a pseudotyped rhabdovirus, a pseudotyped paramyxovirus, a pseudotyped picornavirus, a pseudotyped alphavirus, a pseudotyped herpes virus, a pseudotyped poxvirus, and a pseudotyped Retroviridae family virus. In some embodiments, the pseudotyped viral vector is a lentiviral vector. In some embodiments, the pseudotyped viral vector includes one or more envelope proteins from a virus selected from vesicular stomatitis virus VSV, RD114 virus, MLV, FeLV, VEE, HFV, WDSV, SFV, Rabies virus, ALV, BIV, BLV, EBV, CAEV, SNV, ChTLV, STLV, MPMV, SMRV, RAV, FuSV, MH2, AEV, AMV, avian sarcoma virus CT10, and EIAV. For example, in some embodiments, the pseudotyped viral vector includes a VSV-G envelope protein.

In some embodiments of any of the methods described herein, the method further includes culturing the starting population of γδ T cells in the presence of exogenous IL-2 and/or IL-15.

In some embodiments, at least 10% (e.g., at least 20%, 30%, 40%, 50% 60%, 70%, 80%, 90%, 95%, 97%, or 99%) of the population of γδ T cells express the IL-15Rβ. In some embodiments, at least 50% of the population of γδ T cells express the IL-15Rβ.

In another aspect, the invention features a method expanding γδ T cells. The method includes (a) providing a population of γδ T cells expressing an IL-15Rβ; and (b) culturing the population of γδ T cells in the presence of exogenous IL-2 and/or IL-15 or a variant thereof.

In some embodiments, the population of γδ T cells further express a recombinant IL-15Rα or fragment thereof. The IL-15Rα or fragment thereof may be tethered to IL-15 or a variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof.

In another aspect, the invention features a method expanding γδ T cells. The method includes (a) providing a population of γδ T cells expressing an IL-15Rβ and IL-15 or a variant thereof; and (b) culturing the γδ T cells, wherein the IL-15 or variant thereof expands the population of γδ T cells.

In some embodiments, the method further includes culturing the population of γδ T cells in the presence of exogenous IL-2.

In some embodiments, the population of γδ T cells further express a recombinant IL-15Rα or fragment thereof. The fragment of the IL-15Rα may include, for example, a soluble fragment. The soluble fragment may include, for example a sushi domain. In some embodiments, the sushi domain is attached to an Fc domain.

In some embodiments, the IL-15Rα or fragment thereof is tethered to IL-15 or a variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof. As used herein, "mbIL-15" refers to a membrane bound IL-15Rα tethered to an IL-15 (e.g., wherein the C-terminus of the IL-15Rα is tethered to an N-terminus of the IL-15).

BRIEF DESCRIPTION OF THE DRAWINGS

FIG. 1A shows drawings of the armoring strategies evaluated in this invention. Conventional armoring constructs used in the context of αβ T cells, NK cells and iNKT cells utilise secreted (sIL-15) or membrane-tethered IL-15 (mbIL-15) constructs. Novel armoring strategies build on the introduction of common beta chain (also known as IL-2Rβ, IL-15Rβ or CD122)

alone or in combination with wild-type or IL-15 tethered IL-15Rα (CD215) chain. FIG. 1B shows domain structure of the conventional armored CAR encoding gammaretroviral vectors. FIG. 1C shows domain structure of the novel armored CAR encoding gammaretroviral vectors.

FIG. 2A shows fold expansion of CAR-modified unarmored (muCAR19) and conventionally armored (muCAR19.sIL-15 and muCAR19-mbIL-15) Vδ1 T cells. FIG. 2B shows analysis of CAR, IL-15 and IL-15Rα surface expression by flow cytometry in mbIL-15 armored CAR-modified Vδ1 T cells. FIG. 2C shows analysis of IL-15 production by ELISA in unarmored (muCAR19) and secreted IL-15 armored (muCAR19.sIL-15) CAR-modified Vδ1 T cells.

FIG. 3A shows comparison of cytotoxic activity of unarmored (muCAR19) and conventionally armored Vδ1 T cells against NALM-6 acute lymphoblastic leukaemia cell line. FIG. 3B shows analysis of survival of unarmored and conventionally armored CAR-modified Vδ1 T cells by flow cytometry. FIG. 3C shows fold expansion of CAR-modified unarmored and conventionally armored Vδ1 T cells during three rounds of repeated antigen stimulation with CD19+ NALM-6 cells.

FIG. 6A shows comparison of the fold expansion of unarmored (muCAR19), mbIL-15 armored (muCAR19.α.15), mbIL-15 and IL-15β chain armored (muCAR19.α.15. β) and IL-15R α and β armored (muCAR19.α.β) CAR-modified Vδ1 T cells. FIG. 6B shows fold expansion of α.15, α.β or α.15.β chain expressing Vδ1 T cells in the presence of low and high IL-15 concentrations.

FIG. 7A shows comparison of cytotoxic activity of conventionally armored (mbIL-15, α.15), mbIL-15 and IL-15 β chain armored (muCAR19.α.15. β) and IL-15R α and β armored (muCAR19.α.β) CAR-modified Vδ1 T cells against NALM-6 acute lymphoblastic leukaemia cell line. FIG. 7B shows the effect of armoring on CAR-modified Vδ1 T cell fold expansion, enrichment and target (NALM-6) clearance during repeated antigen stimulation with CD19+ NALM-6 cells in the absence and presence (FIG. 7C) of exogenous IL-15.

FIG. 8A shows comparison of CAR expression in Vδ1 T cells armored with novel armoring constructs 3 days post transduction. FIG. 8B shows comparison of IL-15Rα, IL-15Rβ, common gamma chain and tethered IL-15 expression in armored CAR-modified Vδ1 T cells.

FIG. 9A shows comparison of fold expansion of IL-15R β (muCAR19.0), mbIL-15 and IL-15R β (muCAR19.α.15. β), and IL-15R α and β (muCAR19.α.β) armored CAR-modified Vδ1 T cells. FIG. 9B shows fold expansion of CAR-modified Vδ1 T cells armored with novel constructs.

FIG. 10A shows analysis of CAR expression in armored Vδ1 T cells. FIG. 10B shows comparison of IL-15Rα, IL-15Rβ, common gamma chain and tethered IL-15 expression in armored CAR-modified Vδ1 T cells. FIG. 10C shows comparison of CAR expression in armored Vδ1 T cells grown in the presence of high and low IL-15 concentrations 3 days post-transduction (day 7) and at the day of harvest (day 14). FIG. 10D shows flow cytometric analysis of immune cell activatory and inhibitory marker expression in CAR+ve and CAR−ve Vδ1 T cell fractions FIG. 11D shows the cytotoxicity of CD123-targeting CAR engineered cells unarmoured (CAR123) or armoured with mbIL-15 and IL-15Rβ (CAR123.α.15.β). FIG. 11E shows the cytotoxicity of Mesothelin-targeting CAR engineered cells unarmoured (Meso-CAR) or armoured with mbIL-15 and IL-15Rβ (Meso-CAR.α.15.β).

FIG. 12A shows fold expansion of armored CAR-modified Vδ1 T cells. FIG. 12B relative fold change of untransduced (CAR−ve) Vδ1 T cell numbers. FIG. 12C shows enrichment of CAR-modified Vδ1 T cells. FIG. 12D shows percentage of viable lymphocyte over the course of assay.

FIGS. 13A-13C show repeated antigen stimulation with NALM-6 cells in the presence of supraphysiological concentrations (10 ng/mL), and FIGS. 13D-13F show physiological IL-15 concentrations (70 pg/mL).

FIG. 14A shows in vivo study design and experimental study grouping. FIG. 14B shows in vivo efficacy in NSG mice with exogenous IL-15. FIG. 14C shows in vivo efficacy in NSG mice without exogenous IL-15. FIG. 14D shows in vivo efficacy in NOG-hIL15 mice. FIG. 14E shows in vivo persistence of CD19 CAR+ and CAR−Vδ1 T cells in the bone marrow of NSG mice at day 3 post-dosing. FIG. 14F compares Vδ1 CD19 CAR+ proportions of drug product upon thaw, to cells recovered from the bone marrow of NSG mice 3 days post-dosing. FIG. 14G shows in vivo efficacy in NSG mice with exogenous IL-15 up to study termination on day 20/21. FIG. 14H shows in vivo efficacy in NSG mice without exogenous IL-15 up to study termination on day 20/21. FIG. 14I shows in vivo efficacy in NOG-hIL15 mice up to study termination on day 20/21. FIG. 14J compares Vδ1 CD19 CAR+ proportions of drug product upon thaw to cells recovered from the bone marrow of NSG mice 3 and 14 days post-dosing. FIG. 14K compares Vδ1 CD19 CAR+ and CAR− cell numbers recovered from bone marrow samples harvested on day 14 post-dosing from NSG mice dosed with exogenous IL-15. FIG. 14L compares Vδ1 CD19 CAR+ and CAR− cell numbers recovered from bone marrow samples harvested on day 14 post-dosing from NSG mice receiving no exogenous IL-15. FIG. 14M compares NALM-6 tumour cell numbers recovered from bone marrow samples harvested on day 14 post-dosing from NSG mice receiving no exogenous IL-15.

FIG. 15A shows the survival of CAR T cells of unarmoured and α.15.β armoured. FIGS. 15B and 15D shows tumour confluence that was measured by tracking GFP fluorescence over time after treatment with different Meso-CAR T cell products. FIGS. 15C and 15E show CAR T cell fold expansion followed during the repeated antigen stimulation assay.

FIG. 16A shows the schematic of the model used. FIG. 16B shows in vivo efficacy of the products studied.

DETAILED DESCRIPTION

Figure 1A:
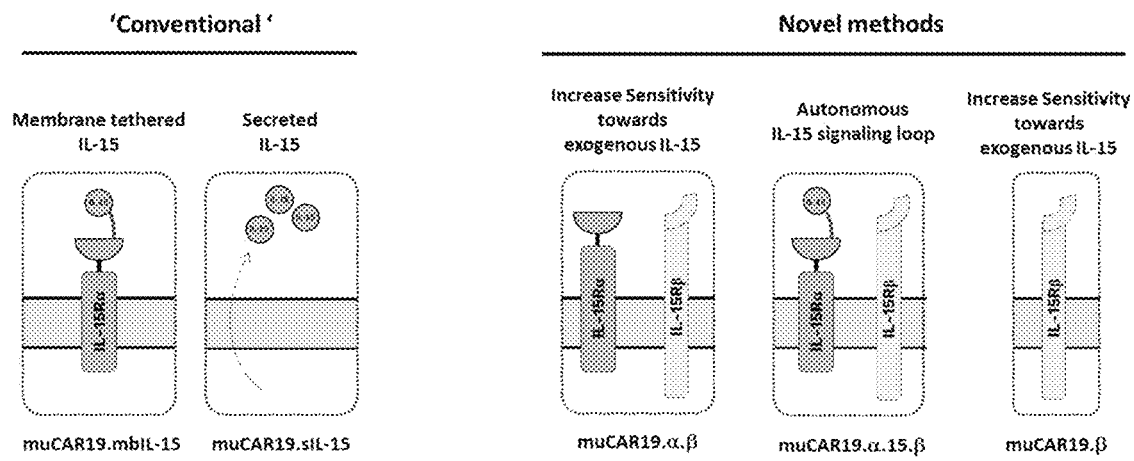
FIGS. 1A-1C are schematic overviews of conventional and novel IL-15 armoring constructs.

The present invention provides compositions and methods for engineering γδ T cells (e.g., vδ1 T cells and vδ2 T cells) to be responsive to IL-15. IL-15 is a cytokine and T-cell growth factor that binds to and signals through a receptor complex composed of an IL-2 receptor β subunit (IL-15Rβ), an IL-15 receptor α subunit (IL-15Rα), and a common 7 chain.

Traditional chimeric antigen receptor (CAR) armoring seeks to improve CAR+ cell persistence, growth, or other characteristics by having the cell also express IL-15 (either secreted or membrane-bound). Co-expression, either in the same construct or separately, of IL-15 by the CAR+ cell reduces responsiveness of that cell to exogenous IL-15. The present invention introduces positive IL-15 signaling loop and boosts responsiveness to IL-15 to the CAR+ cells by co-expressing IL-15 receptor β and/or α subunits, which appear to be limited in some cells, including γδ T cells. This can improve sensitivity of the CAR+ cell even in the absence of armor constructs. The described strategy can be utilized alone or in conjunction with CARs to enhance γδ T-cell persistence and proliferation.

Traditional approaches to engineering IL-15 signaling loops in NK cells and αβ T cells include transduction with a construct that encodes IL-15Rα. In each instance, an NK cell or an αβ T cell expressing IL-15Rα and treated with IL-15 increases proliferation, survival, and toxicity of the cells. In contrast, γδ T cells engineered with IL-15Rα exhibit decreased proliferation with moderate effects on survival. The present invention is based on the unexpected discovery that γδ T cells can be engineered with a recombinant IL-15Rβ in order to effectively introduce a positive IL-15 signaling loop. This was unexpected because it was expected that the IL-15Rα would be required for IL-15 responsiveness.

The compositions and methods described herein feature γδ T cells and populations thereof that are engineered to express a recombinant IL-15Rβ. These IL-15Rβ engineered γδ T cells provide efficient proliferation and survival of in the presence of IL-15 and arm them with substantial cytotoxicity for various therapeutic approaches.

I. Definitions

It is to be understood that aspects and embodiments of the invention described herein include "comprising," "consisting," and "consisting essentially of" aspects and embodiments. As used herein, the singular form "a," "an," and "the" includes plural references unless indicated otherwise.

The term "about" as used herein refers to the usual error range for the respective value readily known to the skilled person in this technical field. Reference to "about" a value or parameter herein includes (and describes) embodiments that are directed to that value or parameter per se. In some instances, "about" encompass variations of +20%, in some instances +10%, in some instances +5%, in some instances +1%, or in some instances +0.1% from the specified value, as such variations are appropriate to perform the disclosed methods.

As used herein, the term "engineered γδ T cell" refers to a γδ T cell that expresses a transgene (i.e., a gene that has been transduced into the engineered γδ T cell or a parental cell thereof).

As used herein, the term "primed γδ T cell" refers to a starting population (e.g., an endogenous population of γδ T cells) that has been affected by a culture condition. In some instances, a primed γδ T cell has a different functional viral entry receptor profile relative to its unprimed counterpart before experiencing the culture condition. In some embodiments, a population of primed γδ T cells is an expanded population of γδ T cells.

As used herein, an "expanded population of γδ cells" refers to a population of haematopoietic cells including γδ T cells that has been cultured in a condition and for a duration that has induced the expansion of γδ cells, i.e., increased γδ cell number. Likewise, an "expanded population of Vδ1 T cells," as used herein, refers to a population of haematopoietic cells including Vδ1 T cells that has been cultured in a condition and for a duration that has induced the expansion of Vδ1 T cells, i.e., increased Vδ1 cell number. Similarly, an "expanded population of Vδ2 T cells," as used herein, refers to a population of haematopoietic cells including Vδ2 T cells that has been cultured in a condition and for a duration that has induced the expansion of Vδ2 T cells, i.e., increased Vδ2 cell number.

As used herein, a "population" of γδ T cells refers to a group of three or more γδ T cells (e.g., at least 10, at least $10^2$, at least $10^3$, at least $10^4$, at least $10^5$, at least $10^6$, at least $10^7$, at least $10^8$, at least $10^9$, at least $10^{10}$, at least $10^{11}$, at least $10^{12}$, or at least $10^{13}$) γδ T cells (e.g., engineered γδ T cells). A population of a particular cell type (e.g., a population of endogenous γδ T cells, a population of primed γδ T cells, or a population of engineered γδ T cells) refers to the cells of that type and not to cells of a different type within a broader population. For example, if 10% of the cells of a starting population of $10^8$ T cells are γδ T cells, the starting population of γδ T cells is $10^7$.

As used herein, an "armor protein" refers to a protein encoded by a transgene that, when expressed by a γδ T cell (e.g., a γδ T cell expressing a CAR), increases persistency of the γδ T cell, proliferation of the γδ T cell or increased cytotoxicity of the γδ T cell toward a target cell, e.g., through signaling (e.g., cytokine signaling) to improve, e.g., cell persistence, cell viability, activation and other desired characteristics. An armor protein can be a membrane-bound protein or a soluble protein. For example, armor proteins include membrane-bound proteins, such as a membrane-bound receptor (e.g., IL-15R, e.g., IL-15Rβ and IL-15Rα, αβ TCR, a natural cytotoxicity receptor (e.g., NKp30, NKp44, or NKp46), a cytokine receptor (e.g., IL-12 receptor), and/or a chemokine receptor (e.g., CCR2 receptor) and/or a membrane-bound ligand or cytokine (e.g., membrane-bound IL-15, membrane-bound IL-7, membrane-bound CD40L, membrane-bound 4-1BB, membrane-bound 4-1BBL, membrane bound CCL19). Additionally, or alternatively, armor proteins can be soluble proteins, such as soluble ligands or cytokines (e.g., soluble IL-15, soluble IL-7, soluble IL-12, soluble CD40L, soluble 4-1BBL, and/or soluble CCL19). In some embodiments, an armor protein is not antigen specific.

As used herein, "IL-15" refers to native or recombinant IL-15 or a variant thereof having at least 70% (e.g., at least 80%, 85%, 90%, 95%, 97%, 99%, e.g., at least 85%) sequence identity over an equal length portion that acts as an agonist for one or more IL-15 receptor (IL-15R) subunits (e.g., muteins, analogues, subunits, receptor complexes, fragments, isoforms, and peptidomimetics thereof). IL-15, like IL-2, is a known T-cell growth factor that can support proliferation of an IL-2-dependent cell line, CTLL-2. IL-15 was first reported by Grabstein et al. (Science 264.5161: 965-969, 1994) as a 114-amino acid mature protein. The term "IL-15," as used herein, means native or recombinant IL-15 and muteins, analogs, subunits thereof, or complexes thereof (e.g., receptor complexes, e.g., sushi peptides, as described in PCT Pub. No. WO 2007/046006), and each of which can stimulate proliferation of CTLL-2 cells. In the CTLL-2 proliferation assays, supernatants of cells transfected with recombinantly expressed precursor and in-frame fusions of mature forms of IL-15 can induce CTLL-2 cell proliferation.

Human IL-15 can be obtained according to the procedures described by Grabstein et al. (Science 264.5161: 965-969, 1994) or by conventional procedures such as polymerase chain reaction (PCR). A deposit of human IL-15 cDNA was made with the ATCC® on Feb. 19, 1993, and assigned accession number 69245.

The amino acid sequence of human IL-15 (Gene ID 3600) is found in Genbank under accession locator NP000576.1 GI: 10835153 (isoform 1) and NP_751915.1 GI: 26787986 (isoform 2). The murine (Mus musculus) IL-15 amino acid sequence (Gene ID 16168) is found in Genbank under accession locator NP_001241676.1 GI: 363000984.

IL-15 can also refer to IL-15 derived from a variety of mammalian species, including, for example, human, simian, bovine, porcine, equine, and murine. An IL-15 "mutein," as referred to herein, is a polypeptide that has an amino acid sequence different from a native mammalian IL-15 polypeptide because of one or more amino acid deletions, insertions, and/or substitutions. Variants may comprise conservatively substituted sequences, meaning that a given amino acid residue is replaced by a residue having similar physiochemical characteristics. Examples of conservative substitutions include substitution of one aliphatic residue for another, such as Ile, Val, Leu, or Ala for one another, or substitutions of one polar residue for another, such as between Lys and Arg; Glu and Asp; or Gln and Asn. Other such conservative substitutions, for example, substitutions of entire regions having similar hydrophobicity characteristics, are well known. Naturally occurring IL-15 variants are also encompassed by the invention. Examples of such variants are proteins that result from alternate mRNA splicing events or from proteolytic cleavage of the IL-15 protein, wherein the IL-15 binding property is retained. Alternate splicing of mRNA may yield a truncated but biologically active IL-15 protein. Variations attributable to proteolysis include, for example, differences in the N- or C-termini upon expression in different types of host cells, due to proteolytic removal of one or more terminal amino acids from the IL-15 protein (generally from 1-10 amino acids). In some embodiments, the terminus of the protein can be modified to alter its physical properties, for example, with a chemical group such as polyethylene glycol (Yang et al. Cancer 76:687-694, 1995). In some embodiments, the terminus or interior of the protein can be modified with additional amino acids (Clark-Lewis et al. PNAS 90:3574-3577, 1993).

As used herein, "IL-2 receptor β subunit," "IL-2Rβ," "IL-15 receptor β subunit," and "IL-15Rβ," used interchangeably herein, refer to native or recombinant IL-15Rβ or a variant thereof having at least 70% (e.g., at least 80%, 85%, 90%, 95%, 97%, 99%, e.g., at least 85%) sequence identity over an equal length portion that acts as a receptor for one or more of IL-2 or IL-15 (e.g., muteins, analogues, fragments, isoforms, and peptidomimetics thereof). IL-15Rβ includes full length and fragments thereof. IL-2Rβ, called herein IL-15Rβ, is a known T-cell growth factor receptor that can support proliferation of an IL-2-dependent cell line, CTLL-2. IL-2Rβ is a 551-amino acid mature protein. The term "IL-15Rβ," as used herein, means native or recombinant IL-2Rβ and muteins, analogs, subunits thereof, or complexes thereof.

The amino acid sequence of human IL-2Rβ (Gene ID 3560) is found in Genbank under accession locator NP_000869, NP_001333151, and NP_001333152. The murine (Mus musculus) IL-2Rβ amino acid sequence (Gene ID 16185) is found in Genbank under accession locator NP_032394.

IL-15Rβ can also refer to IL-15Rβ derived from a variety of mammalian species, including, for example, human, simian, bovine, porcine, equine, and murine. An IL-15Rβ "mutein" as referred to herein, is a polypeptide that has an amino acid sequence different from a native mammalian IL-15Rβ polypeptide because of one or more amino acid deletions, insertions, and/or substitutions. Variants may comprise conservatively substituted sequences, meaning that a given amino acid residue is replaced by a residue having similar physiochemical characteristics. Examples of conservative substitutions include substitution of one aliphatic residue for another, such as Ile, Val, Leu, or Ala for one another, or substitutions of one polar residue for another, such as between Lys and Arg; Glu and Asp; or Gln and Asn. Other such conservative substitutions, for example, substitutions of entire regions having similar hydrophobicity characteristics, are well known. Naturally occurring IL-15Rβ variants are also encompassed by the invention. Examples of such variants are proteins that result from alternate mRNA splicing events or from proteolytic cleavage of the IL-15Rβ protein, wherein the IL-15Rβ binding property is retained. Alternate splicing of mRNA may yield a truncated but biologically active IL-15Rβ protein. Variations attributable to proteolysis include, for example, differences in the N- or C-termini upon expression in different types of host cells, due to proteolytic removal of one or more terminal amino acids from the IL-15Rβ protein (generally from 1-10 amino acids).

As used herein, "IL-15 receptor α subunit," and "IL-15Rα," refer to native or recombinant IL-15Rα or a variant thereof that acts as a receptor for IL-15 (e.g., muteins, analogues, fragments, isoforms, and peptidomimetics thereof). IL-15Rα includes full length and fragments thereof. IL-15Rα, is a known T-cell growth factor receptor. IL-15Rα is a 267-amino acid mature protein. The term "IL-15Rα," as used herein, means native or recombinant IL-15Rα and muteins, analogs, subunits thereof, or complexes thereof. Fragments of IL-15Rα include soluble fragments, e.g., sushi peptides, as described in PCT Pub. No. WO 2007/046006. Soluble fragments (e.g., sushi peptides, such as a fragment containing residues 31-95 of IL-15Rα or a variant thereof having at least 70% (e.g., at least 80%, 85%, 90%, 95%, 97%, 99%, e.g., at least 85%) sequence identity over an equal length portion) also include muteins, analogues, fragments, isoforms, and peptidomimetics thereof. In some embodiments, a soluble fragment is attached to an Fc domain, e.g., Fc-sushi or sushi-Fc.

The amino acid sequence of human IL-15Rα (Gene ID 3601) is found in Genbank under accession locator NP_001230468, NP_001243694, NP_002180, NP_751950, and NP_001338024. The murine (Mus musculus) IL-15Rα amino acid sequence (Gene ID 16169) is found in Genbank under accession locator NP_001258426.

IL-15Rα can also refer to IL-15Rα derived from a variety of mammalian species, including, for example, human, simian, bovine, porcine, equine, and murine. An IL-15Rα "mutein," as referred to herein, is a polypeptide that has an amino acid sequence different from a native mammalian IL-15Rα polypeptide because of one or more amino acid deletions, insertions, and/or substitutions. Variants may comprise conservatively substituted sequences, meaning that a given amino acid residue is replaced by a residue having similar physiochemical characteristics. Examples of conservative substitutions include substitution of one aliphatic residue for another, such as Ile, Val, Leu, or Ala for one another, or substitutions of one polar residue for another, such as between Lys and Arg; Glu and Asp; or Gln and Asn. Other such conservative substitutions, for example, substitutions of entire regions having similar hydrophobicity characteristics, are well known. Naturally occurring IL-15Rα variants are also encompassed by the invention. Examples of such variants are proteins that result from alternate mRNA splicing events or from proteolytic cleavage of the IL-15Rα protein, wherein the IL-15Rα binding property is retained. Alternate splicing of mRNA may yield a truncated but biologically active IL-15Rα protein. Variations attributable to proteolysis include, for example, differences in the N- or C-termini upon expression in different types of host cells, due to proteolytic removal of one or more terminal amino acids from the IL-15Rα protein (generally from 1-10 amino acids). In some embodiments, the terminus of the protein can be modified to alter its physical properties, for example, with a chemical group such as polyethylene glycol (Yang et al. Cancer 76:687-694, 1995). In some embodiments, the terminus or interior of the protein can be modified with additional amino acids (Clark-Lewis et al. PNAS 90:3574-3577, 1993).

As used herein, "internal ribosomal entry site" or "IRES" refers to an RNA element that allows for translation initiation in a 5' cap independent manner. In some embodiments, a polyribonucleotide described herein includes one or more internal ribosome entry site (IRES) elements. In some embodiments, the IRES is operably linked to one or more transgene sequences (e.g., each IRES is operably linked to one or more expression sequences). In embodiments, the IRES is located between a heterologous promoter and the 5' end of a coding sequence. An IRES may include an RNA sequence capable of engaging a eukaryotic ribosome. In some embodiments, the IRES element is at least about 5 nt, at least about 8 nt, at least about 9 nt, at least about 10 nt, at least about 15 nt, at least about 20 nt, at least about 25 nt, at least about 30 nt, at least about 40 nt, at least about 50 nt, at least about 100 nt, at least about 200 nt, at least about 250 nt, at least about 350 nt, or at least about 500 nt.

As used herein, the phrase "in an amount effective to" refers to an amount that induces a detectable result (e.g., a number of cells having a statistically significant increased number relative to its starting population, e.g., at a p<0.05).

As used herein, an "expanded population of γδ cells" refers to a population of haematopoietic cells including γδ T cells that has been cultured in a condition and for a duration that has induced the expansion of γδ cells, i.e., increased γδ cell number. Likewise, an "expanded population of Vδ1 T cells," as used herein, refers to a population of haematopoietic cells including Vδ1 T cells that has been cultured in a condition and for a duration that has induced the expansion of Vδ1 T cells, i.e., increased Vδ1 cell number. Similarly, an "expanded population of Vδ2 T cells," as used herein, refers to a population of haematopoietic cells including Vδ2 T cells that has been cultured in a condition and for a duration that has induced the expansion of Vδ2 T cells, i.e., increased Vδ2 cell number The term "marker" herein to refers to a DNA, RNA, protein, carbohydrate, glycolipid, or cell-based molecular marker, the expression or presence of which in a patient's sample can be detected by standard methods (or methods disclosed herein).

A cell or population of cells that "expresses" a marker of interest is one in which mRNA encoding the protein, or the protein itself, including fragments thereof, is determined to be present in the cell or the population. Expression of a marker can be detected by various means. For example, in some embodiments, expression of a marker refers to a surface density of the marker on a cell. Mean fluorescence intensity (MFI), for example, as used as a readout of flow cytometry, is representative of the density of a marker on a population of cells. A person of skill in the art will understand that MFI values are dependent on staining parameters (e.g., concentration, duration, and temperature) and fluorochrome composition. However, MFI can be quantitative when considered in the context of appropriate controls. For instance, a population of cells can be said to express a marker if the MFI of an antibody to that marker is significantly higher than the MFI of an appropriate isotype control antibody on the same population of cells, stained under equivalent conditions. Additionally, or alternatively, a population of cells can be said to express a marker on a cell-by-cell basis using a positive and negative gate according to conventional flow cytometry analytical methods (e.g., by setting the gate according to isotype or "fluorescence-minus-one" (FMO) controls). By this metric, a population can be said to "express" a marker if the number of cells detected positive for the marker is significantly higher than background (e.g., by gating on an isotype control).

As used herein, "functional expression of a VSV-G entry receptor" refers to a level of VSV-G entry receptor expression sufficient to mediate detectable VSV-G entry in at least 5% of the target population of cells, as measured by a beta-lactamase-Vpr (BlaM-VpR)-based assay. See, e.g., Cavrois et al., Nat Biotechnol. 11:1151-1154, 2002. Conversely, in a population of cells that "lacks functional expression of a VSV-G entry receptor," more than 95% of the cell population lacks the sufficient level of VSV-G entry receptor expression to mediate detectable VSV-G entry, as measured by a BlaM-VpR-based assay.

As used herein, when a population's expression is stated as a percentage of positive cells and that percentage is compared to a corresponding percentage of positive cells of a reference population, the percentage difference is a percentage of the parent population of each respective population. For example, if a marker is expressed on 10% of the cells of population A, and the same marker is expressed on 1% of the cells of population B, then population A is said to have a 9% greater frequency of marker-positive cells than population B (i.e., 10%−1%, not 10%÷1%). When a frequency is multiplied through by the number of cells in the parent population, the difference in absolute number of cells is calculated. In the example given above, if there are 100 cells in population A, and 10 cells in population B, then population A has 100-fold the number of cells relative to population B, i.e., (10%×100)÷(1%×10).

An expression level of a marker may be a nucleic acid expression level (e.g., a DNA expression level or an RNA expression level, e.g., an mRNA expression level). Any suitable method of determining a nucleic acid expression level may be used. In some embodiments, the nucleic acid expression level is determined using qPCR, rtPCR, RNA-seq, multiplex qPCR or RT-qPCR, microarray analysis, serial analysis of gene expression (SAGE), MASSARRAY® technique, in situ hybridization (e.g., FISH), or combinations thereof.

As used herein, a "reference population" of cells refers to a population of cells corresponding to the cells of interest, against which a phenotype of the cells of interest are measured. For example, a level of expression of a marker on a separated population of non-haematopoietic tissue-derived γδ cells may be compared to the level of expression of the same marker on a haematopoietic tissue-derived γδ T cell (e.g., a blood-resident 78 cell, e.g., a blood-resident γδ cell derived from the same donor or a different donor) or a non-haematopoietic tissue-derived γδ T cell expanded under different conditions (e.g., in the presence of substantial TCR activation, in the presence of an exogenous TCR activation agent (e.g., anti-CD3), or in substantial contact with stromal cells (e.g., fibroblasts)). A population may also be compared to itself at an earlier state. For example, a reference population can be a separated cell population prior to its expansion. In this case, the expanded population is compared to its own composition prior to the expansion step, i.e., its past composition, in this case, is the reference population.

As used herein, the term "chimeric antigen receptor" or alternatively a "CAR" refers to a recombinant polypeptide construct including an extracellular antigen binding domain, a transmembrane domain, and, optionally, an intracellular domain that propagates an activation signal that activates the cell and/or a costimulatory signal. In some embodiments, the CAR includes an optional leader sequence at the N-terminus of the CAR fusion protein. In some embodiments, the CAR lacks an intracellular (e.g., signaling) domain.

The terms "tether" or "tethered," as used herein refer to a polypeptide that, when present, joins the two or more polypeptides (e.g., an IL-15Rα or fragment thereof (e.g., a sushi domain) and IL-15 or a variant thereof). In general, a tether may be from about e.g., 1 to 100 (e.g., 5 to 50, 5 to 30, 5 to 20, e.g., 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 60, 70, 80, 90, or 100) amino acids in length. In some embodiments, the tether is highly flexible and may be rich in glycine (G) and/or serine (S) residues, which may be present in the form of GS repeats. In some embodiments, a tether may link a C-terminus of a first protein to an N-terminus of a second protein. In other embodiments, a tether may attach a C-terminus of the second protein to an N-terminus of the first protein.

As used herein, the term "percent (%) identity" refers to the percentage of amino acid residues of a candidate sequence, e.g., an IL-15Rβ variant, that are identical to the amino acid residues of a reference sequence, e.g., a wild-type IL-15Rβ polypeptide, after aligning the sequences and introducing gaps, if necessary, to achieve the maximum percent identity (i.e., gaps can be introduced in one or both of the candidate and reference sequences for optimal alignment and non-homologous sequences can be disregarded for comparison purposes). Alignment for purposes of determining percent identity can be achieved in various ways that are within the skill in the art, for instance, using publicly available computer software such as BLAST, ALIGN, or Megalign (DNASTAR) software. Those skilled in the art can determine appropriate parameters for measuring alignment, including any algorithms needed to achieve maximal alignment over the full length of the sequences being compared. In some embodiments, the percent amino acid sequence identity of a given candidate sequence to, with, or against a given reference sequence (which can alternatively be phrased as a given candidate sequence that has or includes a certain percent amino acid sequence identity to, with, or against a given reference sequence) is calculated as follows:

$$100 \times (\text{fraction of A/B})$$

where A is the number of amino acid residues scored as identical in the alignment of the candidate sequence and the reference sequence, and where B is the total number of amino acid residues in the reference sequence. In some embodiments where the length of the candidate sequence does not equal to the length of the reference sequence, the percent amino acid sequence identity of the candidate sequence to the reference sequence would not equal to the percent amino acid sequence identity of the reference sequence to the candidate sequence.

As used herein, a "2A peptide" refers to a class of 18-22 amino acid long peptides that share a core sequence motif of DxExNPGP, where X is any amino acid. The 2A peptide may be a foot-and-mouth disease virus 18 2A (F2A) peptide, an equine rhinitis A virus 2A (E2A) peptide, a porcine teschovirus-1 2A (P2A) peptide, or a thosea asigna virus 2A (T2A) peptide.

An "immune response" is as understood in the art, and generally refers to a biological response within a vertebrate against foreign agents or abnormal, e.g., cancerous cells, which response protects the organism against these agents and diseases caused by them. An immune response is mediated by the action of one or more cells of the immune system (for example, a T lymphocyte, B lymphocyte, natural killer (NK) cell, macrophage, eosinophil, mast cell, dendritic cell or neutrophil) and soluble macromolecules produced by any of these cells or the liver (including antibodies, cytokines, and complement) that results in selective targeting, binding to, damage to, destruction of, and/or elimination from the vertebrate's body of invading pathogens, cells or tissues infected with pathogens, cancerous or other abnormal cells, or, in cases of autoimmunity or pathological inflammation, normal human cells or tissues. An immune reaction includes, e.g., activation or inhibition of a T cell, e.g., an effector T cell, a Th cell, a CD4+ cell, a CD8+ T cell, or a Treg cell, or activation or inhibition of any other cell of the immune system, e.g., NK cell.

"Immunotherapy" refers to the treatment of a subject afflicted with, or at risk of contracting or suffering a recurrence of, a disease by a method comprising inducing, enhancing, suppressing or otherwise modifying the immune system or an immune response.

As used herein, the terms "treat," "treatment," or "treatment of" when used in the context of treating a disease or condition in a subject, e.g., a cancer, refer to reducing disease pathology, reducing or eliminating disease symptoms, promoting increased survival rates, and/or reducing discomfort. For example, treating can refer to the ability of a therapy when administered to a subject, to reduce one or more disease symptoms, signs, or causes. Treating also refers to mitigating or decreasing one or more clinical symptom and/or inhibition or delay in the progression of the condition and/or prevention or delay of the onset of a disease or illness.

As used herein, "cancer" refers a broad group of diseases characterized by the uncontrolled growth of abnormal cells in the body. Unregulated cell division can result in the formation of malignant tumors or cells that invade neighboring tissues and can metastasize to distant parts of the body through the lymphatic system or bloodstream.

As used herein, the term an "effective amount" or a "therapeutically effective amount" of an administered therapeutic substance, such as an immune cell comprising a polynucleotide encoding a CAR, is an amount sufficient to carry out a specifically stated or intended purpose, such as treating or treatment of cancer. An "effective amount" can be determined empirically in a routine manner in relation to the stated purpose.

As used herein, the terms "subject," "individual," or "patient," refer to any subject, particularly a mammalian subject, for whom diagnosis, prognosis, or therapy is desired. Mammalian subjects include, for example, humans, non-human primates, dogs, cats, guinea pigs, rabbits, rats, mice, horses, cattle, bears, and so on.

As used herein, the terms "ug" and "uM" are used interchangeably with "μg" and "μM," respectively.

Various aspects described herein are described in further detail in the following subsections.

II. Engineered γδ T Cells

II.A. γδ T cells expressing IL-15Rβ

The invention features engineered γδ T cells expressing a recombinant IL-15Rβ. Such engineered cells provide enhanced responsiveness to IL-15, even without further expression of additional IL15 receptor complex components. In some embodiments, the γδ T cell lacks an endogenous gene encoding IL-15. Such an engineered cell exhibits enhanced sensitivity to exogenous IL-15 for signaling.

In another embodiment, described herein is a γδ T cell expressing a recombinant IL-15Rβ and a recombinant IL-15 or variant thereof. In some embodiments, the recombinant IL-15 is a secreted IL-15 or variant thereof or a tethered IL-15 or variant thereof. Such an engineered cell exhibits continuous IL-15 signal and does not rely on exogenous IL-15 for signaling.

In some embodiments, the γδ T cell expressing a recombinant IL-15Rβ further expresses a recombinant IL-15Rα or fragment thereof (e.g., a soluble fragment, such as a sushi domain). The IL-15Rα or fragment thereof may be tethered to an IL-15 or variant thereof. In some embodiments, a C-terminus of the IL-15Rα or fragment thereof is tethered to an N-terminus of the IL-15 or variant thereof. In some embodiments, an N-terminus of the IL-15Rα or fragment thereof is tethered to a C-terminus of the IL-15 or variant thereof. Such an engineered cell further responsiveness as shown herein.

The various expressed transgenes described herein may be expressed in tandem, e.g., in a single construct. For example, in some embodiments, the IL-15Rβ and the IL-15Rα or fragment thereof are expressed in tandem. In some embodiments, the IL-15Rβ and the IL-15 or variant thereof are expressed in tandem. In some embodiments, the IL-15Rβ and the IL-15Rα or fragment thereof are expressed in tandem. In some embodiments, the IL-15Rβ, the IL-15 or variant thereof, and the recombinant IL-15Rα or fragment thereof are expressed in tandem.

One or more transgenes may include a linker therebetween. The IL-15Rβ and the IL-15Rα or fragment thereof may include a linker therebetween. The linker may include a cleavable peptide. The cleavable peptide may be, for example, a self-cleaving peptide, such as a 2A peptide. In some embodiments, the 2A peptide is a foot-and-mouth disease virus 18 2A (F2A) peptide, an equine rhinitis A virus 2A (E2A) peptide, a porcine teschovirus-1 2A (P2A) peptide, or a thosea asigna virus 2A (T2A) peptide. The IL-15Rβ and the IL-15 or variant thereof may include a linker therebetween. The linker may include a cleavable peptide. The cleavable peptide may be, for example, a self-cleaving peptide, such as a 2A peptide. In some embodiments, the 2A peptide is an F2A peptide, an E2A peptide, a P2A peptide, or a T2A peptide. 2A peptides, which are used to link two or more transgenes and allow the translated polypeptide to be self-cleaved into individual polypeptide chains (e.g., IL-15Rβ and IL-15Rα). Thus, in some embodiments, the transgene encodes a 2A peptide in between the first and second transgenes, optionally with a flexible linker flanking the 2A peptide (e.g., GSG linker). The transgene may further include one or more engineered cleavage sequences, e.g., a furin cleavage sequence to remove the 2A peptide residues attached to the peptide. Exemplary 2A peptides are described, e.g., in Chng et al. MAbs 7: 403-412, 2015, and Lin et al. Front. Plant Sci. 9:1379, 2018, the disclosures of which are hereby incorporated by reference in their entirety.

In some embodiments, the IL-15Rα or fragment thereof is tethered to the IL-15 or variant thereof. The tether may be a peptide linker of any suitable length, e.g., having from 1 to 100 (e.g., 5 to 50, 5 to 30, 5 to 20, e.g., 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 60, 70, 80, 90, or 100) amino acid residues. The linker may be a flexible linker, e.g., containing one or more glycines or serines.

Examples of armoring proteins are shown in Table 1.

TABLE 1

Armoring Proteins

| Armoring Protein | Sequence |
| --- | --- |
| IL-2Rβ | AVNGTSQFTCFYNSRANISCVWSQDGALQDTSCQVHAWPDRRRWNQTCELLPVSQASWACNLI<br>LGAPDSQKLTTVDIVTLRVLCREGVRWRVMAIQDFKPFENLRLMAPISLQVVHVETHRCNISW<br>EISQASHYFERHLEFEARTLSPGHTWEEAPLLTLKQKQEWICLETLTPDTQYEFQVRVKPLQG<br>EFTTWSPWSQPLAFRTKPAALGKDTIPWLGHLLVGLSGAFGFIILVYLLINCRNTGPWLKKVL<br>KCNTPDPSKFFSQLSSEHGGDVQKWLSSPFPSSSFSPGGLAPEISPLEVLERDKVTQLLLQQD<br>KVPEPASLSSNHSLTSCFTNQGYFFFHLPDALEIEACQVYFTYDPYSEEDPDEGVAGAPTGSS<br>PQPLQPLSGEDDAYCTFPSRDDLLLFSPSLLGGPSPPSTAPGGSGAGEERMPPSLQERVPRDW<br>DPQPLGPPTPGVPDLVDFQPPPELVLREAGEEVPDAGPREGVSFPWSRPPGQGEFRALNARLP<br>LNTDAYLSLQELQGQDPTHLV (SEQ ID NO: 1) |
| IL-15 | NWVNVISDLKKIEDLIQSMHIDATLYTESDVHPSCKVTAMKCFLLELQVISLESGDASIHDTV<br>ENLIILANNSLSSNGNVTESGCKECEELEEKNIKEFLQSFVHIVQMFINTS (SEQ ID NO: 2) |
| IL-15Rα | ITCPPPMSVEHADIWVKSYSLYSRERYICNSGFKRKAGTSSLTECVLNKATNVAHWTTPSLKC<br>IRDPALVHQRPAPPSTVTTAGVTPQPESLSPSGKEPAASSPSSNNTAATTAAIVPGSQLMPSK<br>SPSTGTTEISSHESSHGTPSQTTAKNWELTASASHQPPGVYPQGHSDTTVAISTSTVLLCGLS<br>AVSLLACYLKSRQTPPLASVEMEAMEALPVTWGTSSRDEDLENCSHHL (SEQ ID NO: 3) |
| P2A Linker | GSGATNFSLLKQAGDVEENPGP (SEQ ID NO: 4) |
| T2A Linker | GSGEGRGSLLTCGDVEENPGP (SEQ ID NO: 5) |
| Gly-Ser Linker | GGGGS (SEQ ID NO: 6) |
| Gly-Ser Linker | GGGGSGGGGS (SEQ ID NO: 7) |
| Gly-Ser Linker | GGGGSGGGGSGGGGS (SEQ ID NO: 8) |
| Gly-Ser Linker | GGGGSGGGGSGGGGSGGGGS (SEQ ID NO: 9) |
| Gly-Ser Linker | GGGGSGGGGSGGGGSGGGGSGGGS (SEQ ID NO: 10) |
| Gly-Ser Linker | GGGGSGGGGSGGGGSGGGS (SEQ ID NO: 11) |
| Gly-Ser Linker | GGGGSGGGGSGGGS (SEQ ID NO: 12) |
| Gly-Ser Linker | GGGGSGGGS (SEQ ID NO: 13) |

In some aspects, the IL-15Rα polypeptide comprises an amino acid sequence having at least about 70%, at least about 75%, at least about 80%, at least about 85%, at least about 90%, at least about 95% at least about 96%, at least about 97%, at least about 98%, or at least about 99% sequence identity to the amino acid sequence set forth in SEQ ID NO: 3. In some aspects, the IL-15Rα polypeptide comprises the amino acid sequence set forth in SEQ ID NO: 3. In some aspects, the IL-15Rα polypeptide comprises a signal peptide sequence.

In some aspects the IL-15 polypeptide comprises an amino acid sequence having at least about 70%, at least about 75% at least about 80%, at least about 85%, at least about 90%, at least about 95% at least about 96%, at least about 97% at least about 98%, or at least about 99% sequence identity to the amino acid sequence set forth in SEQ TD NO: 2. In some aspects, the IL-15 polypeptide comprises the amino acid sequence set forth in SEQ TD NO: 2. In some aspects, the IL-15 polypeptide comprises a signal peptide sequence.

In some aspects, the IL-15Rα polypeptide is tethered to the IL-15 polypeptide by a linker. For example, wherein IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3. In some aspects, the IL-15Rα polypeptide comprises the amino acid sequence set forth in SEQ ID NO: 3 and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2. In some aspects, the IL-15 polypeptide comprises the amino acid sequence set forth in SEQ ID NO: 2. In some aspects, the linker comprises one or more peptide bonds. In some aspects, the linker comprises a peptide linker. In some aspects, the peptide linker is a flexible linker. In some aspects, the linker is a rigid linker. In some aspects, the linker is a cleavable linker. In some aspects, the linker is a Gly-Ser linker. In some aspects, the linker comprises one or more repeats of the sequence GGGS, GGGS (SEQ ID NO: 6), or a combination thereof. In some aspects, the IL-15Rα polypeptide is tethered to the IL-15 polypeptide by a linker comprising the amino acid sequence set forth in SEQ ID NO: 7. In some aspects, the IL-15Rα polypeptide is tethered to the IL-15 polypeptide by a linker comprising the amino acid sequence set forth in SEQ ID NO: 8. In some aspects, the IL-15Rα polypeptide is tethered to the IL-15 polypeptide by a linker comprising the amino acid sequence set forth in SEQ ID NO: 9. In some aspects, the IL-15Rα polypeptide is tethered to the IL-15 polypeptide by a linker comprising the amino acid sequence set forth in SEQ ID NO: 10. In some aspects, the IL-15Rα polypeptide is tethered to the IL-15 polypeptide by a linker comprising the amino acid sequence set forth in SEQ ID NO: 11. In some aspects, the IL-15Rα polypeptide is tethered to the IL-15 polypeptide by a linker comprising the amino acid sequence set forth in SEQ ID NO: 12. In some aspects, the IL-15Rα polypeptide is tethered to the IL-15 polypeptide by a linker comprising the amino acid sequence set forth in SEQ ID NO: 13.

In some aspects, the construct comprising the IL-15Rα polypeptide is tethered to the IL-15 polypeptide is arranged from N-terminal to C-terminal according to the following order: (i) N-terminus, (ii) the IL-15 polypeptide, (iii) a peptide linker disclosed herein (e.g., a polypeptide comprising GGGS, GGGS (SEQ ID NO: 6), or a combination thereof; (iv) the IL-15Rα polypeptide; (v) C-terminus. In some aspects, the construct comprising the IL-15Rα polypeptide is tethered to the IL-15 polypeptide is arranged from N-terminal to C-terminal according to the following order: (i) N-terminus, (ii) an IL-15 polypeptide comprising the amino acid sequence set forth in SEQ ID NO: 2, (iii) a peptide linker disclosed herein (e.g., a polypeptide comprising GGGS, GGGS (SEQ ID NO: 6), or a combination thereof; (iv) an IL-15Rα polypeptide comprising the amino acid sequence set forth in SEQ ID NO: 3; (v) C-terminus.

In some aspects, the armor protein is expressed as a single polypeptide. In some aspects, the armor protein is expressed as a single polypeptide comprising (i) an IL-2Rβ polypeptide; (ii) a linker; and (iii) an IL-15Rα polypeptide tethered to an IL-15 polypeptide. In some aspects, the armor protein is expressed as a single polypeptide comprising (i) an IL-2Rβ polypeptide; (ii) a cleavable linker; and (iii) an IL-15Rα polypeptide tethered to an IL-15 polypeptide. In some aspects, the cleavable linker comprises a P2A sequence. In some aspects the linker comprises an amino acid sequence having at least about 80%, at least about 85%, at least about 90%, at least about 95%, at least about 96%, at least about 97%, at least about 98%, or at least about 99% sequence identity to the amino acid sequence set forth in SEQ ID NO: 4. In some aspects, the armor protein is expressed as a single polypeptide comprising (i) an IL-2Rβ polypeptide; (ii) a linker comprising the amino acid sequence set forth in SEQ ID NO: 4; and (iii) an IL-15Rα polypeptide tethered to an IL-15 polypeptide.

In some aspects, the armor protein is expressed as a single polypeptide comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the armor protein is expressed as a single polypeptide comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

II.B. γδ T Cells

γδ T cells represent a subset of T cells that express on their surface a distinct, defining γδ T-cell receptor (TCR). This TCR is made up of one gamma (γ) and one delta (δ) chain. Human γδ T cells can be broadly classified as one or two types peripheral blood-resident γδ T cells and non-haematopoietic tissue-resident γδ T cells. Most blood-resident γδ T cells express a Vδ2 TCR, whereas this is less common among tissue-resident γδ T cells, which more frequently use Vδ1 and/or other Vδ chains. The invention provides γδ T cells that are transduced with a viral vector encoding a desired transgene as described herein.

In some embodiments, suitable γδ T cells for use as a source for the presently described engineered γδ T cells include Vδ1 cells, Vδ2 cells, Vδ3 cells, Vδ5 cells, and Vδ8 cells. In some embodiments, the population of engineered γδ T cells is derived from a population of Vδ1 cells or Vδ2 cells. In some instances, the population of engineered γδ T cells is derived from a population of non-Vδ1/Vδ2 T cells. In some instances, population of engineered γδ T cells is derived from a mixed population of Vδ1 cells and Vδ2 cells.

The γδ T cells described herein (e.g., endogenous γδ T cells or primed γδ T cells) may lack a vesicular *stomatis* virus G glycoprotein (VSV-G) entry receptor (e.g., LDL). The γδ T cell (e.g., endogenous γδ T cells or primed γδ T cells) may express ASCT-1 and/or ASCT-2. The expression of ASCT-1 and/or ASCT-2 may permit transduction with a betaretroviral pseudotyped vector (e.g., BaEV and RD114). The lack of expression of VSV-G may prevent transduction with a VSV-G pseudotyped vector.

In one aspect, the invention provides a population of γδ T cells engineered to express one or more transgenes, which may encode a membrane-bound protein (e.g., a cell surface receptor, such as a chimeric antigen receptor (CAR), an αβ TCR, a natural cytotoxicity receptor (e.g., NKp30, NKp44, or NKp46), a cytokine receptor (e.g., IL-12 receptor), a chemokine receptor (e.g., CCR2 receptor), and/or a membrane-bound ligand or cytokine (e.g., membrane-bound IL-15, membrane-bound IL-7, membrane-bound CD40L, membrane-bound 4-1BB, membrane-bound 4-1BBL, membrane bound CCL19), a soluble protein (e.g., soluble ligands or cytokines, e.g., soluble IL-15, soluble IL-7, soluble IL-12, soluble CD40L, soluble 4-1BBL, and/or soluble CCL19), a selectable marker (e.g., a reporter gene), or a suicide gene.

In some instances, the invention provides a population of γδ T cells engineered to express IL-15Rβ, a CAR, and one or more additional transgene-encoded proteins (e.g., an armor protein). In some embodiments, the one or more transgenes are codon optimized.

In some embodiments, the γδ T cell is transduced with a viral vector encoding a transgene (e.g., IL-15Rβ and/or a CAR). In some embodiments, the viral vector is a retroviral vector. In some embodiments, the viral vector is a lentiviral vector. In some such embodiments, the cell may stably express the transgene. In some embodiments, the cell may transiently express the transgene.

In one aspect, the invention features a cell population (e.g., an isolated cell population) of engineered γδ T cells (e.g., at least 10, 10², 10³, 10⁴, 10⁵, 10⁶, 10⁷, 10⁸, 10⁹, 10¹⁰, 10¹¹, 10¹², or 10¹³ cells), wherein at least 3% (e.g., at least 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 97%, 99%, or substantially all) of the cell population are of engineered γδ T cells expressing a transgene (e.g., IL-15Rβ and/or a CAR and/or one or more additional proteins).

II.C. Chimeric Antigen Receptors

Some aspects of the present disclosure are directed to a population of γδ T cells (e.g., a population of Vd1+γδ cells derived from blood or skin) comprising γδ T cells comprising a heterologous nucleic acid encoding a CAR, wherein the CAR comprises an antigen-binding domain that specifically binds human mesothelin. In some aspects, the CAR comprises an antigen-binding domain that specifically binds human mesothelin (e.g., wherein the antigen-binding domain comprises a sequence of any of SEQ ID NOs: 1-8). In some aspects, the cells may further comprise a 4-1BB and CD3 zeta domain. In still a further aspect, the cells are directed to a population of γδ T cells (e.g., a population of Vd1+γδ cells derived from blood or skin) comprising γδ T cells comprising a heterologous nucleic acid encoding a CAR, wherein the CAR comprises an antigen-binding domain that specifically binds human mesothelin (e.g., wherein the antigen-binding domain comprises a sequence of any of SEQ ID NOs: 1-8), wherein the γδ T cells further comprise a CD8 transmembrane domain. In yet a further aspect, the cells are directed to a population of γδ T cells (e.g., a population of Vd1+γδ cells derived from blood or skin) comprising γδ T cells comprising a heterologous nucleic acid encoding a CAR, wherein the CAR comprises an antigen-binding domain that specifically binds human mesothelin (e.g., wherein the antigen-binding domain comprises a sequence of any of SEQ ID NOs: 1-8), wherein the γδ T cells further comprise (a) IL-15R-beta or (b)(i) IL-15R-alpha tethered with an IL-15 or variant thereof and (ii) IL-15R-beta. In a further aspect, the γδ T cells described herein comprising a heterologous nucleic acid encoding a CAR, wherein the CAR comprises an antigen-binding domain that specifically binds human mesothelin (e.g., wherein the antigen-binding domain comprises a sequence of any of SEQ ID NOs: 1-8), may further comprise a 4-1BB and CD3 zeta domain and/or a CD8 domain and (a) IL-15R-beta or (b)(i) IL-15R-alpha tethered with an IL-15 or variant thereof and (ii) IL-15R-beta.

In some aspects, the antigen-binding domain that specifically binds human mesothelin comprises a variable heavy (VH) complementarity-determining region-1 (CDR1), a VH-CDR2, a VH-CDR3, a variable light (VL) CDR-1, a VL-CDR2, and a VL-CDR3. In some aspects, the VH-CDR3 comprises the amino acid sequence set forth in SEQ ID NO: 16. In some aspects, the VH-CDR2 comprises the amino acid sequence set forth in SEQ ID NO: 15. In some aspects, the VH-CDR1 comprises the amino acid sequence set forth in SEQ ID NO: 14. In some aspects, the VL-CDR1 comprises the amino acid sequence set forth in SEQ ID NO: 17. In some aspects, the VL-CDR2 comprises the amino acid sequence set forth in SEQ ID NO: 18. In some aspects, the VL-CDR3 comprises the amino acid sequence set forth in SEQ ID NO: 19.

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises a VH-CDR1 comprising the amino acid sequence set forth in SEQ ID NO: 14; a VH-CDR2 comprising the amino acid sequence set forth in SEQ ID NO: 15; a VH-CDR3 comprising the amino acid sequence set forth in SEQ ID NO: 16; a VL-CDR1 comprising the amino acid sequence set forth in SEQ ID NO: 17; a VL-CDR2 comprising the amino acid sequence set forth in SEQ ID NO: 18; and a VL-CDR3 comprising the amino acid sequence set forth in SEQ ID NO: 19.

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises (i) a VH comprising an amino acid sequence having at least about 75%, at least about 80%, at least about 85%, at least about 90%, at least about 95%, at least about 96%, at least about 97%, at least about 98%, or at least about 99% sequence identity with the amino acid sequence set forth in SEQ ID NO: 20, (ii) a VL comprising an amino acid sequence having at least about 75%, at least about 80%, at least about 85%, at least about 90%, at least about 95%, at least about 96%, at least about 97%, at least about 98%, or at least about 99% sequence identity with the amino acid sequence set forth in SEQ ID NO: 21, or (iii) both (i) and (ii).

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises (i) a VH comprising the amino acid sequence set forth in SEQ ID NO: 20, (ii) a VL comprising the amino acid sequence set forth in SEQ ID NO: 21, or (iii) both (i) and (ii).

In some aspects, the antigen-binding domain that specifically binds human mesothelin comprises the P4 antigen-binding domain (Table 2).

In some aspects, the antigen-binding domain that specifically binds human mesothelin comprises a variable heavy (VH) complementarity-determining region-1 (CDR1), a VH-CDR2, a VH-CDR3, a variable light (VL) CDR-1, a VL-CDR2, and a VL-CDR3. In some aspects, the VH-CDR3 comprises the amino acid sequence set forth in SEQ ID NO: 24. In some aspects, the VH-CDR2 comprises the amino acid sequence set forth in SEQ ID NO: 23. In some aspects, the VH-CDR1 comprises the amino acid sequence set forth in SEQ ID NO: 22. In some aspects, the VL-CDR1 comprises the amino acid sequence set forth in SEQ ID NO: 25. In some aspects, the VL-CDR2 comprises the amino acid sequence set forth in SEQ ID NO: 26. In some aspects, the VL-CDR3 comprises the amino acid sequence set forth in SEQ ID NO: 27.

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises a VH-CDR1 comprising the amino acid sequence set forth in SEQ ID NO: 22; a VH-CDR2 comprising the amino acid sequence set forth in SEQ ID NO: 23; a VH-CDR3 comprising the amino acid sequence set forth in SEQ ID NO: 24; a VL-CDR1 comprising the amino acid sequence set forth in SEQ ID NO: 25; a VL-CDR2 comprising the amino acid sequence set forth in SEQ ID NO: 26; and a VL-CDR3 comprising the amino acid sequence set forth in SEQ ID NO: 27.

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises (i) a VH comprising an amino acid sequence having at least about 75%, at least about 80%, at least about 85%, at least about 90%, at least about 95%, at least about 96%, at least about 97%, at least about 98%, or at least about 99% sequence identity with the amino acid sequence set forth in SEQ ID NO: 28, (ii) a VL comprising an amino acid sequence having at least about 75%, at least about 80%, at least about 85%, at least about 90%, at least about 95%, at least about 96%, at least about 97%, at least about 98%, or at least about 99% sequence identity with the amino acid sequence set forth in SEQ ID NO: 29, or (iii) both (i) and (ii).

In some aspects, the γδ T cells (e.g., of a population of Vd1+γδ cells derived from blood or skin) comprise a heterologous nucleic acid molecule encoding a CAR, wherein the CAR comprises an antigen-binding domain that specifically binds human mesothelin, and wherein the CAR comprises (i) a VH comprising the amino acid sequence set forth in SEQ ID NO: 28, (ii) a VL comprising the amino acid sequence set forth in SEQ ID NO: 29, or (iii) both (i) and (ii).

TABLE 2

| P4 Antigen-Binding Domain Amino Acid Sequences | |
|---|---|
| P4 | |
| Anti-Meso. HC-CDR1 | GDSVSSNSAT (SEQ ID NO: 14) |
| Anti-Meso. HC-CDR2 | TYYRSKWYN (SEQ ID NO: 15) |
| Anti-Meso. HC-CDR3 | ARGMMTYYYGMDV (SEQ ID NO: 16) |
| Anti-Meso. LC-CDR1 | SGINVGPYR (SEQ ID NO: 17) |
| Anti-Meso. LC-CDR2 | YKSDSDK (SEQ ID NO: 18) |
| Anti-Meso. LC-CDR3 | MIWHSSAAV (SEQ ID NO: 19) |
| Anti-Meso. VH | QVQLQQSGPGLVTPSQTLSLTCAISGDSVSSNS ATWNWIRQSPSRGLEWLGRTYYRSKWYNDYAVS VKSRMSINPDTSKNQFSLQLNSVTPEDTAVYYC ARGMMTYYYGMDVWGQGTTVTVSSGILGS (SEQ ID NO: 20) |

TABLE 2-continued

| P4 Antigen-Binding Domain Amino Acid Sequences | |
|---|---|
| Anti-Meso. VL | QPVLTQSSSLSASPGASASLTCTLRSGINVGPY RIYWYQQKPGSPPQYLLNYKSDSDKQQGSGVPS RFSGSKDASANAGVLLISGLRSEDEADYYCMIW HSSAAVFGGGTQLTVLS (SEQ ID NO: 21) |
| YP218 | |
| Anti-Meso. HC-CDR1 | FYFYAC (SEQ ID NO: 22) |
| Anti-Meso. HC-CDR2 | CIYTAGSGSTYYASWAKG (SEQ ID NO: 23) |
| Anti-Meso. HC-CDR3 | TANTRSTYYLNLW (SEQ ID NO: 24) |
| Anti-Meso. LC-CDR1 | ASQRISSYLS (SEQ ID NO: 25) |
| Anti-Meso. LC-CDR2 | GASTLAS (SEQ ID NO: 26) |
| Anti-Meso. LC-CDR3 | SYAYFDSNNWHAF (SEQ ID NO: 27) |
| Anti-Meso. VH | MEVQLVESGGGLVQPGGSLRLSCAASGFDLGFY FYACWVRQAPGKGLEWVSCIYTAGSGSTYYASW AKGRFTISRDNSKNTLYLQMNSLRAEDTAVYYC ARSTANTRSTYYLNLWGQGTLVTV (SEQ ID NO: 28) |
| Anti-Meso. VL | DIQMTQSPSSLSASVGDRVTITCQASQRISSYL SWYQQKPGKVPKLLIYGASTLASGVPSRFSGSG SGTDFTLTISSLQPEDVATYYCQSYAYFDSNNW HAFGGGTKVEI (SEQ ID NO: 29) |

In some aspects, the CAR further comprises a hinge region between the antigen-binding domain and the transmembrane domain. In some aspects, the hinge is derived from an immunoglobulin (e.g., derived from hinge regions or loop regions). In certain aspects, these hinges comprise, e.g., IgA1, IgA2, IgG1, IgG2, IgG3, IgG4, IgD, IgE, or IgM hinge regions, fragments thereof (alone or capped by additional sequences, e.g., CH1 or CH2 regions sequences), or combinations of fragments from IgA1, IgA2, IgG1, IgG2, IgG3, IgG4, IgD, IgE, or IgM hinge regions. In some aspects, the hinges comprise, e.g., IgA1, IgA2, IgG1, IgG2, IgG3, IgG4, IgD, IgE, or IgM constant domain loop regions, fragments thereof (alone or capped by additional sequences, e.g., from adjacent β-strands), or combinations of fragments from IgA1, IgA2, IgG1, IgG2, IgG3, IgG4, IgD, IgE, or IgM loop regions. In some aspects, the hinge of the present disclosure comprises hinge region derived sequences, loop region derived sequences, or combinations thereof.

In some aspects, the hinge region is selected from a CD8 hinge, a CD28 hinge, and an immunoglobulin hinge. In some aspects, the hinge comprises a CD28 hinge. In some aspects, the CAR comprises a hinge comprising an amino acid sequence having at least about 70%, at least about 75%, at least about 80%, at least about 85%, at least about 90%, at least about 95%, at least about 96%, at least about 97%, at least about 98%, at least about 99% sequence identity to the amino acid sequence set forth in SEQ ID NO: 30 (Table 3). In some aspects, the CAR comprises a hinge comprising the amino acid sequence set forth in SEQ ID NO: 30.

TABLE 3

CAR Sequences

| Element | Amino Acid Sequence |
| --- | --- |
| Hinge Region (CD28) | IEVMYPPPYLDNEKSNGTIIHVKGKHLCPSP LFPGPSKP (SEQ ID NO: 30) |
| TM Domain (CD28) | FWVLVVVGGVLACYSLLVTVAFIIFWV (SEQ ID NO: 31) |
| Hinge Region (CD8) | TTTPAPRPPTPAPTIASQPLSLRPEACRPAA GGAVHTRGL (SEQ ID NO: 32) |
| TM Domain (CD8) | DFACDIYIWAPLAGTCGVLLLSLVITLYC (SEQ ID NO: 33) |
| Costim. Region (4-1BB) | KRGRKKLLYIFKQPFMRPVQTTQEEDGCSCR FPEEEEGGCEL (SEQ ID NO: 34) |
| Intracellular signaling domain (CD3z) | RVKFSRSADAPAYQQGQNQLYNELNLGRREE YDVLDKRRGRDPEMGGKPRRKNPQEGLYNEL QKDKMAEAYSEIGMKGERRRGKGHDGLYQGL STATKDTYDALHMQALPPR (SEQ ID NO: 35) |

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv)), (ii) a hinge region comprising the hinge region of CD28, (iii) a transmembrane domain, and (iv) an intracellular domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region comprising the amino acid sequence set forth in SEQ ID NO: 30, (iii) a transmembrane domain, and (iv) an intracellular domain.

In some aspects, the hinge comprises a CD8 hinge. In some aspects, the CAR comprises a hinge comprising an amino acid sequence having at least about 70%, at least about 75%, at least about 80%, at least about 85%, at least about 90%, at least about 95%, at least about 96%, at least about 97%, at least about 98%, at least about 99% sequence identity to the amino acid sequence set forth in SEQ ID NO: 32 (Table 3). In some aspects, the CAR comprises a hinge comprising the amino acid sequence set forth in SEQ ID NO: 32.

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region comprising the hinge region of CD8, (iii) a transmembrane domain, and (iv) an intracellular domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region comprising the amino acid sequence set forth in SEQ ID NO: 32, (iii) a transmembrane domain, and (iv) an intracellular domain.

In some aspects, the CAR further comprises a transmembrane domain. The transmembrane domain can be derived either from a natural or from a recombinant source. Where the source is natural, the domain can be derived from any membrane-bound or transmembrane protein. In some aspects, the transmembrane domain is capable of signaling to the intracellular domain(s) whenever the CAR of the present disclosure has bound to a target.

In some aspects, a transmembrane domain can include at least the transmembrane region(s) of, e.g., CD8, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), NKp44, NKp30, NKp46, CD160, CD19, IL2R beta, IL2R gamma, IL7R α, ITGA1, VLA1, CD49a, ITGA4, IA4, CD49D, ITGA6, VLA-6, CD49f, ITGAD, CD11 d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKG2D, NKG2C, or CD19.

In some aspects, the TM domain is derived from CD8, CD2, CD4, CD28, CD45, PD1, CD152, or any combination thereof. In some aspects, the TM domain is derived from CD28. In some aspects, the TM domain comprises an amino acid sequence having at least about 60%, at least about 70%, at least about 80%, at least about 90%, at least about 95%, at least about 96%, at least about 97%, at least about 98%, or at least about 99% sequence identity to SEQ ID NO: 31. In certain aspects, the TM domain comprises the amino acid sequence set forth in SEQ ID NO: 31.

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a CD28 transmembrane domain, and (iv) an intracellular domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain comprising the amino acid sequence set forth in SEQ ID NO: 31, and (iv) an intracellular domain.

In some aspects, the TM domain is derived from CD8. In some aspects, the TM domain comprises an amino acid sequence having at least about 60%, at least about 70%, at least about 80%, at least about 90%, at least about 95%, at least about 96%, at least about 97%, at least about 98%, or at least about 99% sequence identity to SEQ ID NO: 33. In certain aspects, the TM domain comprises the amino acid sequence set forth in SEQ ID NO: 33.

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a CD8 transmembrane domain, and (iv) an intracellular domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain comprising the amino acid sequence set forth in SEQ ID NO: 33, and (iv) an intracellular domain.

In some aspects, the CAR further comprises a costimulatory domain. In some aspects, the costimulatory domain comprises a costimulatory domain of 4-1BB/CD137, interleukin-2 receptor (IL-2R), interleukin-12 receptor (IL-12R), IL-7, IL-21, IL-23, IL-15, CD2, CD3, CD4, CD7, CD8, CD27, CD28, CD30, CD40, ICOS, lymphocyte function-associated antigen-1 (LFA-1), LIGHT, NKG2C, OX40, DAP10, B7-H3, CD28 deleted for Lck binding (ICA), BTLA, GITR, HVEM, LFA-1, LIGHT, NKG2C, PD-1, TILR2, TILR4, TILR7, TILR9, Fc receptor gamma chain, Fc receptor F chain, a ligand that specifically binds with CD83, or any combination thereof. In some aspects, the CAR comprises a 4-1BB costimulatory domain.

In some aspects, the costimulatory domain comprises an amino acid sequence having at least about 60%, at least about 70%, at least about 80%, at least about 90%, at least about 95%, at least about 96%, at least about 97%, at least about 98%, or at least about 99% sequence identity to SEQ ID NO: 34. In certain aspects, the costimulatory domain comprises the amino acid sequence set forth in SEQ ID NO: 34.

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain, (vi) a costimulatory domain, and (v) an intracellular signaling domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain, (vi) a 4-1BB costimulatory domain, and (v) an intracellular signaling domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain, (iv) a costimulatory domain comprising the amino acid sequence set forth in SEQ ID NO: 34; and (v) an intracellular signaling domain.

In some aspects, the CAR further comprises an intracellular signaling domain. In some aspects, the intracellular signaling domain comprises a CD3 (activating domain, a CD3δ activating domain, a CD3ε activating domain, a CD3η activating domain, a CD79A activating domain, a DAP 12 activating domain, a FCER1G activating domain, a DAP10/CD28 activating domain, a ZAP70 activating domain, or any combination thereof. In some aspects, the intracellular signaling domain comprises a CD3ζ activating domain.

In some aspects, the intracellular signaling domain comprises an amino acid sequence having at least about 70%, at least about 75%, at least about 80%, at least about 85%, at least about 90%, at least about 95%, at least about 96%, at least about 97%, at least about 98%, or at least about 99% sequence identity to SEQ ID NO: 35. In certain aspects, the intracellular signaling domain comprises the sequence set forth in SEQ ID NO: 35.

Accordingly, in some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain, (vi) a costimulatory domain, and (v) an intracellular signaling domain comprising CD3 ζ activating domain. In some aspects, the present disclosure provides a CAR (or a polynucleotide encoding a CAR), wherein the CAR comprises (i) an antigen-binding domain that specifically binds mesothelin (e.g., anti-mesothelin scFv), (ii) a hinge region, (iii) a transmembrane domain, (iv) a costimulatory domain; and (v) an intracellular signaling domain comprising the amino acid sequence set forth in SEQ ID NO: 35.

II.D. Armored CAR-γδ T Cells

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 20 and a VL comprising an amino acid sequence having at least about 90%, at least about 95%, at least about 96%, at least about 98%, at least about 98%, or at least about 99% sequence identity to the amino acid sequence set forth in SEQ ID NO: 21; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T (e.g., a Vd1+ cell) cell comprises (A) a CAR, comprising (i) an antigen-binding domain that specifically binds human mesothelin, wherein the antigen-binding domain comprises a VH comprising the amino acid sequence set forth in SEQ ID NO: 20 and a VL comprising the amino acid sequence set forth in SEQ ID NO: 21; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 15; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2

In some aspects, the engineered γδ T (e.g., a Vd1+ cell) cell comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 20 and a VL comprising an amino acid sequence having at least about 90%, at least about 95%, at least about 96%, at least about 98%, at least about 98%, or at least about 99% sequence identity to the amino acid sequence set forth in SEQ ID NO: 21; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising the amino acid sequence set forth in SEQ ID NO: 20 and a VL comprising the amino acid sequence set forth in SEQ ID NO: 21; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 28 and a VL comprising an amino acid sequence having at least about 90%, at least about 95%, at least about 96%, at least about 98%, at least about 98%, or at least about 99% sequence identity to the amino acid sequence set forth in SEQ ID NO: 29; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising the amino acid sequence set forth in SEQ ID NO: 28 and a VL comprising the amino acid sequence set forth in SEQ ID NO: 29; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 15; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ TD NO: 25, a VL-CDR2 comprising the amino acid sequence set forth in SEQ TD NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 28 and a VL comprising an amino acid sequence having at least about 90%, at least about 95%, at least about 96%, at least about 98%, at least about 98%, or at least about 99% sequence identity to the amino acid sequence set forth in SEQ ID NO: 29; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the engineered γδ T cell (e.g., a Vd1+ cell) comprises (A) a CAR, comprising (i) an antigen-binding domain that specifically binds human mesothelin, wherein the antigen-binding domain comprises a VH comprising the amino acid sequence set forth in SEQ ID NO: 28 and a VL comprising the amino acid sequence set forth in SEQ ID NO: 29; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

III. Methods of Transduction

In one aspect, the invention provides a method for producing a population of engineered γδ T cells by transducing a population of γδ T cells (e.g., Vδ1 T cells, Vδ2 T cells, and/or non-Vδ1/Vδ2 T cells), with a polynucleotide, e.g., a viral vector, e.g., retroviral vector. The method includes providing a population of γδ T cells and transducing the population of γδ T cells with a polynucleotide encoding the IL-15Rβ, thereby producing the population of γδ T cells expressing the recombinant IL-15Rβ. The method may further include transducing the starting population of γδ T cells with a polynucleotide encoding an IL-15 receptor α subunit or a fragment thereof. In other embodiments, the method includes producing a population of γδ T cells expressing a recombinant IL-15Rβ and an IL-15 or variant thereof. The method includes providing a population of γδ T cells, transducing the population of γδ T cells with a polynucleotide encoding the IL-15Rβ, and transducing the population of γδ T cells with a polynucleotide encoding the IL-15 or variant thereof, thereby producing the population of γδ T cells expressing the recombinant IL-15Rβ and the IL-15 or variant thereof. The method may include transducing the starting population of γδ T cells with a polynucleotide encoding an IL-15 receptor α subunit or a fragment thereof. The methods described herein may further include transducing the cells with a polynucleotide encoding a CAR.

In another aspect, the invention provides a method of producing a population of engineered γδ T cells by providing a starting population of γδ T cells, priming the γδ T cells in the absence of a viral vector, and culturing the population of primed γδ T cells in the presence of a viral vector in an amount effective to transduce at least 3% (e.g., at least 4%, 5%, 6%, 7%, 8%, 9% 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 97%, 99%, or substantially all) of the primed γδ T cells. In some embodiments, the population of primed γδ T cells is cultured in the presence of a viral vector in an amount effective to transduce at least 5% of the primed γδ T cells. In some embodiments, the population of primed γδ T cells is cultured in the presence of a viral vector in an amount effective to transduce at least 20% of the primed γδ T cells.

The primed γδ T cells may be obtained by culturing the starting population of γδ T cells in the absence of a viral vector. For example, the starting population of γδ T cells may be cultured for a first culture period of at least 1 hour (e.g., at least 2 hours, 3 hours, 4 hours, 5 hours, 6 hours, 12 hours, 1 day, 2 days, 3 days, 4 days, 5 days, 6 days, 7 days, 8 days, 9 days, 10 days, 11 days, 12 days, 13 days, 14 days, or longer, e.g., from about 1 hour to about 14 days, from about 6 hours to about 14 days, from about 1 day to about 14 days, from about 2 days to about 14 days, from about 5 days to about 14 days, from about 7 days to about 14 days, from about 5 days to about 10 days, from about 5 days to about 7 days, or from about 7 days to about 10 days). When the primed γδ T cells are obtained, e.g., following culturing of the cells in the absence of a viral vector, the primed γδ T cells may be further cultured for a second culture period of at least 1 day (e.g., at least 2 days, 3 days, 4 days, 5 days, 6 days, 7 days, 8 days, 9 days, 10 days, 11 days, 12 days, 13 days, 14 days, or longer, e.g., from about 1 day to about 14 days, from about 2 days to about 14 days, from about 5 days to about 14 days, from about 7 days to about 14 days, from about 5 days to about 10 days, from about 5 days to about 7 days, or from about 7 days to about 10 days). The second culture period may be from about 1 day to about 14 days (e.g., from about 3 days to about 14 days, from about 3 days to about 12 days, from about 4 days to about 1 days, from about 5 days to about 10 days, or from about 5 days to about 7 days).

In some embodiments, the viral vector is cultured with the primed γδ T cells at a multiplicity of infection (MOI) of no greater than about 10, e.g., no greater than about 9, 8, 7, 6, 5, 4, 3, 2, 1, 0.5, or 0.25. In some embodiments, viral vector is cultured with the primed γδ T cells at a multiplicity of infection (MOI) of no greater than about 5. In some embodiments, viral vector is cultured with the primed γδ T cells at a multiplicity of infection (MOI) of no greater than about 4. In some embodiments, viral vector is cultured with the primed γδ T cells at a multiplicity of infection (MOI) of no greater than about 3. In some embodiments, viral vector is cultured with the primed γδ T cells at a multiplicity of infection (MOI) of no greater than about 2. In some embodiments, viral vector is cultured with the primed γδ T cells at a multiplicity of infection (MOI) of no greater than about 1. In some embodiments, viral vector is cultured with the primed γδ T cells at a multiplicity of infection (MOI) of no greater than about 0.5. In some embodiments, viral vector is cultured with the primed γδ T cells at a multiplicity of infection (MOI) of no greater than about 0.25. In some embodiments, viral vector is cultured with the primed γδ T cells at a multiplicity of infection (MOI) of from about 0.25 to about 10 (e.g., about 0.5 to about 10, about 1 to about 10, or about 1 to about 5).

In some embodiments, transduction of γδ T cells includes the use of a transduction enhancer to enhance transduction efficiency. Suitable transduction enhancers include, e.g., vectorfusin, spermid, and/or retronectin. The methods may include contacting the γδ T cells with the transduction enhancer during culturing. In some embodiments, the method further includes contact the cells with nevirapine. In some embodiments, transduction of γδ T cells includes supplementing the culture medium with IL-15, which can increase γδ T cell expression of ASCT-2, the viral entry receptor for a betaretroviral pseudotyped viral vector.

IV. Viral Vectors

The compositions and methods described herein include the use of viral vectors for efficient transduction of γδ T cells. Viral genomes provide a rich source of vectors that can be used for the efficient delivery of exogenous genes into a mammalian cell. Viral genomes are particularly useful vectors for gene delivery as the polynucleotides contained within such genomes are typically incorporated into the nuclear genome of a mammalian cell by generalized or specialized transduction. These processes occur as part of the natural viral replication cycle, and do not require added proteins or reagents in order to induce gene integration. Examples of viral vectors include retrovirus (e.g., Retroviridae family viral vector). Examples of retroviruses are avian leukosis-sarcoma, avian C-type viruses, mammalian C-type, B-type viruses, D-type viruses, oncoretroviruses, HTLV-BLV group, lentivirus, alpharetrovirus, betaretrovirus, gammaretrovirus, spumavirus (Coffin, J. M., Retroviridae: The viruses and their replication, Virology, Third Edition (Lippincott-Raven, Philadelphia, (1996))). Other examples are murine leukemia viruses (MLVs), murine sarcoma viruses, mouse mammary tumor virus, bovine leukemia virus, feline leukemia virus, feline sarcoma virus, avian leukemia virus, human T-cell leukemia virus, baboon endogenous virus (BaEV), Gibbon ape leukemia virus, Mason Pfizer monkey virus, simian immunodeficiency virus, simian sarcoma virus, Rous sarcoma virus, and lentiviruses.

IV.A. Retroviral Vectors

In some instances, the viral vector used in the methods and compositions described herein is a retroviral vector. One type of retroviral vector that may be used in the methods and compositions described herein is a lentiviral vector. Lentiviral vectors (LVs), a subset of retroviruses, transduce a wide range of dividing and non-dividing cell types with high efficiency, conferring stable, long-term expression of the transgene. An overview of optimization strategies for packaging and transducing LVs is provided in Delenda, The Journal of Gene Medicine 6: S125, 2004, the disclosure of which is incorporated herein by reference.

The use of lentivirus-based gene transfer techniques relies on the in vitro production of recombinant lentiviral particles carrying a highly deleted viral genome in which the transgene of interest is accommodated. In particular, the recombinant lentivirus are recovered through the in trans coexpression in a permissive cell line of (1) the packaging constructs, i.e., a vector expressing the Gag-Pol precursors together with Rev (alternatively expressed in trans); (2) a vector expressing an envelope protein, generally of an heterologous nature; and (3) the transfer vector, consisting in the viral cDNA deprived of all open reading frames, but maintaining the sequences required for replication, encapsidation, and expression, in which the sequences to be expressed are inserted.

A LV used in the methods and compositions described herein may include one or more of a 5'-Long terminal repeat (LTR), HIV signal sequence, HIV Psi signal 5'-splice site (SD), delta-GAG element, Rev Responsive Element (RRE), 3'-splice site (SA), elongation factor (EF) 1-alpha promoter and 3'-self inactivating LTR (SIN-LTR). The lentiviral vector optionally includes a central polypurine tract (cPPT) and a woodchuck hepatitis virus post-transcriptional regulatory element (WPRE), as described in U.S. Pat. No. 6,136,597, the disclosure of which is incorporated herein by reference as it pertains to WPRE. The lentiviral vector may further include a pHR' backbone, which may include for example as provided below.

The Lentigen LV described in Lu et al., Journal of Gene Medicine 6:963, 2004, may be used to express the DNA molecules and/or transduce cells. A LV used in the methods and compositions described herein may a 5'-Long terminal repeat (LTR), HIV signal sequence, HIV Psi signal 5'-splice site (SD), delta-GAG element, Rev Responsive Element (RRE), 3'-splice site (SA), elongation factor (EF) 1-alpha promoter and 3'-self inactivating L TR (SIN-LTR). It will be readily apparent to one skilled in the art that optionally one or more of these regions is substituted with another region performing a similar function.

Enhancer elements can be used to increase expression of modified DNA molecules or increase the lentiviral integration efficiency. The LV used in the methods and compositions described herein may include a nef sequence. The LV used in the methods and compositions described herein may include a cPPT sequence which enhances vector integration. The cPPT acts as a second origin of the (+)-strand DNA synthesis and introduces a partial strand overlap in the middle of its native HIV genome. The introduction of the cPPT sequence in the transfer vector backbone strongly increased the nuclear transport and the total amount of genome integrated into the DNA of target cells. The LV used in the methods and compositions described herein may include a Woodchuck Posttranscriptional Regulatory Element (WPRE). The WPRE acts at the transcriptional level, by promoting nuclear export of transcripts and/or by increasing the efficiency of polyadenylation of the nascent transcript, thus increasing the total amount of mRNA in the cells. The addition of the WPRE to LV results in a substantial improvement in the level of transgene expression from several different promoters, both in vitro and in vivo. The LV used in the methods and compositions described herein may include both a cPPT sequence and WPRE sequence. The vector may also include an IRES sequence that permits the expression of multiple polypeptides from a single promoter.

In addition to IRES sequences, other elements which permit expression of multiple polypeptides are useful. The vector used in the methods and compositions described herein may include multiple promoters that permit expression more than one polypeptide. The vector used in the methods and compositions described herein may include a protein cleavage site that allows expression of more than one polypeptide. Examples of protein cleavage sites that allow expression of more than one polypeptide are described in Klump et al., Gene Ther.; 8:811, 2001, Osborn et al., Molecular Therapy 12:569, 2005, Szymczak and Vignali, Expert Opin. Biol. Ther. 5:627, 2005, and Szymczak et al., Nat. Biotechnol. 22:589, 2004, the disclosures of which are incorporated herein by reference as they pertain to protein cleavage sites that allow expression of more than one polypeptide. It will be readily apparent to one skilled in the art that other elements that permit expression of multiple polypeptides identified in the future are useful and may be utilized in the vectors suitable for use with the compositions and methods described herein.

Other retroviral vectors (e.g., retroviral backbones) that may be used in conjunction with the compositions and methods described herein include gammaretroviral vectors. Exemplary gamma retroviral vectors are, or are derived from, chick syncytial virus, feline leukemia virus, finkel-biskis-jinkins murine sarcoma virus, gardner-arnstein feline sarcoma virus, gibbon ape leukemia virus, guinea pig type-c oncovirus, hardy-zuckerman feline sarcoma virus, harvey murine sarcoma virus, kirsten murine sarcoma virus, koala retrovirus, moloney murine sarcoma virus, murine leukemia virus, porcine type-c oncovirus, reticuloendotheliosis virus, snyder-theilen feline sarcoma virus, trager duck spleen necrosis virus, viper retrovirus, and woolly monkey sarcoma virus.

In certain embodiments, the viral vector backbone is derived from a lentivirus (LV). In certain embodiments, the viral vector backbone is derived from a third-generation self-inactivation (SIN) lentiviral vector (LV) (e.g., HIV, SIV, or EIAV). In certain embodiments, the viral vector backbone is derived from a LV (e.g.) that is not self-inactivating.

Other retroviral vectors (e.g., retroviral backbones) that may be used in conjunction with the compositions and methods described herein include alpharetroviral vectors. Exemplary alpharetroviral vectors are, or are derived from, avian carcinoma mill hill virus 2, avian leukosis virus, avian myeloblastosis virus, avian myelocytomatosis virus 29, avian sarcoma virus ct10, fujinami sarcoma virus, rous sarcoma virus, ur2 sarcoma virus, and y73 sarcoma virus.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 20 and a VL comprising an amino acid sequence having at least about 90%, at least about 95%, at least about 96%, at least about 98%, at least about 98%, or at least about 99% sequence identity to the amino acid sequence set forth in SEQ ID NO: 21; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising the amino acid sequence set forth in SEQ ID NO: 20 and a VL comprising the amino acid sequence set forth in SEQ ID NO: 21; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the portion of the polynucleotide encoding (A) the CAR and the portion of the polynucleotide encoding (B) the armor protein are connected by a portion of the polynucleotide that encodes a linker. In some aspects, the linker comprises a peptide bond. In some aspects, the linker comprises one or more amino acids. In some aspects, the linker is a cleavable linker. In some aspects, the linker comprises a T2A linker. In some aspects, the linker comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 5. In some aspects, the linker comprises the amino acid sequence set forth in SEQ ID NO: 5.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 20 and a VL comprising an amino acid sequence having at least about 90%, at least about 95%, at least about 96%, at least about 98%, at least about 98%, or at least about 99% sequence identity to the amino acid sequence set forth in SEQ ID NO: 21; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 14, a VH-CDR2 comprising the amino acid sequence set forth in SEQ ID NO: 15, a VH-CDR3 comprising the amino acid sequence set forth in SEQ ID NO: 16, a VL-CDR1 comprising the amino acid sequence set forth in SEQ ID NO: 17, a VL-CDR2 comprising the amino acid sequence set forth in SEQ ID NO: 18, and a VL-CDR3 comprising the amino acid sequence set forth in SEQ ID NO: 19; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising the amino acid sequence set forth in SEQ ID NO: 20 and a VL comprising the amino acid sequence set forth in SEQ ID NO: 21; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the portion of the polynucleotide encoding (A) the CAR and the portion of the polynucleotide encoding (B) the armor protein are connected by a portion of the polynucleotide that encodes a linker. In some aspects, the linker comprises a peptide bond. In some aspects, the linker comprises one or more amino acids. In some aspects, the linker is a cleavable linker. In some aspects, the linker comprises a T2A linker. In some aspects, the linker comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 5. In some aspects, the linker comprises the amino acid sequence set forth in SEQ ID NO: 5

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 28 and a VL comprising an amino acid sequence having at least about 90%, at least about 95%, at least about 96%, at least about 98%, at least about 98%, or at least about 99% sequence identity to the amino acid sequence set forth in SEQ ID NO: 29; (ii) a hinge region comprising an amino acid sequence having at least about 90%, at least about 95%, at least about 96%, at least about 98%, at least about 98%, or at least about 99% sequence identity to the sequence set forth in SEQ ID NO: 30; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 31; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising the amino acid sequence set forth in SEQ ID NO: 28 and a VL comprising the amino acid sequence set forth in SEQ ID NO: 29; (ii) a hinge region comprising amino acid sequence set forth in SEQ ID NO: 30; (iii) a transmembrane domain comprising the amino acid sequence set forth in SEQ ID NO: 31; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the portion of the polynucleotide encoding (A) the CAR and the portion of the polynucleotide encoding (B) the armor protein are connected by a portion of the polynucleotide that encodes a linker. In some aspects, the linker comprises a peptide bond. In some aspects, the linker comprises one or more amino acids. In some aspects, the linker is a cleavable linker. In some aspects, the linker comprises a T2A linker. In some aspects, the linker comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 5. In some aspects, the linker comprises the amino acid sequence set forth in SEQ ID NO: 5.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1. In some aspects, the engineered γδ T cell does not comprise an IL-15Rα polypeptide or an IL-15 polypeptide.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising an amino acid sequence having at least about 90%, at least about 95%, at least about 96%, at least about 98%, at least about 98%, or at least about 99% sequence identity to the amino acid sequence set forth in SEQ ID NO: 28 and a VL comprising an amino acid sequence having at least about 90%, at least about 95%, at least about 96%, at least about 98%, at least about 98%, or at least about 99% sequence identity to the amino acid sequence set forth in SEQ ID NO: 29; (ii) a hinge region comprising an amino acid sequence having at least about 90%, at least about 95%, at least about 96%, at least about 98%, at least about 98%, or at least about 99% sequence identity to the sequence set forth in SEQ ID NO: 32; (iii) a transmembrane domain comprising an amino acid sequence having at least about 90%, at least about 95%, at least about 96%, at least about 98%, at least about 98%, or at least about 99% sequence identity to the sequence set forth in SEQ ID NO: 33; (iv) a costimulatory domain comprising an amino acid sequence having at least about 90%, at least about 95%, at least about 96%, at least about 98%, at least about 98%, or at least about 99% sequence identity to the sequence set forth in SEQ ID NO: 34; and (v) an intracellular signaling domain comprising an amino acid sequence having at least about 90%, at least about 95%, at least about 96%, at least about 98%, at least about 98%, or at least about 99% sequence identity to the sequence set forth in SEQ ID NO: 35; and (B) an armor protein, comprising (i) an IL-2Rβ polypeptide comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 1; (ii) a linker comprising an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 4; and (iii) an IL-15Rα polypeptide tethered to an IL-15 polypeptide; wherein the IL-15Rα polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 3; and wherein the IL-15 polypeptide comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH-CDR1 comprising the amino acid sequence set forth in SEQ ID NO: 22, a VH-CDR2 comprising the amino acid sequence set forth in SEQ ID NO: 23, a VH-CDR3 comprising the amino acid sequence set forth in SEQ ID NO: 24, a VL-CDR1 comprising the amino acid sequence set forth in SEQ ID NO: 25, a VL-CDR2 comprising the amino acid sequence set forth in SEQ ID NO: 26, and a VL-CDR3 comprising the amino acid sequence set forth in SEQ ID NO: 27; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the viral vector comprises a polynucleotide encoding (A) a CAR, comprising (i) an antigen-binding domain that specifically binds human mesothelin, wherein the antigen-binding domain comprises a VH comprising the amino acid sequence set forth in SEQ ID NO: 28 and a VL comprising the amino acid sequence set forth in SEQ ID NO: 29; (ii) a hinge region comprising amino acid sequence set forth in SEQ ID NO: 32; (iii) a transmembrane domain comprising the amino acid sequence set forth in SEQ ID NO: 33; (iv) a costimulatory domain comprising the amino acid sequence set forth in SEQ ID NO: 34; and (v) an intracellular signaling domain comprising the amino acid sequence set forth in SEQ ID NO: 35; and (B) an armor protein, comprising (i) an IL-2Rβ polypeptide comprising the amino acid sequence set forth in SEQ ID NO: 1; (ii) a linker comprising the amino acid sequence set forth in SEQ ID NO: 4; and (iii) an IL-15Rα polypeptide tethered to an IL-15 polypeptide; wherein the IL-15Rα polypeptide comprises the amino acid sequence set forth in SEQ ID NO: 3; and wherein the IL-15 polypeptide comprises the amino acid sequence set forth in SEQ ID NO: 2.

In some aspects, the portion of the polynucleotide encoding (A) the CAR and the portion of the polynucleotide encoding (B) the armor protein are connected by a portion of the polynucleotide that encodes a linker. In some aspects, the linker comprises a peptide bond. In some aspects, the linker comprises one or more amino acids. In some aspects, the linker is a cleavable linker. In some aspects, the linker comprises a T2A linker. In some aspects, the linker comprises an amino acid sequence having at least about 70%, at least about 75%, at least about 80%, at least about 85%, at least about 90%, at least about 95%, at least about 96%, at least about 97%, at least about 98%, or at least about 99% sequence identity to the amino acid sequence set forth in SEQ ID NO: 5. In some aspects, the linker comprises the amino acid sequence set forth in SEQ ID NO: 5.

V. Methods of Harvesting and Expanding γδ T Cells

Engineered γδ T cells can be expanded in the presence of a cytokine, such as IL-15, IL-2, or in the absence of exogenous IL-2 or IL-15. In some embodiments, the cells are expanded in the presence of exogenous IL-15. In some embodiment, the cells express secreted IL-15 and do not require exogenous IL-15 for expansion. In some embodiments, the method includes expanding the population of γδ T cells in the presence of exogenous IL-2.

In one aspect, the invention features a method expanding γδ T cells by providing a population of γδ T cells expressing an IL-15Rβ; and culturing the population of γδ T cells in the presence of exogenous IL-2 and/or IL-15 or a variant thereof.

In another aspect, the invention features a method expanding γδ T cells by providing a population of γδ T cells expressing an IL-15Rβ and IL-15 or a variant thereof; and culturing the γδ T cells, wherein the IL-15 or variant thereof expands the population of γδ T cells.

Engineered γδ T cells of the invention can be derived from any suitable autologous or allogeneic γδ T cell or population thereof. In some embodiments, suitable γδ T cells for use as a source for the presently described engineered γδ T cells include Vδ1 cells, Vδ2 cells, Vδ3 cells, Vδ5 cells, and Vδ8 cells. In some embodiments, the population of engineered γδ T cell is derived from a population of Vδ1 cells or Vδ2 cells.

For example, provided herein are methods for separating and expanding Vδ1 cells from a non-haematopoietic tissue, such as skin or gut. In other embodiments, suitable γδ T cells can be derived from blood (e.g., peripheral blood). Methods of isolating and expanding Vδ1 cells from blood include those described, for example, in U.S. Pat. No. 9,499,788, International Patent Publication No. WO 2016/198480, and U.K. Patent Application No. 2204926.6, each of which is incorporated herein by reference in its entirety. In some embodiments, suitable γδ T cells can be derived from tumor tissue (e.g., tumor-infiltrating γδ T cells). Alternatively, suitable γδ T cells that can be engineered to express a transgene can be derived from non-haematopoietic tissue according to methods described below.

V.A. Isolation and Expansion of γδ T Cells from Blood

In some embodiments, the engineered γδ T cells of the present invention are derived from blood (e.g., peripheral blood) of a subject. For example, engineered γδ T cells may be derived from blood-derived Vδ2 cells or blood-derived Vδ1 cells.

In some embodiments, peripheral blood mononuclear cells (PBMCs) can be obtained from a subject according to any suitable method known in the art. PBMCs can be cultured in the presence of aminobisphosphonates (e.g., zoledronic acid), synthetic phosphoantigens (e.g., bromohydrin pyrophosphate; BrHPP), 2M3B1PP, or 2-methyl-3-butenyl-1-pyrophosphate in the presence of IL-2 for one-to-two weeks to generate an enriched population of Vδ2 cells. Alternatively, immobilized anti-TCRγδ (e.g., pan TCRγδ) can induce preferential expansion of Vδ2 cells from a population of PBMCs in the presence of IL-2, e.g., for approximately 14 days. In some embodiments, preferential expansion of Vδ2 cells from PBMCs can be achieved upon culture of immobilized anti-CD3 antibodies (e.g., OKT3) in the presence of IL-2 and IL-4. In some embodiments, the aforementioned culture is maintained for about seven days prior to subculture in soluble anti-CD3, IL-2, and IL-4. Alternatively, artificial antigen presenting cells can be used to promote preferential expansion of γδ T cells, such as Vδ2 cells. For example, PBMC-derived γδ T cells cultured in the presence of irradiated aAPC, IL-2, and/or IL-21 can expand to generate a population of γδ T cells including a high proportion of Vδ2 cells, moderate proportion of Vδ1 cells, and some double negative cells. In some embodiments of the aforementioned methods, PBMCs can be pre-enriched or post-enriched (e.g., through positive selection with TCRγδ-specific agents or negative selection of TCRαβ-specific agents). Such methods and other suitable methods for expansion of γδ T cells, such as Vδ2 cells, are described in detail by Deniger et al., Frontiers in Immunology 5, 636: 1-10, 2014, which is incorporated herein by reference in its entirety.

In some embodiments, Vδ1 T cells can be engineered to express a transgene (e.g., a heterologous targeting construct). Any suitable method of obtaining a population of Vδ1 T cells can be used. For example, Almeida et al. (Clinical Cancer Research, 22, 23; 5795-5805, 2016), incorporated herein by reference in its entirety, provides suitable methods of obtaining a population of Vδ1 T cells that can be engineered to express a heterologous targeting construct described herein. For example, in some embodiments, PBMCs are pre-enriched using magnetic bead sorting, which can yield greater than 90% γδ T cells. These cells can be cultured in the presence of one or more factors (e.g., TCR agonists, co-receptor agonists, and/or cytokines, e.g., IL-4, IL-15, and/or IFN-γ) in gas-permeable bioreactor bags for up to 21 days or more. Variations of this method, and other methods of obtaining Vδ1 T cells are suitable as part of the present invention. For example, blood derived Vδ1 T cells can alternatively be obtained using methods described, for example, in U.S. Pat. No. 9,499,788 and International Patent Publication No. WO 2016/198480, each of which is incorporated herein by reference in its entirety.

V.B. Separation and Expansion of Non-Haematopoietic Tissue-Resident γδ T Cells from Non-Haematopoietic Tissue Non-haematopoietic tissue-resident γδ T cells obtained as described below can be suitable vehicles for transgenes described herein, as they can exhibit good tumor penetration and retention capabilities. More detailed methods for isolation and expansion of non-haematopoietic tissue-resident γδ T cells can be found, for example, in PCT Pub. Nos. WO 2020/095058, WO 2020/095059, WO 2017/072367, and GB App. No. 2006989.4, each of which is incorporated herein by reference in its entirety.

Non-haematopoietic tissue-resident γδ T cells (e.g., skin-derived γδ T cells and/or non-Vδ2 T cells, e.g., Vδ1 T cells and/or DN T cells) can be isolated from any human or non-human animal non-haematopoietic tissue that can be removed from a patient to obtain cells suitable for engineering according to the methods of the present invention. In some embodiments, the non-haematopoietic tissue from which the γδ T cells are derived and expanded is skin (e.g., human skin), which can be obtained by methods known in the art. In some embodiments, the skin is obtained by punch biopsy. Alternatively, the methods of isolation and expansion of γδ T cells provided herein can be applied to the gastrointestinal tract (e.g., colon), mammary gland, lung, prostate, liver, spleen, and pancreas. The γδ T cells may also be resident in human cancer tissues, e.g., tumors of the breast or prostate. In some embodiments, the γδ T cells may be from human cancer tissues (e.g., solid tumor tissues). In other embodiments, the γδ T cells may be from non-haematopoietic tissue other than human cancer tissue (e.g., a tissue without a substantial number of tumor cells). For example, the γδ T cells may be from a region of skin (e.g., healthy skin) separate from a nearby or adjacent cancer tissue.

The γδ T cells that are dominant in the blood are primarily Vδ2 T cells, while the γδ T cells that are dominant in the non-haematopoietic tissues are primarily Vδ1 T cells, such that Vδ1 T cells include about 70-80% of the non-haematopoietic tissue-resident γδ T cell population. However, some Vδ2 T cells are also found in non-haematopoietic tissues, e.g., in the gut, where they can include about 10-20% of γδ T cells. Some γδ T cells that are resident in non-haematopoietic tissues express neither Vδ1 nor Vδ2 TCR and we have named them double negative (DN) γδ T cells. These DN γδ T cells are likely to be mostly Vδ3-expressing with a minority of Vδ5-expressing T cells. Therefore, the γδ T cells that are ordinarily resident in non-haematopoietic tissues and that are expanded by the method of the invention are preferably non-Vδ2 T cells, e.g., Vδ1 T cells, with the inclusion of a smaller amount of DN γδ T cells.

In some embodiments, a critical step is the deliberate separation, e.g., after some days or weeks of culture, of non-haematopoietic tissue-resident T cells (e.g., within a mixed lymphocyte population, which may for example include αβ cells, natural killer (NK) cells, B cells, and γδ2 and non-γδ2 T cells) away from the non-haematopoietic cells (e.g., stromal cells, particularly fibroblasts) of the tissue from which the T cells were obtained. This permits the preferential and rapid expansion over the following days and weeks of non-haematopoietic tissue derived Vδ1 T cells and DN γδ T cells.

In general, non-haematopoietic tissue-resident γδ T cells are capable of spontaneously expanding upon removal of physical contact with stromal cells (e.g., skin fibroblasts). Thus, the scaffold-based culture methods described above can be used to induce such separation, resulting in de-repression of the γδ T cells to trigger expansion. Accordingly, in some embodiments, no substantial TCR pathway activation is present during the expansion step (e.g., no exogenous TCR pathway activators are included in the culture). Further, the invention provides methods of expanding non-haematopoietic tissue-resident γδ T cells, wherein the methods do not involve contact with feeder cells, tumor cells, and/or antigen-presenting cells.

Expansion protocols involve culturing non-haematopoietic tissue-resident γδ T cells in the presence of effective cocktails of biological factors to support efficient γδ T cell expansion. In one embodiment, the method of expanding γδ T cells includes providing a population of γδ T cells obtained from a non-haematopoietic tissue (e.g., a separated population of non-haematopoietic tissue-derived γδ T cells, e.g., a population separated according to the methods described herein) and culturing the γδ T cells in the presence of IL-2 and, IL-15, and optionally IL-1β, IL-4, and/or IL-21. These cytokines or analogues thereof can be cultured with the cells for a duration (e.g., at least 5 days, at least 6 days, at least 7 days, at least 8 days, at least 9 days, at least 10 days, at least 11 days, at least 12 days, at least 13 days, at least 14 days, at least 21 days, at least 28 days, or longer, e.g., from 5 days to 40 days, from 7 days to 35 days, from 14 days 28 days, or about 21 days) in an amount effective to produce an expanded population of γδ T cells.

Numerous basal culture media suitable for use in the priming and/or expansion of γδ T cells are available, such as complete media, OPTMIZER™, AIM-V, Iscoves medium and RPMI-1640 (Life Technologies) and TEXMACS™ (Miltenyi Biotec). The medium may be supplemented with other media factors, such as serum, serum proteins and selective agents, such as antibiotics. For example, in some embodiments, a media includes RPMI-1640 containing 2 mM glutamine, 10% FBS, 10 mM HEPES, pH 7.2, 1% penicillin-streptomycin, sodium pyruvate (1 mM; Life Technologies), non-essential amino acids (e.g., 100 μM Gly, Ala, Asn, Asp, Glu, Pro and Ser; 1×MEM non-essential amino acids Life Technologies), and 10 μl/L β-mercaptoethanol. Conveniently, cells are cultured at 37° C. in a humidified atmosphere containing 5% CO2 in a suitable culture medium.

The γδ T cells may be cultured as described herein in any suitable system, including stirred tank fermenters, airlift fermenters, roller bottles, culture bags or dishes, and other bioreactors, such as hollow fiber bioreactors. The use of such systems is well-known in the art. General methods and techniques for culture of lymphocytes are well-known in the art.

The methods described herein can include more than one selection step, e.g., more than one depletion step. Enrichment of a T cell population by negative selection can be accomplished, e.g., with a combination of antibodies directed to surface markers unique to the negatively selected cells. One method is cell sorting and/or selection via negative magnetic immunoadherence or flow cytometry that uses a cocktail of monoclonal antibodies directed to cell surface markers present on the cells negatively selected.

VI. Transgenes

The engineered γδ T cells of the present invention are engineered to express a desired transgene. γδ T cells engineered to express a transgene are suitable for use in cancer treatment (e.g., immunotherapy). The viral vectors described herein encode the transgene, which is then stably or transiently expressed in the transduced γδ T cells. Transgenes that can be used in conjunction with the compositions and methods described herein include IL-15Rβ, IL-15Rα, IL-15, or any biologically active variants, muteins, or truncated fragments thereof. Other transgenes include, for example, chimeric antigen receptors (CARs). The transgene may include an internal ribosomal entry site (IRES) operably connected to the transgene.

In some embodiments, the γδ T cells express two or more (e.g., two, three, four, or more) transgenes. Each of the transgenes may be expressed on a single polynucleotide, such that they are expressed in tandem. Each transgene may include a linker therebetween. The linker may encode a cleavable peptide or include an IRES. The cleavable peptide may be, for example, a self-cleaving peptide, such as a 2A peptide. In some embodiments, the 2A peptide is an F2A peptide, an E2A peptide, a P2A peptide, or a T2A peptide. In some embodiments, the polynucleotide includes a distinct IRES operably connected to each transgene on a single polynucleotide. In some embodiments, the polynucleotide includes a single IRES operably connected to all transgenes on a single polynucleotide.

In some instances, a transgene to be expressed by the engineered γδ T cells of the present invention includes a selectable marker (e.g., a reporter gene) or a suicide gene. For example, truncated epidermal growth factor receptor (EGFR), lacking the intracellular signaling domain, can be used as a transgene for in vivo depletion in the event of, e.g., toxicity, using anti-EGFR monoclonal antibodies. Similarly, CD20 can be used as a transgene for in vivo depletion using anti-CD20 monoclonal antibodies. Another exemplary transgene is a suicide gene to facilitate drug-mediated control of administered engineered γδ T cells. Through the use of a suicide gene, modified cells can be depleted from the patient in case of an adverse event. In one example, a drug-binding domain is fused to the caspase9 pro-apoptotic molecule. In some instances, the transgene is cytosine deaminase. In some instances, the transgene is thymidine kinase.

Additionally or alternatively, transgenes for expression by the engineered γδ T cells of the present invention encode membrane-bound proteins, such as a membrane-bound receptor (e.g., αβ TCR, a natural cytotoxicity receptor (e.g., NKp30, NKp44, or NKp46), a cytokine receptor (e.g., IL-12 receptor), and/or a chemokine receptor (e.g., CCR2 receptor) and/or a membrane-bound ligand or cytokine (e.g., membrane-bound IL-15, membrane-bound IL-7, membrane-bound CD40L, membrane-bound 4-1BB, membrane-bound 4-1BBL, membrane bound CCL19). Membrane-bound ligands and cytokines include naturally membrane-bound ligands and cytokines (e.g., trans-presented IL-15 and 4-1BBL) and synthetic membrane-bound configurations (e.g., ligands that have been artificially fused to a transmembrane protein). Additionally, or alternatively, transgenes to be expressed by the engineered γδ T cells of the present invention encode soluble proteins, such as soluble ligands or cytokines (e.g., soluble IL-15, soluble IL-7, soluble IL-12, soluble CD40L, soluble 4-1BBL, and/or soluble CCL19).

In some instances, engineered γδ T cells having a transgene that encodes a CAR can be armored with an additional transgene that contributes to immunogenicity. Such armored CAR T cells express an armor protein, such as any of the membrane-bound or soluble proteins described herein. For example, armor proteins include membrane-bound proteins, such as a membrane-bound receptor (e.g., αβ TCR, a natural cytotoxicity receptor (e.g., NKp30, NKp44, or NKp46), a cytokine receptor (e.g., IL-12 receptor), and/or a chemokine receptor (e.g., CCR2 receptor) and/or a membrane-bound ligand or cytokine (e.g., membrane-bound IL-15, membrane-bound IL-7, membrane-bound CD40L, membrane-bound 4-1BB, membrane-bound 4-1BBL, membrane bound CCL19). Additionally, or alternatively, armor proteins to be expressed by the engineered γδ CAR T cells of the present invention include soluble proteins, such as soluble ligands or cytokines (e.g., soluble IL-15, soluble IL-7, soluble IL-12, soluble CD40L, soluble 4-1BBL, and/or soluble CCL19).

In some embodiments, the engineered γδ T cells of the present invention are engineered to express one or more transgenes (e.g., one or more of any of the transgenes described herein) for armoring the γδ T cells (e.g., as an armored CAR T cell, as described in Yeku and Brentjens Biochem. Soc. Trans. 2016, 15: 44, 2, 412-418, which is incorporated herein by reference in its entirety).

In some embodiments, the transgene is codon optimized.

In some embodiments, at least 3% (e.g., at least 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 97%, 99%, or substantially all) of the engineered population of γδ T cells (e.g., Vδ1 or Vδ2 cells) express the transgene, e.g., IL-15Rβ, a CAR, or other membrane-bound or soluble protein. In some embodiments, at least 10% (e.g., at least 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 97%, 99%, or substantially all) of the engineered population of γδ T cells (e.g., Vδ1 or Vδ2 cells) express the transgene, e.g., IL-15Rβ, a CAR, or other membrane-bound or soluble protein. In some embodiments, at least 50% (e.g., at least 50%, 55%, 60%, 65%, 70%, 75%, 80%, 85%, 90%, 95%, 97%, 99%, or substantially all) of the engineered population of γδ T cells (e.g., Vδ1 or Vδ2 cells) express the transgene, e.g., IL-15Rβ, the CAR, or other membrane-bound or soluble protein. In some embodiments, 3%-95% (e.g., 5%-95%, 10%-95%, 20%-95%, 25%-95%, or 50%-95%) of the engineered population of γδ T cells (e.g., Vδ1 or Vδ2 cells) express the transgene, e.g., IL-15Rβ, the CAR, or other membrane-bound or soluble protein. In some embodiments, 3%-90% (e.g., 5%-90%, 10%-90%, 20%-90%, 25%-90%, or 50%-90%) of the engineered population of γδ T cells (e.g., Vδ1 or Vδ2 cells) express the transgene, e.g., IL-15Rβ, the CAR, or other membrane-bound or soluble protein.

VII. Methods of Treatment

Some aspects of the disclosure are directed to a method of treating a patient in need thereof comprising administering to the subject an engineered γδ T cell disclosed herein. In some aspects, the subject is afflicted with a cancer. Generally, the growth and/or life span of a cancer cell exceeds, and is not coordinated with, that of the normal cells and tissues around it. Cancers may be benign, pre-malignant or malignant. Cancer occurs in a variety of cells and tissues, including the oral cavity (e.g. mouth, tongue, pharynx, etc.), digestive system (e.g. esophagus, stomach, small intestine, colon, rectum, liver, bile duct, gall bladder, pancreas, etc.), respiratory system (e.g. larynx, lung, bronchus, etc.), bones, joints, skin (e.g. basal cell, squamous cell, meningioma, etc.), breast, genital system, (e.g. uterus, ovary, prostate, testis, etc.), urinary system (e.g. bladder, kidney, ureter, etc.), eye, nervous system (e.g. brain, etc.), endocrine system (e.g. thyroid, etc.), and haematopoietic system (e.g. lymphoma, myeloma, leukemia, acute lymphocytic leukemia, chronic lymphocytic leukemia, acute myeloid leukemia, chronic myeloid leukemia, etc.).

In some aspects, the disease or condition comprises a cancer, e.g., the subject is afflicted with a cancer. In some aspects, the cancer comprises bone cancer, pancreatic cancer, skin cancer, cancer of the head or neck, cutaneous or intraocular malignant melanoma, lung cancer (e.g., non-small cell lung cancer (NSCLC) or small cell lung cancer (SCLC)), uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, Hodgkin's Disease, non-Hodgkin's lymphoma, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, chronic or acute leukemia, acute myeloid leukemia (AML) (e.g., relapsed or refractory AML), chronic myeloid leukemia, acute lymphoblastic leukemia, chronic lymphocytic leukemia (ALL), chronic myelogenous leukemia, solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, T-cell lymphoma, environmentally induced cancers including those induced by asbestos, or any combination thereof. In some aspects, the cancer is locally advanced. In some aspects, the cancer is metastatic. In some aspects, the cancer is refractory. In some aspects, the cancer is relapsed. In some aspects, the cancer is refractory or relapsed following one or more prior anti-cancer therapy. In some aspects, the one or more prior anti-cancer therapies comprise a standard of care therapy.

In some aspects, the compositions disclosed herein are administered in combination with an additional anti-cancer therapy. In some aspects, the additional anti-cancer therapy comprises a chemotherapy, an immunotherapy, a radiotherapy, a surgery, or any combination thereof. In some aspects, the additional anti-cancer therapy comprises a chemotherapy. In some aspects, the additional anti-cancer therapy comprises an immune-checkpoint inhibitor. In some aspects, the additional anti-cancer therapy comprises a PD-1 antagonist, a PD-L1 antagonist, a CTLA-4 antagonist, a LAG-3 antagonist, a GITR antagonist, or any combination thereof. In some aspects, the anti-cancer therapy comprises an antibody or antigen-binding portion thereof the specifically binds and inhibits PD-1 (e.g., pembrolizumab or nivolumab). In some aspects, the anti-cancer therapy comprises an antibody or antigen-binding portion thereof the specifically binds and inhibits PD-L1 (e.g., atezolizumab, avelumab, or durvalumab).

In some aspects, the method further comprises pretreating the subject prior to administering the population of immune cells. In some aspects, the subject is administered a chemotherapy prior to administering the population of immune cells. In some aspects, the subject is administered an immuno-depleting chemotherapy prior to administering the population of immune cells. In some aspects, the immuno-depleting chemotherapy comprises cyclophosphamide, fludarabine, or both.

In some aspects, the method comprises administering to the subject (i) an engineered innate lymphoid cell disclosed herein and (ii) a cytokine. In some aspects, the cytokine comprises IL-2, an analog thereof, a variant thereof, or a fragment thereof.

In some aspects, the cells of the present disclosure are administered to a subject at a dose of at least about $1 \times 10^6$ cells, at least about $2 \times 10^6$ cells, at least about $3 \times 10^6$ cells, at least about $4 \times 10^6$ cells, at least about $5 \times 10^6$ cells, $1 \times 10^7$ cells, at least about $2 \times 10^7$ cells, at least about $3 \times 10^7$ cells, at least about $4 \times 10^7$ cells, at least about $5 \times 10^7$ cells, $1 \times 10^8$ cells, at least about $2 \times 10^8$ cells, at least about $3 \times 10^8$ cells, at least about $4 \times 10^8$ cells, at least about $5 \times 10^8$ cells, $1 \times 10^9$ cells, at least about $2 \times 10^9$ cells, at least about $3 \times 10^9$ cells, at least about $4 \times 10^9$ cells, or at least about $5 \times 10^9$ cells.

The practice of the present disclosure will employ, unless otherwise indicated, conventional techniques of cell biology, cell culture, molecular biology, transgenic biology, microbiology, recombinant DNA, and immunology, which are within the skill of the art. Such techniques are explained fully in the literature. See, for example, Sambrook et al., ed. (1989) Molecular Cloning A Laboratory Manual (2nd ed.; Cold Spring Harbor Laboratory Press); Sambrook et al., ed. (1992) Molecular Cloning: A Laboratory Manual, (Cold Springs Harbor Laboratory, NY); D. N. Glover ed., (1985) DNA Cloning, Volumes I and II; Gait, ed. (1984) Oligonucleotide Synthesis; Mullis et al. U.S. Pat. No. 4,683,195; Hames and Higgins, eds. (1984) Nucleic Acid Hybridization; Hames and Higgins, eds. (1984) Transcription And Translation; Freshney (1987) Culture Of Animal Cells (Alan R. Liss, Inc.); Immobilized Cells And Enzymes (TRL Press) (1986); Perbal (1984) A Practical Guide To Molecular Cloning; the treatise, Methods In Enzymology (Academic Press, Inc., N.Y.); Miller and Calos eds. (1987) Gene Transfer Vectors For Mammalian Cells, (Cold Spring Harbor Laboratory); Wu et al., eds., Methods In Enzymology, Vols. 154 and 155; Mayer and Walker, eds. (1987) Immunochemical Methods In Cell And Molecular Biology (Academic Press, London); Weir and Blackwell, eds., (1986) Handbook Of Experimental Immunology, Volumes I-IV; Manipulating the Mouse Embryo, Cold Spring Harbor Laboratory Press, Cold Spring Harbor, N.Y., (1986)); Crooke, Antisense drug Technology: Principles, Strategies and Applications, $2^{nd}$ Ed. CRC Press (2007) and in Ausubel et al. (1989) Current Protocols in Molecular Biology (John Wiley and Sons, Baltimore, Md.).

All of the references cited above, as well as all references cited herein, are incorporated herein by reference in their entireties.

The following examples are offered by way of illustration and not by way of limitation.

EXAMPLES

Materials and Methods

Vδ1 T Cell Isolation and Expansion

Vδ1 γδ T cell enriched product (GDX012) was produced using a modified protocol based on Almeida et al. (2016) Clin. Cancer Res. 22: 5795-804. Briefly, αβ T cell depleted peripheral blood mononuclear cells were expanded in G-Rex (Wilson Wolf) culture vessels using serum-free culture medium (CTS OpTmizer, Thermo Fisher) supplemented with 2.5% autologous plasma and Glutamax (ThermoFisher). The isolated cells were grown in the presence of recombinant IL-4 [rIL4] (100 ng/mL), recombinant interferon-γ [rIFNγ] (70 ng/mL), recombinant IL-21 [rIL21] (7 ng/mL), recombinant IL-1β [rIL1β] (15 ng/mL), and soluble OKT-3 monoclonal antibody (42 ng/mL). Cells were incubated at 37° C. and 5% CO2 in a humidified incubator. Expanding cells were regularly fed with fresh medium containing recombinant IL-15 [rIL15] ('high': day 5: 21 ng/mL and day 7: 100 ng/mL OR 'low': day 5: 2.1 ng/mL and day 7: 10 ng/mL).

Retroviral Transduction

Expanding γδ T-cells were transduced with retroviral vectors in Retronectin coated (20 mg/mL) cell expansion bags (PermaLife bags, OriGen Biomedical) at defined multiplicity of infection (MOI). MOI refers to the number of infectious particles (measured by flow cytometry) that were added per cell during transduction. Viral vectors were diluted in CTS OpTmizer medium. Transduction efficiency was determined using flow cytometry after three days post-transduction at regular intervals.

Retroviral Vector Production and Titration

Gammaretroviral vectors were produced by transient transfection of human embryonic kidney (HEK) cells with murine leukaemia virus genome plasmids. Vectors were harvested 96 hours post-transfection, filtered through 0.45 µm pore size polyethersulfone (PES) filters and concentrated using hollow-fibre filtration.

Vector titre was determined by transduction of SupT1 (acute lymphoblastic leukaemia) cell line with serial dilution of concentrated vector material in the presence of Retronectin (20 µg/mL). Transduction efficiency was determined three days post transduction using a BD FACS Lyric flow cytometer. Infectious titre (TU/mL) was calculated using the following formula: TU/mL=((number of transduced cells)×vector dilution×(% transduction efficiency/100))/volume of vector (mL).

Flow Cytometry

Immunophenotyping was performed using a BD FACS Lyric flow cytometer. Cells were analyzed for the expression of surface markers using the antibodies in Table 5 below:

TABLE 5

Cell Surface Markers

| Fluorophore | Marker | Source |
|---|---|---|
| BV421 | CD27 | BioLegend |
| BV510 | L/D AQUA | ThermoFisher Scientific |
| BV605 | TCRαβ | BioLegend |
| FITC | CAR | AcroBiosystems |
| PE | NKG2D | BioLegend |
| PE-Cy7 | CD56 | BioLegend |
| APC | TCRγδ | BioLegend |
| APC-Cy7 | Vδ1 | Miltenyi BioTec |
| BV421 | DNAM-1 | BioLegend |
| BV605 | PD-1 | BioLegend |
| PE | NKp30 | BioLegend |
| PE-Cy7 | TIGIT | BioLegend |
| PE | IL-15Rα | BioLegend |
| PE-Cy7 | IL-15Rβ | Beckman Coulter |
| APC | IL-15 | R&D Systems |
| APC | Common Gamma chain | BioLegend |

Cytotoxicity Assessment

Expanded cells were co-cultured with suspension tumor targets (e.g., NALM-6) expressing firefly luciferase, at various effector to target ratios. Target cells in the absence of effectors served as a control (Ctrl). Maximum lysis was determined using Staurosporine treated target cells. After 20 hours, quantification of target viability was assessed using ONE-Glo™ Luciferase Assay System kit (Promega) or SYTOX AADvanced Dead Cell Stain Kit (ThermoFisher). Luminescence was measured on Biotek Synergy H4 plate reader (luciferase system) and dead cell stain with SYTOX AADvanced was measured by flow cytometry on MACSQuant (Miltenyi).

IL-15 ELISA

IL-15 production was measured using the commercially available Human IL-15 Quantikine ELISA Kit (Bio-Techne) according to the manufacturer's instructions. IL-15 production was measured 72 hours post-incubation.

Repeated Antigen Stimulation Assay

CD19 Model

To evaluate CAR-modified Vδ1 T cell expansion and CAR-T cell enrichment, repeated antigen stimulation (RAS) assays were conducted. Freshly thawed drug products were resuspended in RPMI10 media (RPMI, 10% FBS) in the presence (10 ng/mL or 70 pg/mL) or absence of IL-15.

Target tumour cell lines were counted using an automated cell counter (NC250) and the concentration adjusted to 1E+06 cells per mL. 2× cytokine concentration was added to the target cells and 100 μL (1E+05 cells) was transferred into each well of 96 well round bottom plates. The concentration of effector cells was adjusted to 2E+06 viable cells per mL and 100 μL (2E+05 cells) was plated into wells containing the target cells. Replicate wells were plated for each condition, depending on effector cell numbers. Co-cultures were maintained for 14 days at 37° C., 5% CO2. On days 4, 7 and 10 the replicate wells were pooled, counted, and phenotyped using BD FACSLyric flow cytometer. The remaining cells were subsequently centrifuged and resuspended in fresh media at a density 2E+06 viable cells/mL and plated onto another round of target cells, prepared as per day 0.

A549-Meso Model

Drug product was thawed and co-cultured with or without 1 ng/mL of IL-15 with A549-MLSN-fluc-gfp cells at an E:T ratio of 2:1 in 24 well plates (300,000 effectors to 150,000 targets) in an Incucyte to track GFP fluorescence over time, as a surrogate for tumour cell lysis. On days 2 and 9 of culture cells were fed with fresh media plus or minus 1 ng/mL of IL-15, replacing 50% of the well volume by careful aspiration after centrifugation. On days 4 and 11 of culture cells were fed with fresh media containing targets (150,000 per well) plus or minus 1 ng/mL IL-15, replacing 50% of the well volume by careful aspiration after centrifugation. On day 7 all wells were harvested, counted and re-seeded at an E:T of 2:1 as on day 0. Tumour confluence was measured by tracking GFP fluorescence over time.

Survival Assay

Cryopreserved drug products were thawed, and live cell concentration was adjusted to 2E+06 cells per mL in RPMI10. Multiple wells were seeded with 2E+05 cells per well. On day 0, 3, 7, 10 and 14 duplicate wells were stained by direct addition of SytoxAADvanced dye to the culture medium for 10 min at room temperature in the dark. Forty microlitre of sample were analysed on the MACSQuant flow cytometer without further processing for cell quantification and viability assessment. To determine the survival of CAR+ Vδ1+ T cells, a replicate plate was stained for CAR, Vδ1 and pan-γδ T cell markers and analysed by flow cytometry.

In Vivo Efficacy Model

CD19 Model

NSG and transgenic IL-15-expressing NOG-IL-15 mice aged 8-10 weeks were implanted with 5×105 NALM6-fluc-GFP cells via intravenous (IV) injection. On day 7, mice were injected with vehicle (n=5 NSG mice, Cryostor CS5, group 1), or one of three drug products, muCAR19.b, muCAR19.b, or muCAR19.a.15.b across 3 experimental conditions: NSG mice+1 μg IL-15 dosed daily via IP injection (N=9, groups 2-4), NSG mice without IL-15 dosing (N=4-9, groups 5-7) and NOG-hIL15 mice without IL-15 dosing (N=6, groups 8-10). FIG. 13 includes a grouping table. Mice were imaged twice per week using an IVIS camera following the intraperitoneal (IP) injection of 150 mg/kg d-Luciferin. On day 10 (3 days post drug product administration) N=4 mice from groups 2, 3, 4 and 7 were culled, and bone marrow aspirates from both femurs, spleens and peripheral blood (collected in lithium-heparin tubes) were harvested. Samples were process to single cell suspensions and stained for flow cytometric analysis. Samples were analysed using a BD FACSLyric flow cytometer.

A549-Meso Model

NSG mice aged 6-8 weeks were implanted with 1×106 A549-MSLN-fluc-GFP cells via intravenous (IV) injection. On day 19 post-implantation, mice were injected with vehicle (n=7, Cryostor CS5, group 1), P4 γδ CAR T cells at 10 million total cells per mouse (n=7, group 2), P4 α.15.βγδ CAR T cells at 10 million total cells per mouse (n=7, group 3), or P4.βγδ CAR T cells at 10 million total cells per mouse (n=7, group 4). Mice were imaged twice per week using an IVIS camera following the intraperitoneal (IP) injection of 150 mg/kg d-Luciferin. Mice in group 4 were dosed with 1 μg IL-15 daily via IP injection. On day 19 post drug product administration, all mice were culled and bone marrow aspirates from both femurs, spleens, lungs and peripheral blood (collected in lithium-heparin tubes) were harvested.

Example 1: Schematic Overview of 'Conventional' and Novel IL-15 Armoring Constructs Currently used armoring strategies either utilise secreted (sIL-15) or membrane tethered IL-15 (mbIL-15) constructs. These strategies have been proven to enhance the survival and proliferation of αβ T cells (Hurton L V. et al, PNAS, 113, E7788-E7797, (2016)), NK cells (Liu et al. Leukemia 32, 520-531 (2018)) and iNK-T (Xu et al, Clin Cancer Res., 25, 7126-7138 (2019)) cells.

Figure 1B:
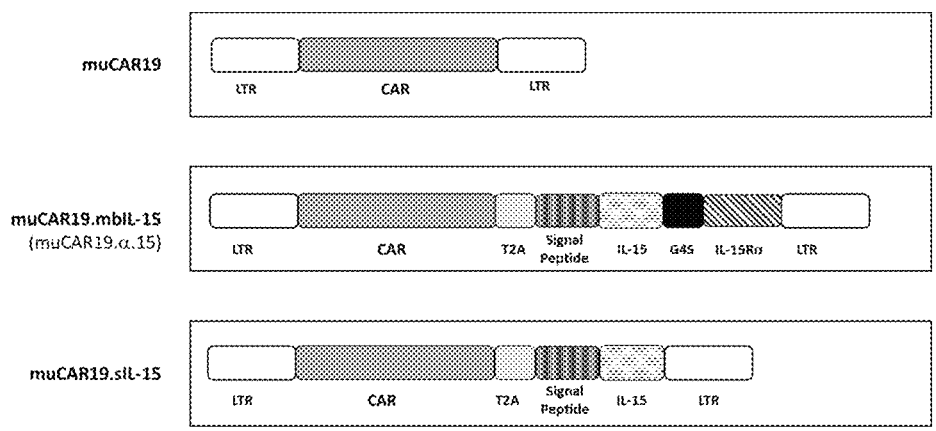
Figure 1C:
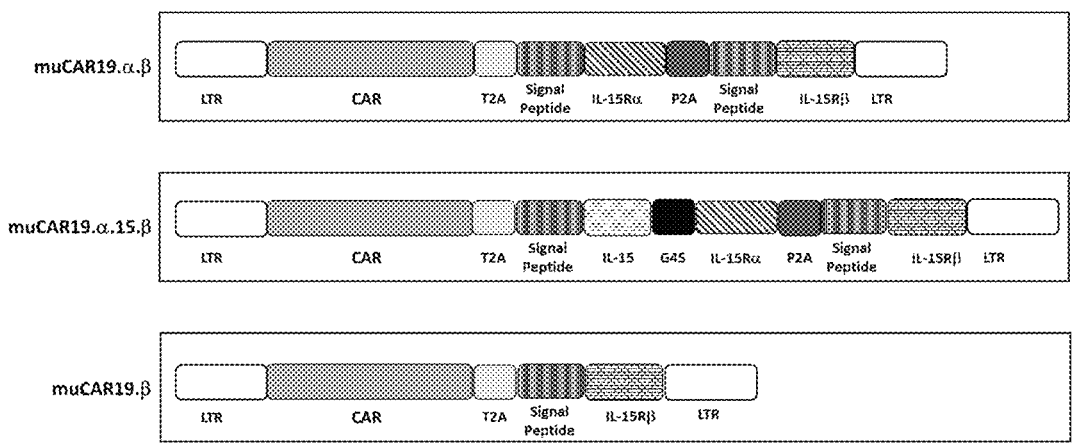

As part of this invention a set of novel constructs were designed and evaluated in Vδ1 γδ T cells (FIG. 1A). Multicistronic gammaretroviral vectors were generated in which the chimeric antigen receptor (CAR) encoding sequences were fused in frame with individual IL-15 receptor chain components encoding for the wild-type or IL-15 fused (tethered) chain variants. FIGS. 1B and 1C show the schematic of the gammaretroviral vectors used to co-express the CAR and armoring moiety(s).

Example 2: 'Conventional' IL-15 Armoring Strategies are Suboptimal for the Expansion of Blood-Derived Vδ1 T-Cells To determine whether currently used (conventional) IL-15 armoring strategies can drive the expansion of engineered Vδ1 T cells, isolated Vδ1 T cells were transduced with unarmored, secreted IL-15 (sIL-15) or membrane-bound IL-15 (mbIL-15) CAR constructs. Following transduction, the cells were expanded in the presence of IL-15 as described in the method section ('high' IL-15 feed). CAR expression was monitored via flow cytometry at regular intervals during the expansion phase and total cell numbers were enumerated via automated cell counting. The absolute number of viable CAR+Vδ1+ cells (total viable cell number multiplied by the percentage of CAR+Vδ1+T) was plotted against the day of expansion to determine the effect of armoring on the fold expansion of Vδ1 T cells (FIG. 2A).

Figure 2A:
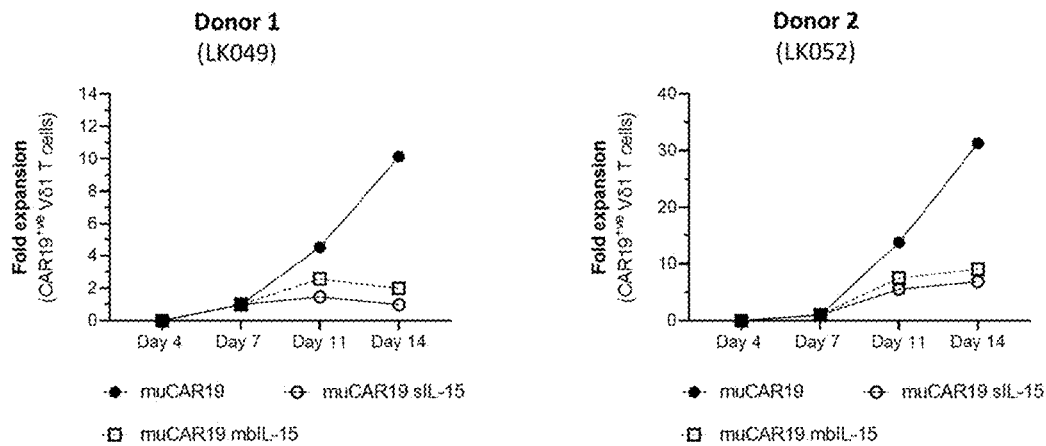
FIGS. 2A-2C are graphs evaluating the effect of conventional armoring strategies on Vδ1 T cells expansion and phenotype.
Figure 2B:
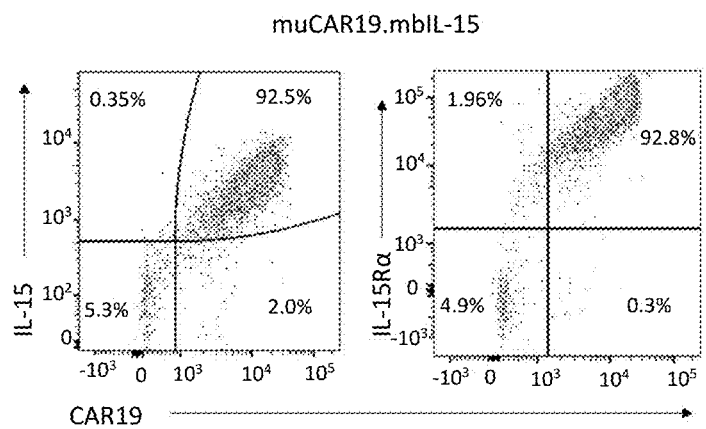
Figure 2C:
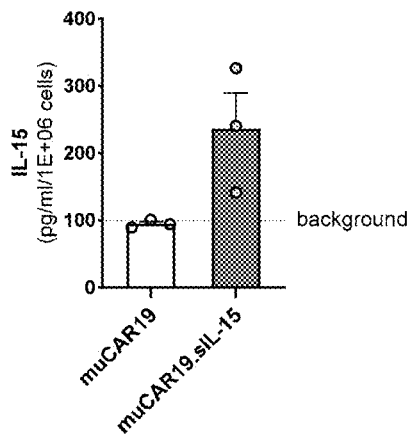

FIG. 2A shows that in the presence of IL-15, unarmored CAR-modified Vδ1 T cells continuously enriched over the course of the culture period. On the contrary, conventional IL-15 armored Vδ1 T cells demonstrated limited proliferation during the expansion procedure, suggesting armored cells are desensitised to exogenous IL-15. Drug product analysis revealed that the armored cells indeed, express mbIL-15 on their surface (muCAR19.mbIL-15) and secrete IL-15 (muCAR19.sIL-15). FIG. 2B shows the surface expression of IL-15 and IL-15Rα chain on the mbIL-15 armored CAR+Vδ1+ T cells. FIG. 2C demonstrates the functionality of the sIL-15 armored CAR+Vδ1+T measured by an overnight IL-15 ELISA.

Example 3: 'Conventional' IL-15 Armoring Strategies Provide Limited Survival and Proliferation Signal for Blood-Derived Vδ1 T-Cells Next, conventional armoring strategies were tested to improve the cytotoxicity, survival and proliferation of the armored CAR-modified Vδ1 T cells. To this end an overnight cytotoxicity assay, a survival assay and a repeated antigen stimulation assay (using NALM-6 target cells) was performed using freshly thawed drug products.

Figure 3A:
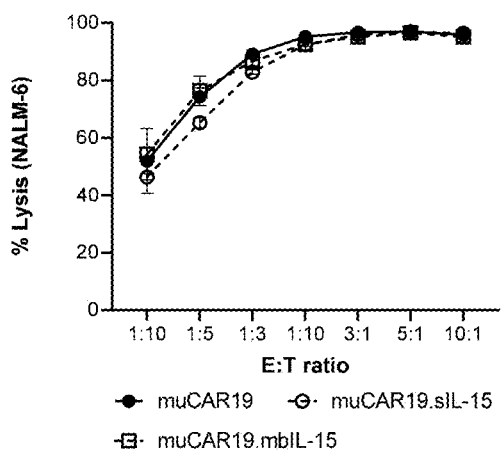
FIGS. 3A-3C are graphs evaluating the effect of conventional armoring strategies on Vδ1 T cell cytotoxicity, survival and repeated antigen stimulation induced proliferation.
Figure 3B:
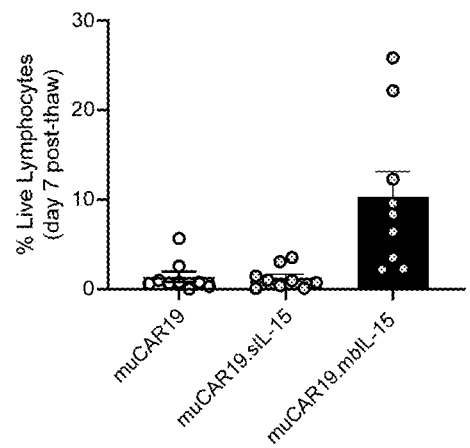

In the overnight cytotoxicity assay, conventionally armored CAR+Vδ1+ T cells demonstrated comparable lytic activity to unarmored CAR-modified Vδ1 T cells (FIG. 3A). FIG. 3B shows that in the absence of exogenous IL-15, unarmored and sIL-15 armored cells did not survive. On the contrary, armoring the cells with mbIL-15 resulted in a marginal improvement in cell survival, evaluated by flow cytometry (viable lymphocyte population).

Figure 3C:
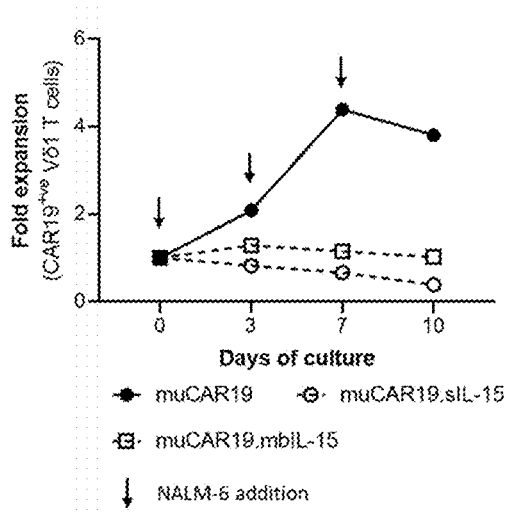

Surprisingly in the repeated antigen stimulation assay, in the presence of IL-15, none of the conventional IL-15 armored CAR+Vδ1+ T cells enriched (FIG. 3C). Off note, the same phenomenon was observed in the absence of IL-15 in the RAS assay (data not shown). This was in striking contrast to the unarmored cells, which continuously enriched for CAR-modified Vδ1 T cells upon repeated NALM-6 challenges. Overall, the results suggest that cells armored with conventional IL-15 armoring constructs retain their ability to kill but lose the ability to expand and enrich upon target cell engagement. The data also demonstrate that conventional strategies (sIL-15) do not or only marginally improve (mbIL-15) Vδ1 T cell survival.

Figure 4:
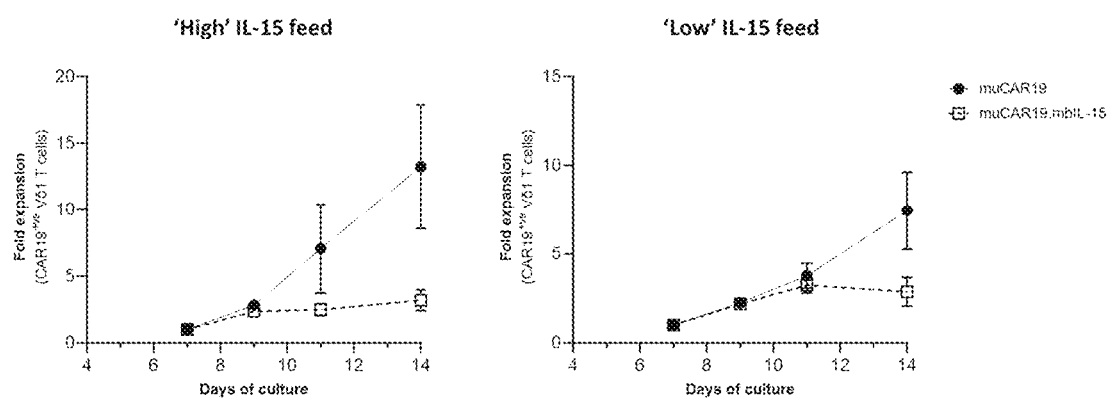
FIG. 4 is a graph evaluating the effect of mbIL-15 armoring on the fold expansion of CAR-modified Vδ1 T cells. The graphs show comparison of fold expansion of unarmored and mbIL-15 armored Vδ1 CAR-T cells in the presence of high and low IL-15 concentrations.

Example 4: Reducing the IL-15 Concentration During the Expansion Step does not Rescue the Proliferation of mbIL-15 Armored CAR-Modified Vδ1 T Cells To further examine the effect of mbIL-15 armoring strategy, unarmored and mbIL-15 armored CAR transduced Vδ1 T cells were expanded in the presence of high and low IL-15 concentrations and the fold expansion of the cells was monitored (FIG. 4). In line with the previous results, both high and low IL-15 concentrations supported the expansion of unarmored Vδ1+ T cells. In contrast, mbIL-15 armored CAR+Vδ1+ T cells failed to enrich even at a 10-fold lower IL-15 dose. Overall, the results suggest that mbIL-15 armored cells lose the ability to respond to exogenous IL-15 and the proliferation of the armored cells cannot be rescued by lowering the IL-15 dose during the expansion process.

Example 5: IL-15Rβ Chain Transfer Restores the Proliferation of mbIL-15 Armored CAR-Modified Vδ1 T Cells For context simplification, IL-2R β will be referred as IL-15R β throughout the document.

As mbIL-15 armored cells demonstrated negligible proliferation both in the presence of exogenous IL-15 (FIGS. 2A and 4) and during repeated antigen challenge (FIG. 3C), we hypothesised if overexpression of the common β chain could restore the proliferation of the transduced cells.

Figure 5:
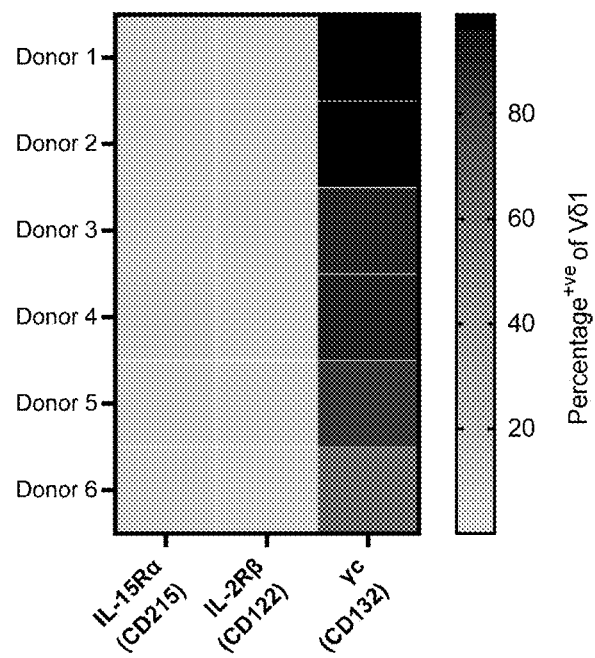
FIG. 5 is a graph showing analysis of IL-15 receptor chain component expression using LEGENDScreen. Heatmap shows the percentage of IL-15Rα (CD215), IL-15Rβ (CD122, also known as IL-2Rβ) and common gamma chain (CD123, $\gamma_c$) expressing Vδ1 T cells in unmodified Vδ1 T cells.

First, we tested if expanded, blood-derived Vδ1 T cells expressed any detectable levels of IL-15R β chain on their surface. High-throughput flow cytometry analysis (LEGENDScreen) revealed that unmodified Vδ1 T cells did not express either IL-15R α or IL-15R β chains. (FIG. 5). On the contrary, Vδ1 T cells demonstrated a high level and uniform expression of common γ chain.

Figure 6A:
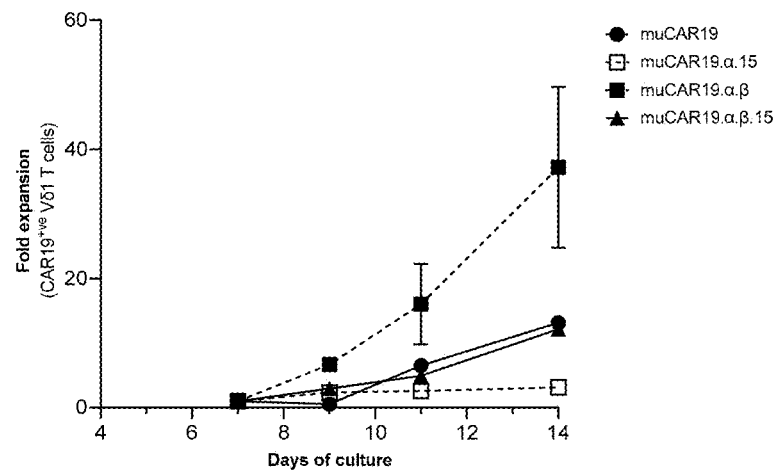
FIGS. 6A and 6B are graphs evaluation the effect of IL-15R β chain transfer in the presence of mbIL-15 or IL-15R α chain.
Figure 6B:
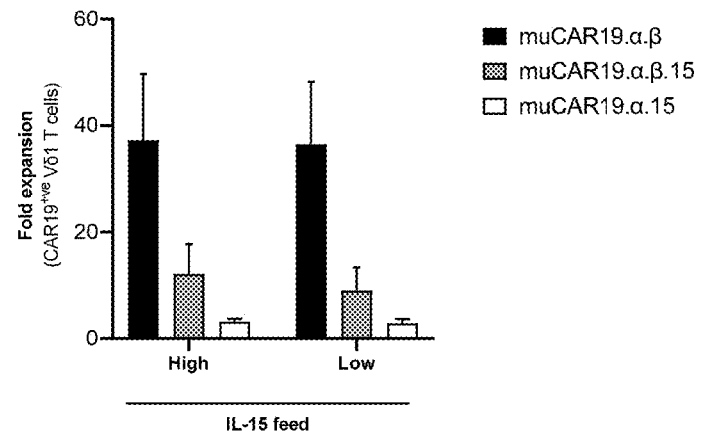

Having shown that Vδ1 T cells express negligible amount of IL-15R β chain on their surface, we went on to establish the effect of co-expression of IL-15R β and IL-15 tethered or wild-type IL-15R α chain (FIGS. 1B and C). To this end, expanding Vδ1 T cells were transduced with CAR constructs armored with membrane tethered IL-15 (mbIL-15=α.IL-15), membrane-tethered IL-15 and IL-15R β (α.IL-15. β) and IL-15Rα and β (IL-15.α.β) chains. Transduced cells were subsequently expanded in the presence of exogenous IL-15 and the fold expansion was continuously monitored during the expansion process. FIG. 6A demonstrates the fold expansion of armored CAR+Vδ1+ T cells over the time. The data revealed that transducing the cells with IL-15R β chain restores the proliferation of (both IL-15 tethered and wild-type) IL-15Rα chain armored CAR+Vδ1+ T cells. Surprisingly, in the presence of exogenous IL-15, IL-15R α and β chain co-expressing cells demonstrated significantly higher fold expansion than the tethered IL-15 and β chain expressing cells. Importantly, tethered IL-15 and β chain co-expressing cells showed comparable fold expansion to unarmored cells (FIG. 6A, triangles vs. circles). This phenomenon was consistently observed across two different IL-15 doses (FIG. 6B), clearly demonstrating that co-expression of the IL-15R β chain rescues expansion of mbIL-15 engineered cells in response to exogenous IL15.

Figure 7A:
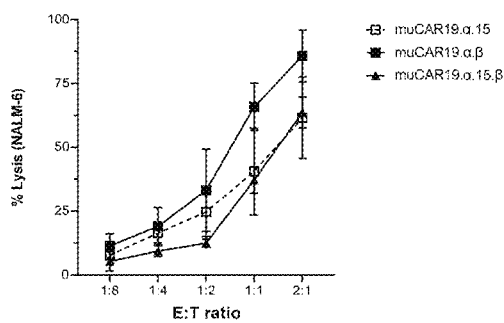
FIGS. 7A-7C are graphs evaluating the effect of IL-15Rβ chain transfer on Vδ1 T cell cytotoxicity, survival and repeated antigen stimulation induced proliferation.

Example 6: IL-15R α and β Chain Co-Expressing CAR-Modified Vδ1 T Cells are Cytotoxic and Proliferate During Repeated Antigen Challenge Having established that the co-expression of IL-15R α and β chains could restore exogenous IL-15 induced proliferation of CAR-modified Vδ1+ T cells, we next investigated the functionality of the modified cells. FIG. 7A shows representative short-term (overnight) cytotoxicity results from two donors. Armoring Vδ1 T cells with the additional IL-15R chain components did not cause any detrimental effect on the cytotoxic activity of the cells. Importantly, β chain co-expressing cells demonstrated comparable cytotoxicity to mbIL-15 armored cells.

The next step established whether CAR transduced, IL-15R α and β-chain co-expressing Vδ1 T cells could enrich upon repeated antigen stimulation with CD19+ NALM-6 acute lymphoblastic leukaemia cells. To this end, freshly thawed armored drug products were co-cultured with NALM-6 target cells in the presence (10 ng/mL) or absence of exogenous IL-15 as described in the methods section. Effector cells were re-stimulated with fresh target cells every 3-4 days. Fold expansion and enrichment of CAR+Vδ1+ effectors, as well as target cell clearance, was monitored over the course of the assay.

Figure 7B:
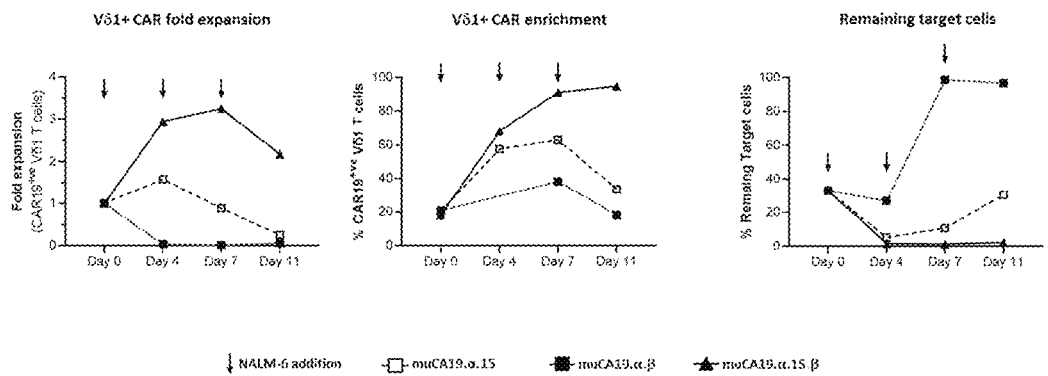
Figure 7C:
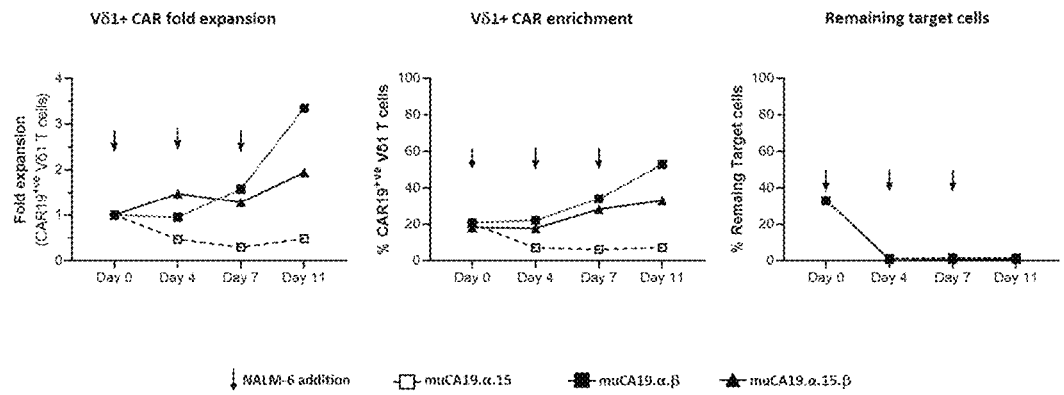

As demonstrated before (FIG. 3C), conventional mbIL-15 armored CAR+Vδ1+ T cells failed to proliferate in any of the examined conditions (FIGS. 7B and 7C, left panel, empty squares). This was reflected in the rapid decline of CAR+Vδ1+ T cell numbers. Compared to the mbIL-15 armored cells, IL-15R α and β chain co-expressing cell numbers declined even more rapidly in the absence of exogenous IL-15 (FIG. 7B, left panel, black squares). On the contrary, in the absence of IL-15, tethered IL-15 (α.IL-15) and β chain co-expressing cells enriched over the course of the assay (FIG. 7B, left & middle panels, triangles). These results demonstrate that in the absence of exogenous IL-15, tethered IL-15 serves as a proliferation and survival inducing signal to IL-15R α and β co-expressing cells. Enumerating the remaining target cell numbers over the course of the assay revealed that only the tethered IL-15 and IL-15R β chain co-expressing cells were able to demonstrate long term tumour control (FIG. 7B, right panel, triangles).

Surprisingly, in the presence of supraphysiological levels of IL-15 (10 ng/mL) the IL-15R α and β co-expressing cells demonstrated enhanced expansion compared to the tethered IL-15 and β chain co-expressing cells (FIG. 7C, left panel). These data suggest that the availability of exogenous IL-15 might be fine-tuning the activity of tethered IL-15 and β chain co-expressing cells. Overall, co-expression of the IL-15R β chain did not adversely affect cell cytotoxicity, and most importantly demonstrated, that in the context of tethered IL-15, tumour control could be achieved for an extended period in the absence of exogenous IL-15.

Figure 8A:
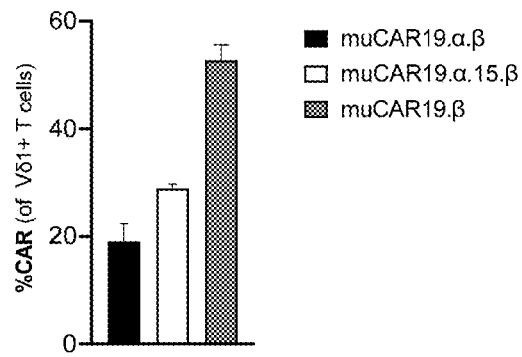
FIGS. 8A and 8B are graphs showing analysis of CAR and IL-15R chain expression 3 days post-transduction.
Figure 8B:
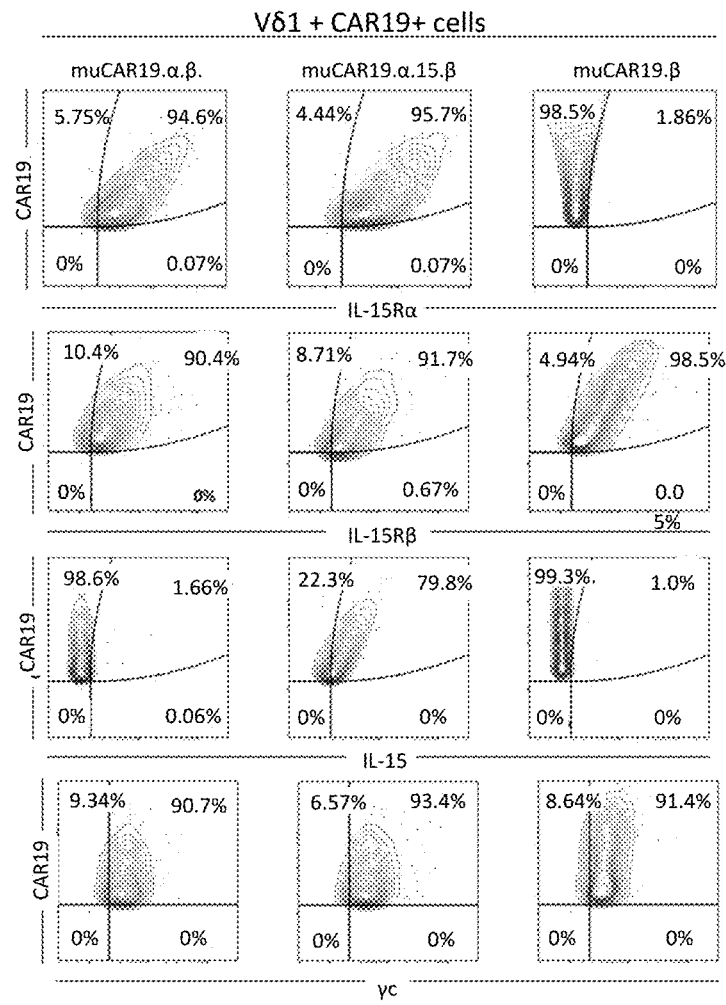

Example 7: IL-15R α and β Chain Co-Expressing Vδ1 T Cells Demonstrate Enhanced Expansion in the Presence of Exogenous IL-15 than Cells Expressing β Chain Alone Having demonstrated that the presence of IL-15R β chain is necessary to restore the proliferation of transduced Vδ1 T cells, the next aim was to determine if armoring the cells with β chain alone could drive the proliferation of the cells. To interrogate the function of the β chain, Vδ1 T cells were transduced with CAR construct armored with IL15R β chain alone or in combination with IL-15R α or IL-15 tethered IL-15Rα chains. FIG. 8A shows the percentage of CAR+ Vδ1+ T cell populations two days post-transduction (N=2 representative donors). As expected, the CAR gene transfer efficiency was negatively correlated with the size of the viral vector construct. At a fixed multiplicity of infection, the smaller (3150 bp) IL-15R β armoring construct consistently resulted in higher CAR transduction efficiencies than the larger (IL15Rα.β or IL-15Rα.15.β) size (3993 bp and 4413 bp, respectively) constructs. FIG. 8B demonstrates the expression of the individual chain components and IL-15 expression within the CAR transduced Vδ1 T cell population. Importantly, these representative flow plots demonstrate that CAR-modified Vδ1 T cells express equimolar levels of CAR and armoring components on their surface.

Figure 9A:
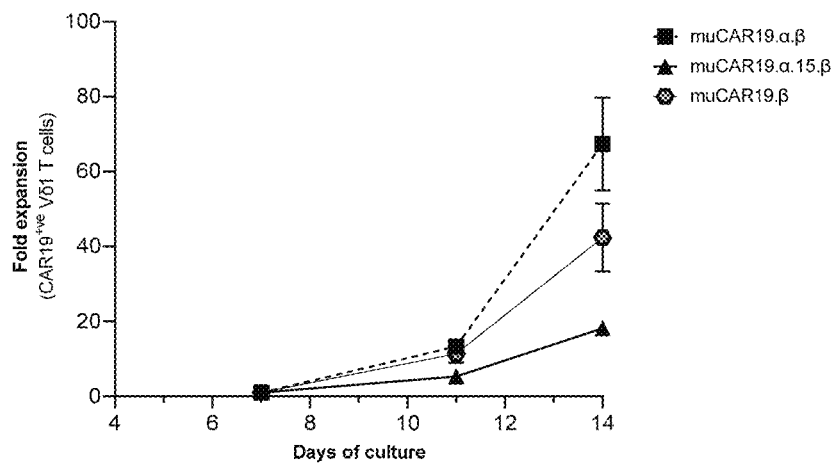
FIGS. 9A and 9B are graphs evaluating the effect of IL15R β chain transfer alone or in combination with wild-type or IL-15 tethered IL-15R α chains on Vδ1 T cell expansion.
Figure 9B:
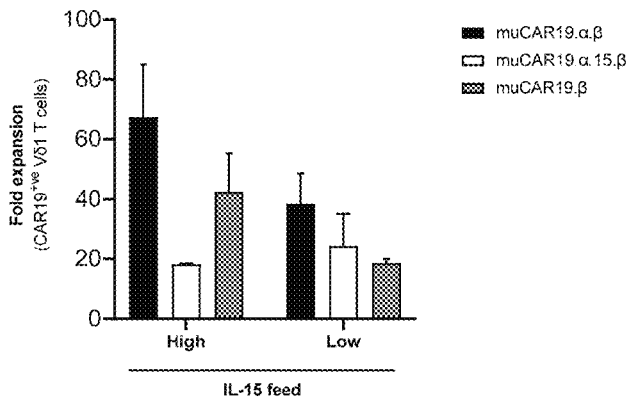

Following transduction with the aforementioned IL-15R β chain co-expressing constructs, the number of CAR+Vδ1+ T cells was monitored over the cell expansion procedure. In line with the previous experiments (FIG. 6A), IL-15R α and β chain co-expressing cells showed the highest level of expansion followed by the IL-15R β chain (alone) armored cells (FIG. 9A). To test if the expansion of the R chain expressing cells was dependent on exogenous IL-15 availability, the expansion procedure was repeated in the presence of high and low IL-15 concentrations. FIG. 9B shows the fold expansion of the CAR+Vδ1+ T cells armored with the three different p chain co-expressing constructs. The data demonstrate that IL-15R α and β chain co-expressing cells became more sensitised to exogenous IL-15 than β chain alone or tethered IL-15 and β chain co-expressing cells.

Figure 10A:
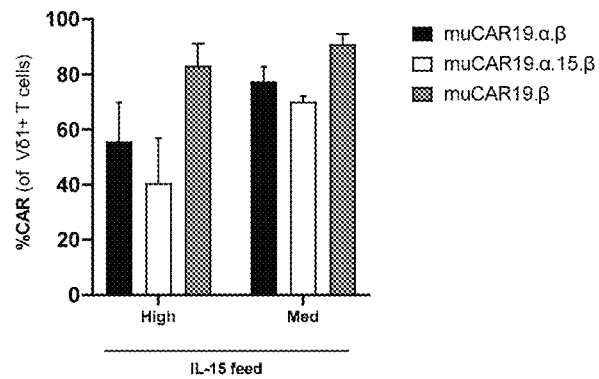
FIGS. 10A-10D are graphs showing phenotypic analysis of freeze-thawed, armored CAR-modified Vδ1 T cell drug products.

Example 8: Armored Cells Selectively Enrich During the Culture Period and Show Improved DNAM-1 and NKp30 Expression Following expansion, transduced drug substances were harvested, formulated and cryopreserved. Transduction efficiencies were determined upon thaw (FIG. 10A). Flow cytometric analysis did not reveal any significant differences in CAR transduction efficiencies amongst the different armoring conditions. Generally, expanding the cells using low dose IL-15 resulted in a slight increase in the proportion of transduced cells.

Figure 10B:
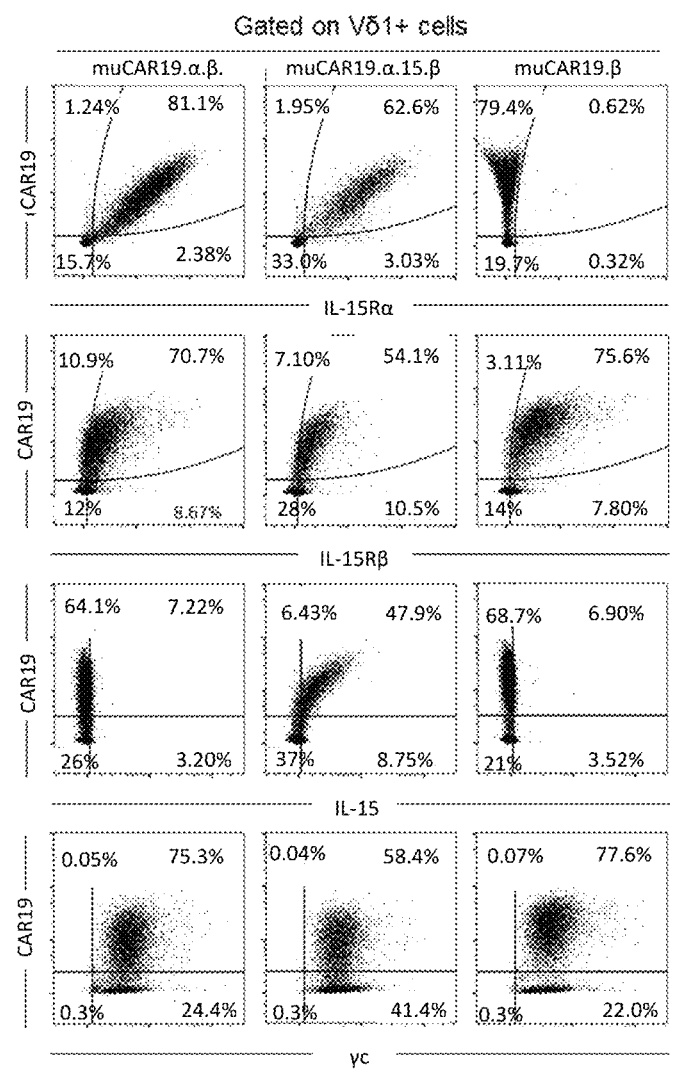

Next, the surface expression of CAR and individual armoring molecules was evaluated. FIG. 10B shows that freshly thawed cells retained an equimolar surface expression of CAR and IL-15R armoring molecules.

Figure 10C:
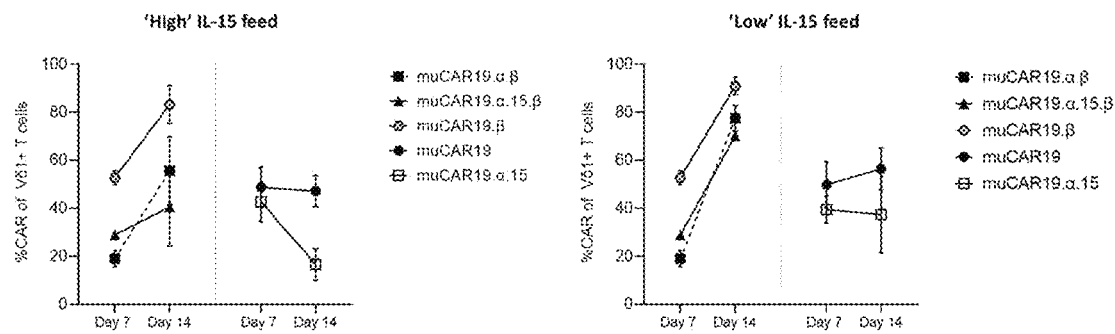

Comparing CAR transduction efficiencies 3 days after transduction and at the end of the expansion process revealed that the armored cells selectively enriched during the culture period (FIG. 10C). Notably, cells co-expressing α and β chains showed the highest level of enrichment between day 7 and day 14 of the culture period. This effect was even more prominent in the low IL-15 feed culture conditions. In contrast, unarmored CAR modified cells did not enrich during the expansion procedure. The expanding cells demonstrated a steady state CAR expression during the culture process. This further supports the finding that IL-15R α and β chain armored cells selectively enriched during the culture period.

Next, we went on to determine the cellular composition of the cells. FACS analysis did not reveal any significant qualitative or quantitative differences in terms of pan-γδ, Vδ1 γδ T cell and non-γδ T cell populations (data not shown).

Figure 10D:
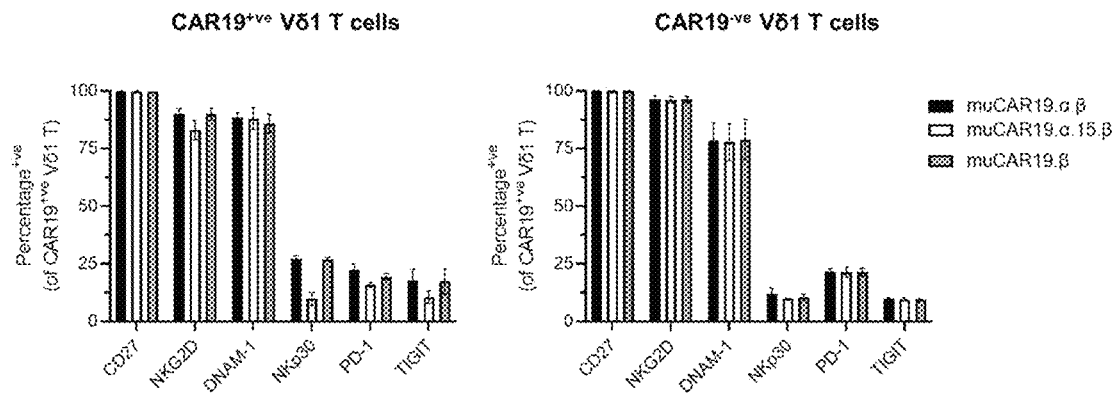

Phenotypic characterisation of armored CAR transduced and untransduced Vδ1 T cell populations revealed marginal differences in expression of NKG2D, NKp30, DNAM-1, PD-1 and TIGIT (FIG. 10D).

Compared to the untransduced Vδ1 T cell population, the proportion of natural cytotoxicity receptor, NKp30 expressing cells doubled in the CAR expressing population of all armored cells except the membrane tethered IL-15 and β chain co-expressing cells. Similarly, an increased frequency of activatory DNAM-1 receptor expressing cells was observed in the CAR expressing armored cell population. On the contrary, the opposite trend was observed in the case of NKG2D expressing Vδ1 T cells: the proportion of NKG2D expressing Vδ1 T cells marginally decreased in the CAR expressing cellular fraction compared to the untransduced fraction. These data suggest that β chain co-expression (in the context of wild type and IL-15α chain) might prime the cells towards a more cytotoxic phenotype.

Figure 11A:
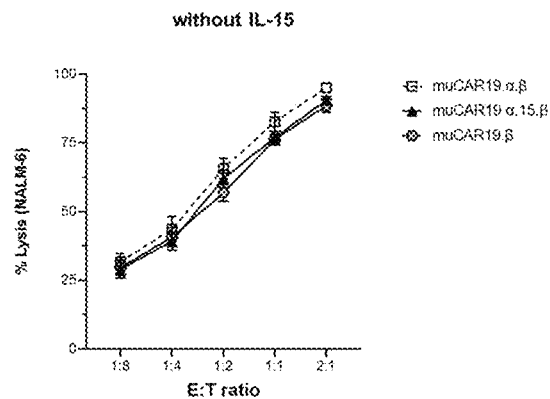
FIGS. 11A-11E are graphs showing cytotoxic activity of freshly thawed, armored CAR-modified Vδ1 T cell drug products. Cytotoxic activity of the armored cells is shown in the absence (FIG. 11A) and presence (FIG. 11B) of IL-15. Cytotoxicity of CD19-targeting CAR engineered cells against antigen negative targets (FIG. 11C) is shown against AML targets MV4-11 in the left and MOLM-13 in the right.
Figure 11B:
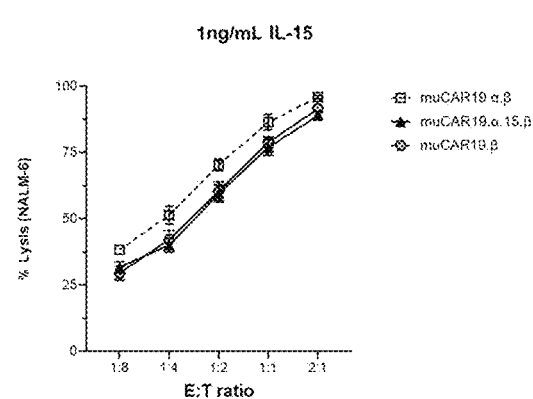

Example 9: Vδ1 T Cells Modified with Novel IL-15 Armoring Constructs Show Comparable or Enhanced Potency The cytotoxic activity of the novel β chain armored CAR-modified Vδ1 T cells was evaluated in an overnight killing assay in the presence and absence of exogenous IL-15. In the context of CD19 targeting CARs, when targeting CD19-expressing tumour targets (NALM-6), in the absence of IL-15 (FIG. 11A), the armored cells did not demonstrate any significant difference in terms of potency; however, in the presence of IL-15, there was a trend towards improved cytotoxic activity in the IL-15R α and β co-expressing cells (FIG. 11B).

Figure 11C:
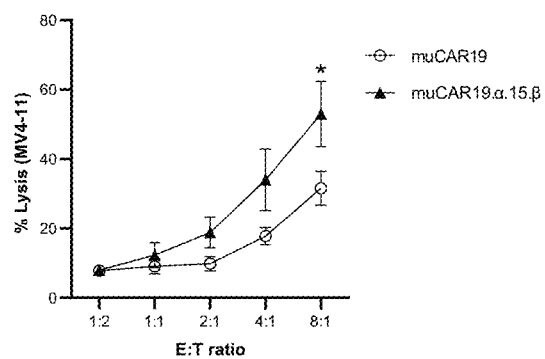
Figure 11C:
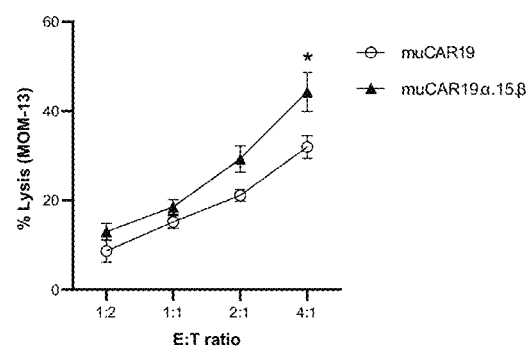

On the contrary, in the absence of exogenous IL-15, tethered IL-15 and IL-15R β co-expressing, anti-CD123 (FIG. 11D) or anti-Mesothelin targeting (FIG. 11E) CAR Vδ1 T cells demonstrated enhanced cytotoxicity, compared to the unarmoured cells. To further test if armouring had an impact on the potency of Vδ1 T cells in the absence of CAR engagement, the short-term cytotoxicity of unarmoured and armoured CD19 targeting CAR modified Vδ1 T cells were compared against CD19 negative (but Vδ1 T-cell sensitive) targets (MV4-11 or MOLM-13) (FIG. 11C). As expected, the cytolytic activity of tethered IL-15 and IL-15R β co-expressing cells were significantly improved.

Example 10: Tethered IL-15 and IL-15R β Chain Co-Expressing CAR-Modified Vδ1 T Cells Survive in the Absence of Exogenous IL-15

Figure 12A:
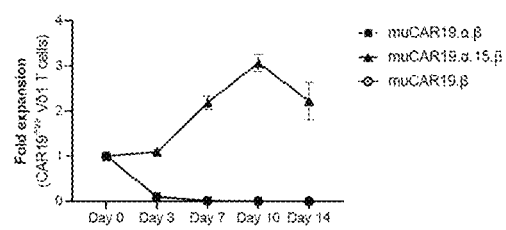
FIGS. 12A-12D are graphs showing in vitro survival of freshly thawed, armored CAR-modified Vδ1 T cell drug products in the absence of exogenous IL-15.
Figure 12B:
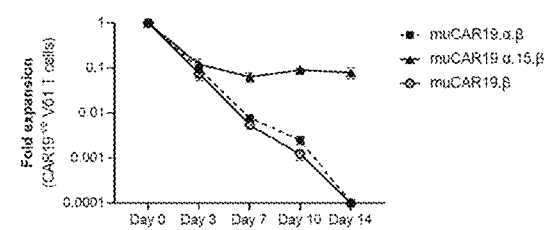
Figure 12C:
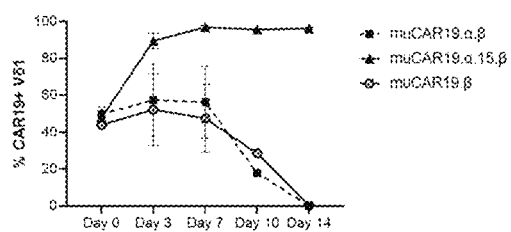
Figure 12D:
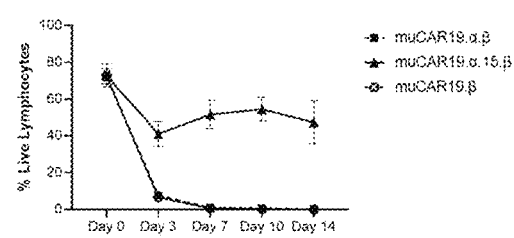

The next question addressed whether these novel armoring strategies could support the survival of the armored CAR-modified Vδ1 T cells. Freshly thawed drug products (n=2 donors) were plated at 2E+06 cell per mL in 96 well plate in the absence exogenous cytokine support. The total number of viable cells and percentage of CAR+Vδ1+ T cells were monitored at regular intervals for two weeks. FIGS. 12A and 12C show that only the tethered IL-15 and IL-15R β co-expressing cells survived and proliferated. IL-15R β alone and IL15R α and β co-expressing cells died rapidly in the absence of exogenous IL-15 support. This is reflected in the rapid decline of total number of CAR+Vδ1+ T cells and the percentage of viable lymphocytes during the assay (FIGS. 12A and 12D). FIG. 12C demonstrates the percentage of CAR+Vδ1+ T cells over the time. In this assay only the tethered IL-15 and IL-15R β chain co-expressing cells enriched. Flow cytometric analysis revealed that this was a consequence of the rapid loss of untransduced Vδ1 T cell population, as in the absence of exogenous IL-15 the untransduced cells were unable to survive (FIG. 12B). Interestingly, the tethered IL-15 and IL-15R β chain co-expressing cells seem to be able to support untransduced survival from day 3 until the end of the assay (FIG. 12B).

Figure 15A:
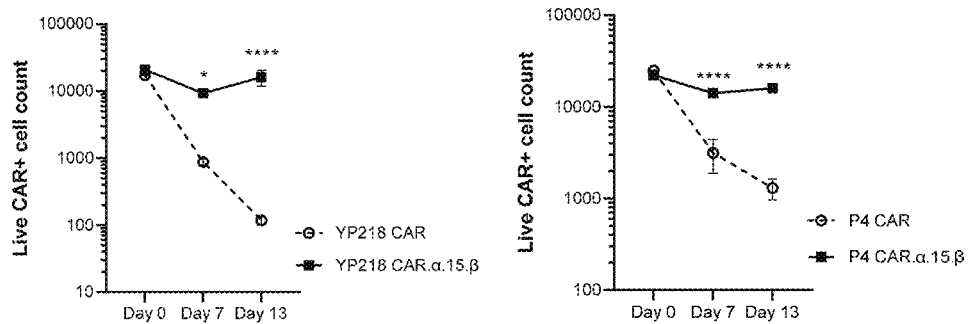
FIGS. 15A-15E are graphs evaluating the in vitro survival and effect of repeated antigen exposure on two different Mesothelin-targeting CAR(YP218 or P4)-modified Vδ1 T unarmoured, armoured with mbIL-15 and IL-15Rβ (CAR.α.15.β) or armoured with IL-15Rβ (CAR.β).

To demonstrate that the effect of armouring was independent of the CAR molecule of choice, the previous experiments were repeated with Mesothelin-targeting CAR modified armoured Vδ1 T cells (FIG. 15A) In fact, tethered IL-15 and IL-15R β co-expressing mesothelin-targeting CAR cells survived 14 days post-cryopreservation, whereas unarmoured cells rapidly declined. Importantly, the survival benefit of the armoured cells remained the same, regardless of the type of mesothelin targeting binder (YP218 or P4) used in the CAR construct (FIG. 15A). These results demonstrate that the functional attributes given by tethered IL-15 and IL-15R β chain co-expression are independent of the CAR and/or binders used.

Overall, the results demonstrate that, in the absence of exogenous IL-15, the co-expression of IL-15R α and β is necessary but not sufficient to support the survival of CAR modified Vδ1 T cells. To achieve long-lasting survival of the cells, IL-15 must be tethered to the IL-15R α chain.

Example 11: Tethered IL-15 and IL-15R β Chain Co-Expressing CAR-Modified Vδ1 T Cells Enrich Upon Repeated Antigen Stimulation in the Presence of Physiological Levels of IL-15

Next, it was assessed if IL-15R β chain transfer alone or in combination with IL-15R α chain was sufficient to drive the selective enrichment of CAR-modified Vδ1 T cells during repeated tumour challenge. Additionally, if physiological (pg/mL) IL-15 concentrations could support the growth of armored cells was also investigated. To this end, the repeated antigen stimulation assay was conducted in the presence of two IL-15 concentrations: supraphysiological (10 ng/mL) and physiological (70 pg/mL).

Figure 13A:
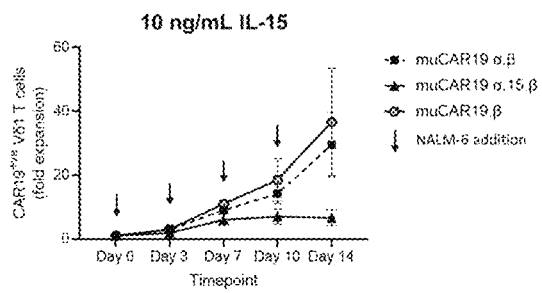
FIGS. 13A-13F are graphs evaluating the effect of repeated antigen exposure on armored CAR-modified Vδ1 T cell proliferation, enrichment, and target cell clearance.
Figure 13B:
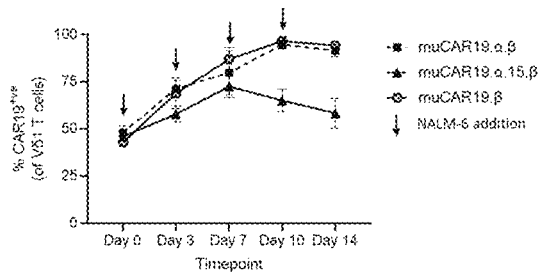
Figure 13C:
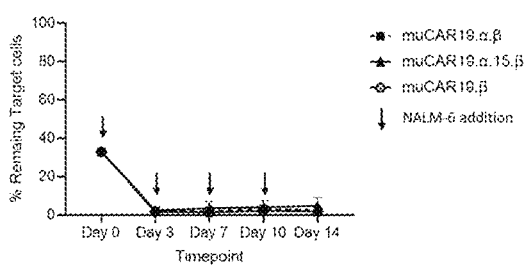

FIG. 13A-13C (panel left) show that at suprahysiological IL-15 concentrations, the armoring constructs were able to support the proliferation and enrichment of CAR-modified Vδ1 T cells, with IL-15Rα.β and IL15-R β being the most effective. In line with this, the armored CAR-modified cells were able to eliminate repeated challenges of NALM-6 cells over the duration of the assay (FIG. 11C).

Figure 11D:
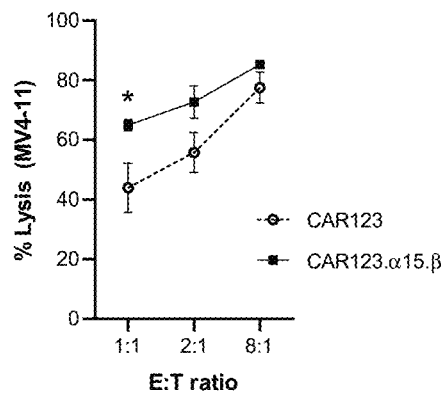
Figure 11E:
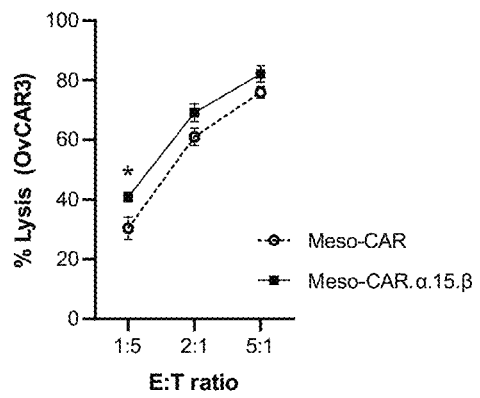
Figure 13D:
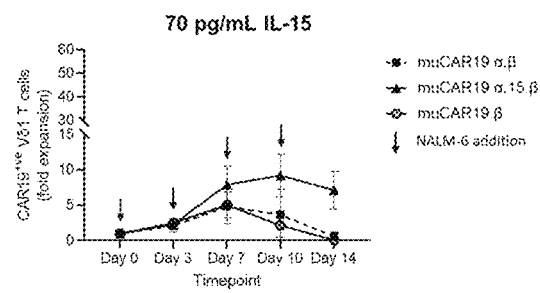
Figure 13E:
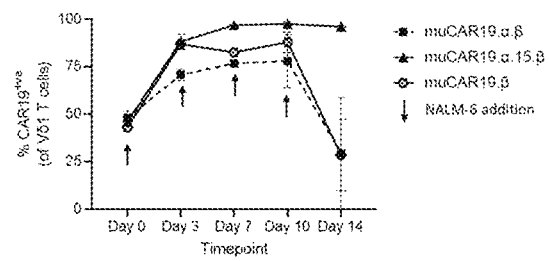
Figure 13F:
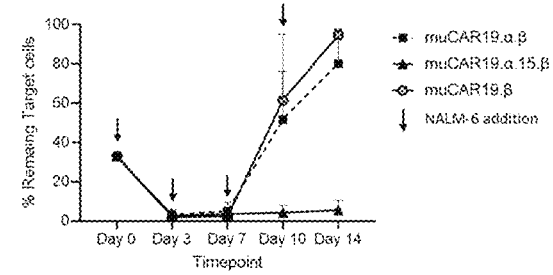

This was in striking contrast to the results using a physiological (pg/mL) IL-15 concentration (FIG. 13D-13F, panel right). In the presence of low IL-15 concentration, only the membrane-tethered IL-15 and IL-15R.β chain co-expressing cells were able to continuously proliferate and enrich (FIGS. 11D and 11E). Albeit, in the presence of physiological IL-15 concentration, these cells demonstrated an overall lower fold expansion than that observed in the presence of supraphysiological IL-15 concentration.

Following three rounds of tumour challenge, both R chain alone and α and β chain co-expressing armored Vδ1 T cell numbers rapidly declined. This coincided with the loss of tumour control and the outgrowth of NALM-6 target cells. Surprisingly, this was not the case with membrane bound IL-15 and IL-15R β chain co-expressing cells that maintained the ability to clear repeated challenges of NALM-6 cells.

Figure 15B:
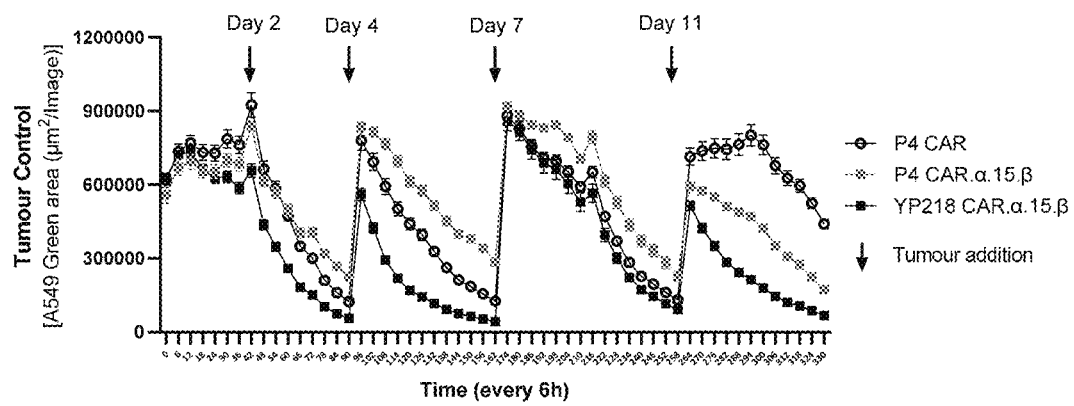
Figure 15C:
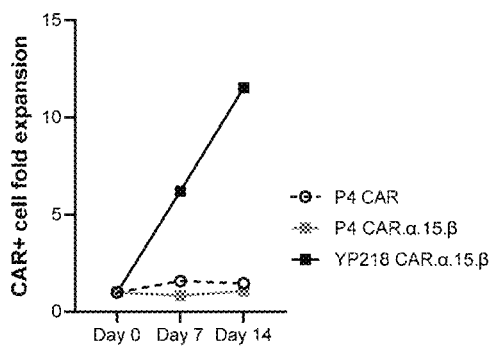
Figure 15D:
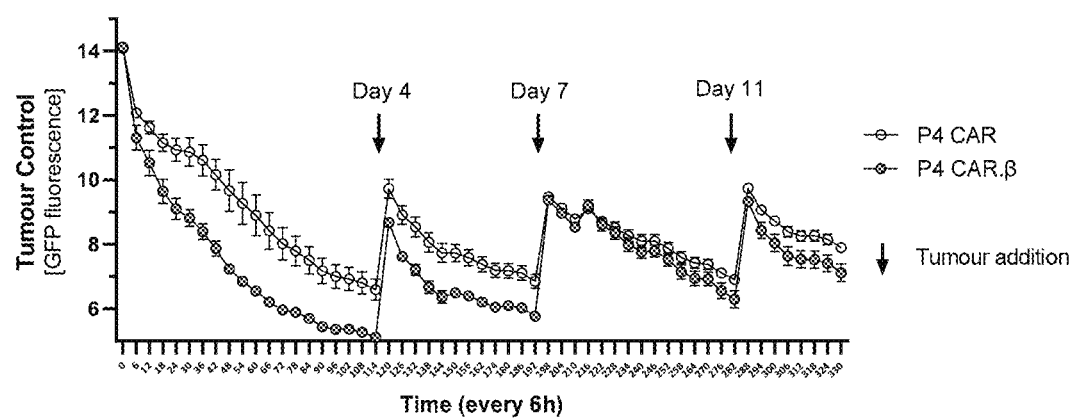
Figure 15E:
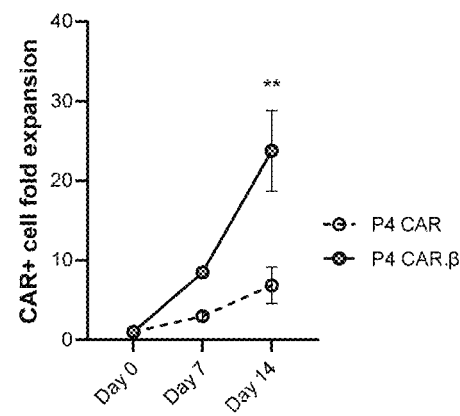

To demonstrate that the effect of armouring was independent of the CAR molecule of choice, the above experiments were repeated with anti-Mesothelin CAR expressing unarmoured and tethered IL-15 and IL-15R β chain armoured Vδ1 T cells (FIG. 15B-15E). FIG. 15B demonstrates that, in the absence of exogenous IL-15, tethered IL-15 and IL-15R β chain armoured Meso-CAR T cells were able to control repeated challenges of mesothelin expressing A549 cells. Importantly, the above findings were not influenced by the choice of mesothelin binder (YP218 or P4). In addition, the enhanced tumour control exhibited by the tethered IL-15 and IL-15R β chain armoured CAR T cells did not correlate with the proliferation of the cells. Instead, proliferation potential seemed to be driven by the CAR molecule itself and was specific to the binder used. Proliferation was observed when YP218 binder was used but not with P4 binder (FIG. 15C). IL-15R β chain armoured P4 CAR T cells were also able to provide superior tumour control over the course of repeated tumour challenges in the presence of low levels of IL-15 (1 ng/mL) (FIG. 15D). The enhanced functionality significantly correlated with increased sensitivity to exogenous IL-15 and increased proliferation over the course of repeated tumour challenges (FIG. 15E).

These results clearly demonstrate that, at physiological IL-15 concentration, the membrane-bound IL-15 and IL-15R β chain expressing cells can proliferate, survive, and demonstrate productive tumour control.

Example 12: NALM-6 In Vivo Efficacy Study Using NSG and NOG-IL15 Mice

Figure 14A:
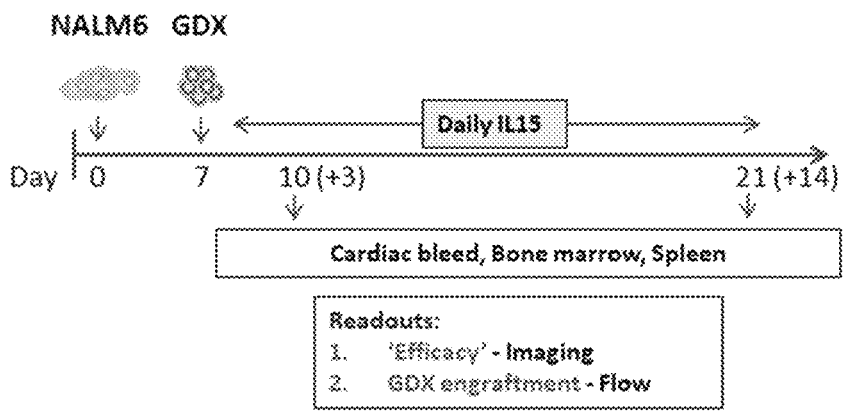
FIGS. 14A-14M are a schematic diagram and results evaluating the in vivo performance of armored CAR-modified Vδ1 T cell in NSG and NOG-IL15 mice challenged with NALM6 tumour cells.
Figure 14B:
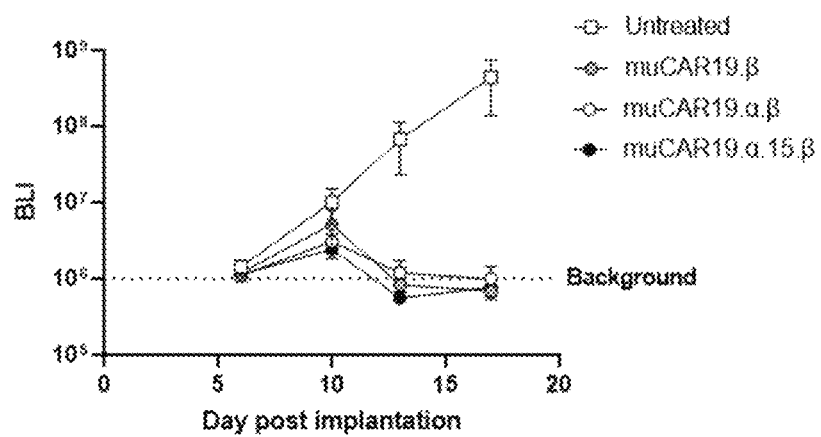
Figure 14C:
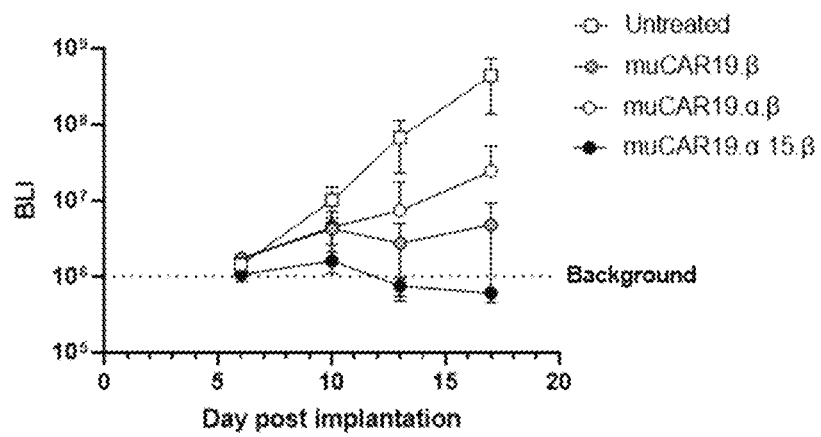
Figure 14D:
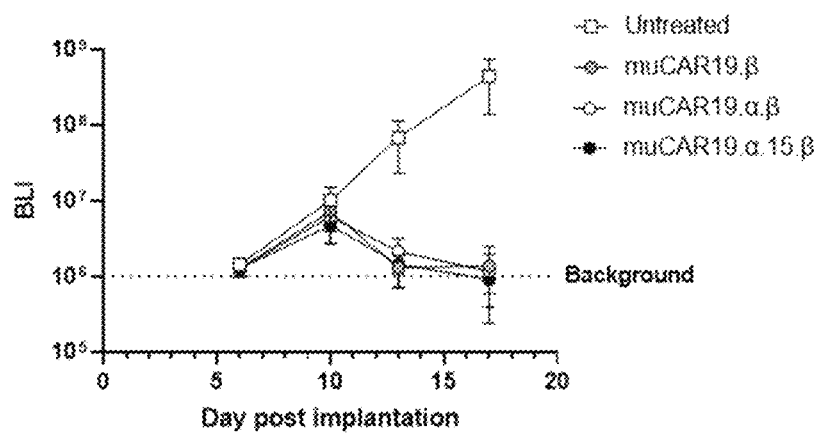

To confirm the in vitro findings, the in vivo efficacy of the drug products was assessed in a NALM6-FLuc systemic tumour model, where tumour burden was tracked via non-invasive bioluminescence imaging (BLI) twice per week (FIG. 14A). Each drug product was assessed under three conditions: NSG mice dosed daily with 1 µg IL-15 (FIG. 14B), NSG mice with no exogenous IL-15 (FIG. 14C), or NOG IL-15 transgenic mice (Taconic, hIL-15 NOG (model #13683), FIG. 14D). In the presence of exogenous IL-15, all three constructs provided equivalent tumour control, with all groups demonstrating BLI equivalent to background by 6 days post-dosing (study day 13) (FIG. 14B). In the transgenic NOG mouse, where IL-15 concentrations in peripheral blood are close to human physiological levels (~50 pg/mL), all groups again demonstrated equivalent tumour control (FIG. 14D). However, in the absence of exogenous IL-15, while all constructs were able to control tumour growth to some extent, only the muCAR19.α.15.β armoured construct was able to reduce tumour burden below detectable levels by 10 post dosing (study day 17) (FIG. 14C).

Figure 14E:
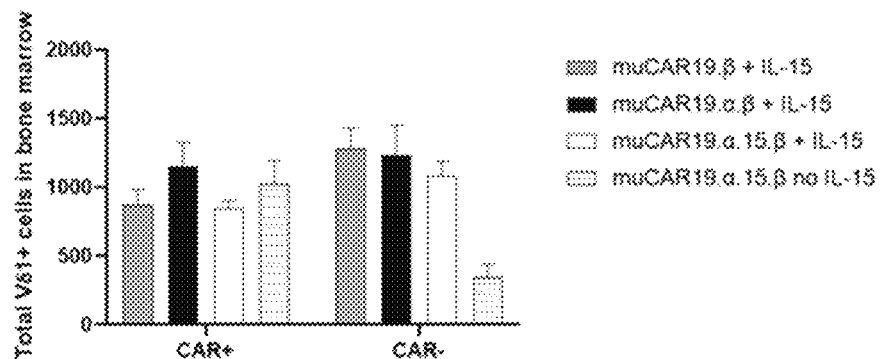
Figure 14F:
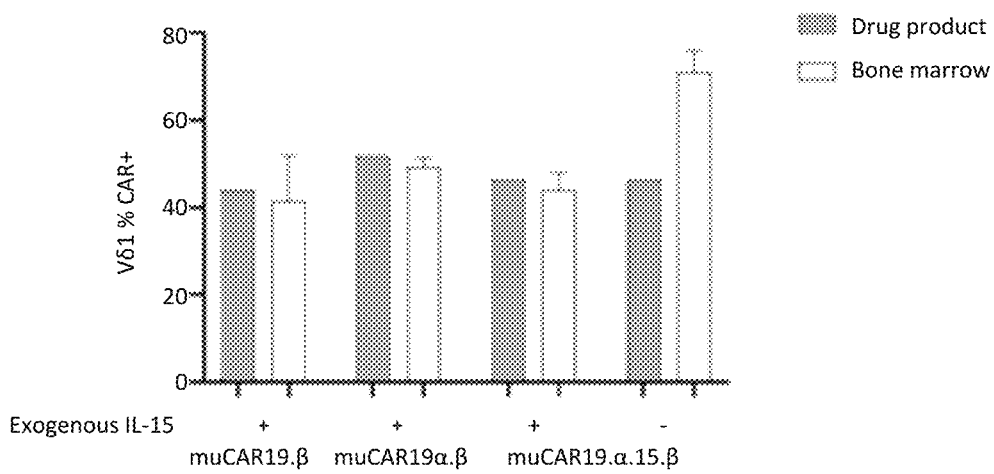
Figure 14G:
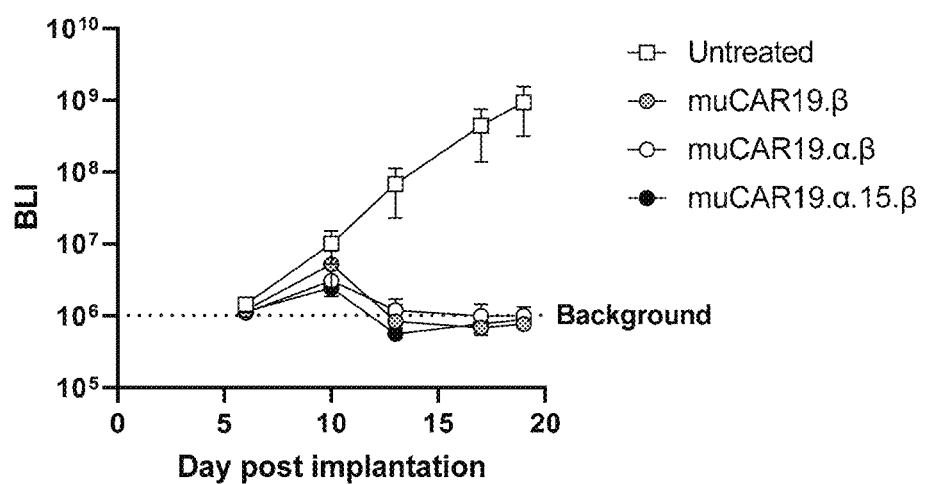
Figure 14H:
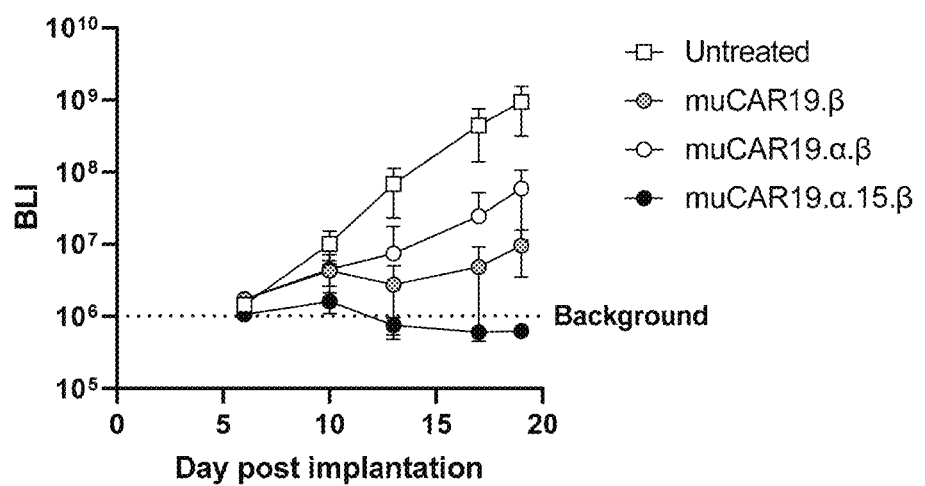
Figure 14I:
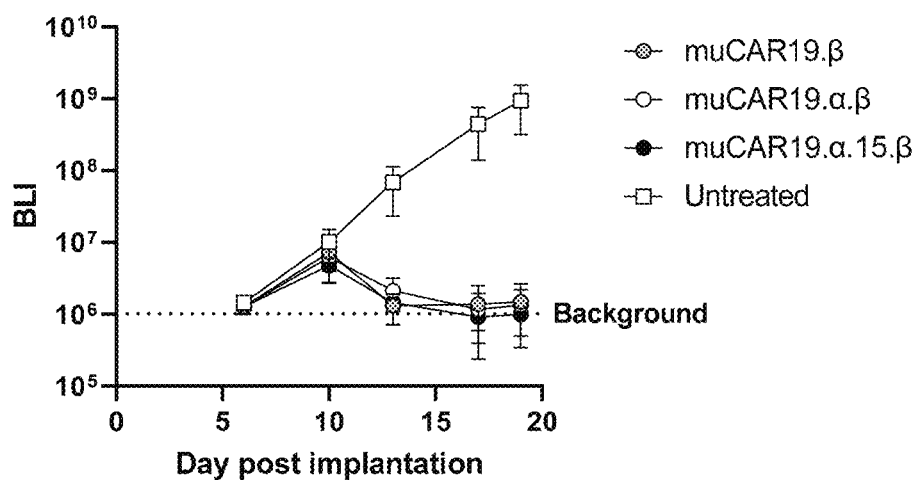
Figure 14J:
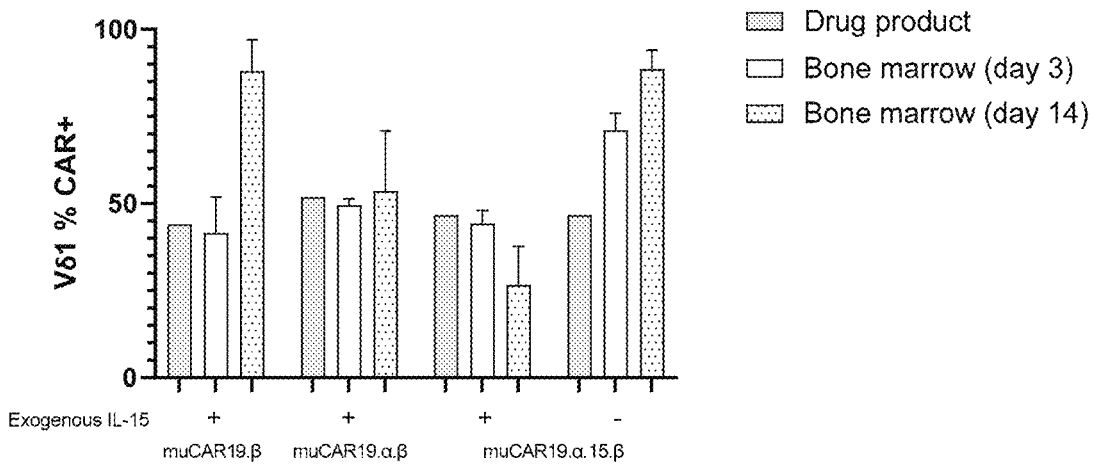
Figure 14K:
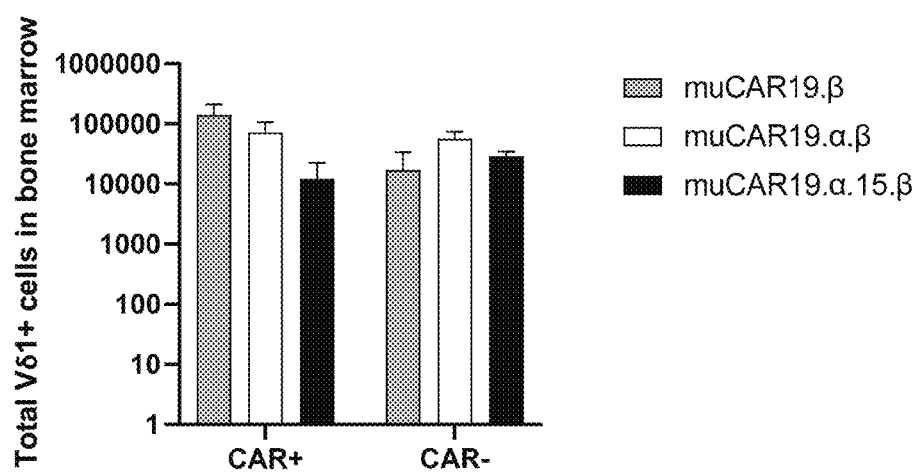
Figure 14L:
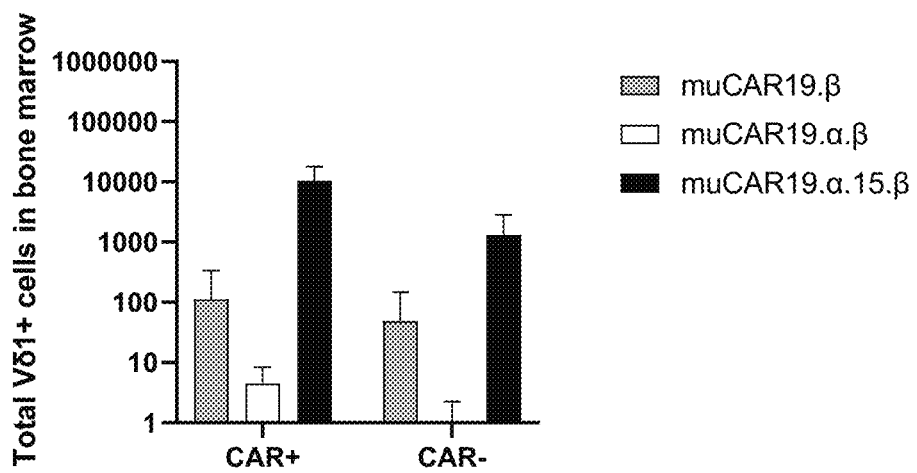
Figure 14M:
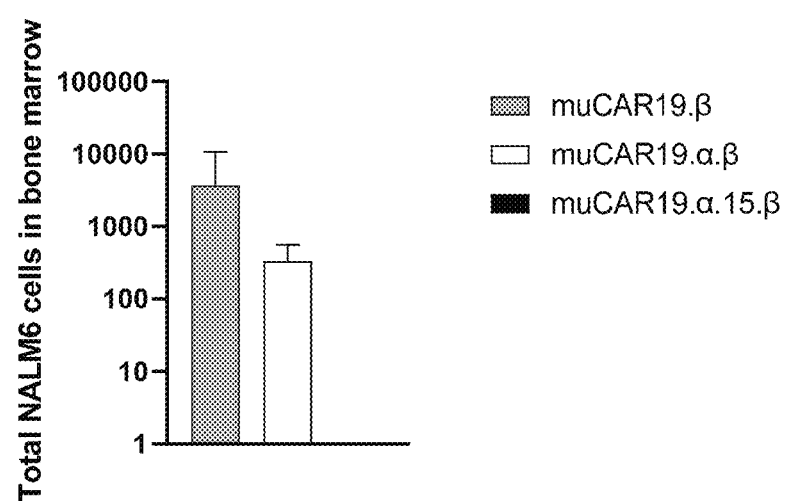

Satellite mice were also culled 3 days post-dosing (study day 10) to assess the relative numbers of Vδ1+ and CAR+ cells. In the presence of exogenous IL-15, all constructs were comparable, both in terms of total cell numbers (FIG. 14E) and the percentage of CAR expressing cells as compared to drug product prior to injection (FIG. 14F). In the absence of exogenous IL-15, muCAR19.α.15.β dosed mice had equivalent numbers of Vδ1+, CAR+ cells, but with a loss of CAR– untransduced cells, observed as a loss of absolute numbers of CAR-cells, and an increase in Vδ1+ CAR %, demonstrating a survival advantage in the armoured compartment. This survival advantage in the absence of IL-15 was further enhanced by study end, 13/14 days post dosing (FIG. 14J), with the muCAR19.α.15.β dosed mice demonstrating in excess of 100-fold increased survival of CAR+Vδ1 T cells compared to the muCAR19.α.β and muCAR19.β dosed mice (FIG. 14L). This increased survival was also associated with a complete absence of detectable residual NALM-6 tumour cells in the bone marrow of muCAR19.α.15.β dosed mice, whereas muCAR19.α.β and muCAR19.β had a mean of hundreds, or thousands of residual NALM6 cells (respectively) in the bone marrow harvested from the rear femurs (FIG. 14M). In the presence of exogenous IL-15, all 3 treatment groups showed an increase in both CAR+ and CAR– Vδ1 T cells from day 3 post-dosing (FIG. 14K vs FIG. 14E). The greatest proportion of CAR+ cells at study end was observed in the muCAR19.β dosed mice (FIG. 14J), with other groups showing unchanged (muCAR19.α.β) or decreased (muCAR19.α.15. β) relative CAR proportion. The trends observed in control of NALM6 tumours based on whole body imaging data was unchanged by the acquisition of an additional timepoint (10 vs 12 days post dosing): NSG mice dosed daily with 1 μg IL-15 (FIG. 14B vs FIG. 14G), NSG mice with no exogenous IL-15 (FIG. 14C vs FIG. 14H), or NOG IL-15 transgenic mice (Taconic, hIL-15 NOG (model #13683), FIG. 14D vs FIG. 14I).

Overall these results demonstrate that all constructs are potent and able to control disease in the NALM6 model in the presence of exogenous or transgenically-expressed IL-15, but in its absence, the muCAR19.α.15.β is uniquely able to reduce residual tumour below detectable levels.

Example 13: A549-MSLN In Vivo Efficacy Study Using NSG Mice

Figure 16A:
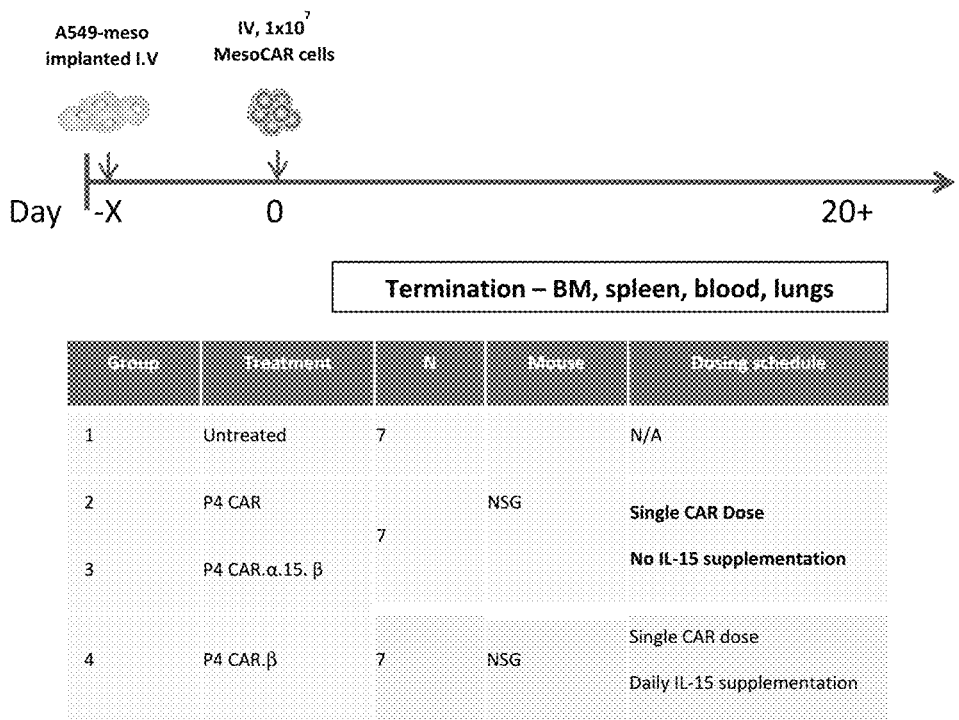
FIGS. 16A and 16B are a schematic diagram and results evaluating the in vivo performance of unarmoured, mbIL-15 and IL-15R β armoured, and IL-15R β armoured MesoCAR-modified Vδ1 T cells (P4 CAR, P4 CAR.α.15.β and P4 CAR.β respectively) in a disseminated A549 tumour model. A549 cell lines are engineered to express mesothelin (A549-Meso).
Figure 16B:
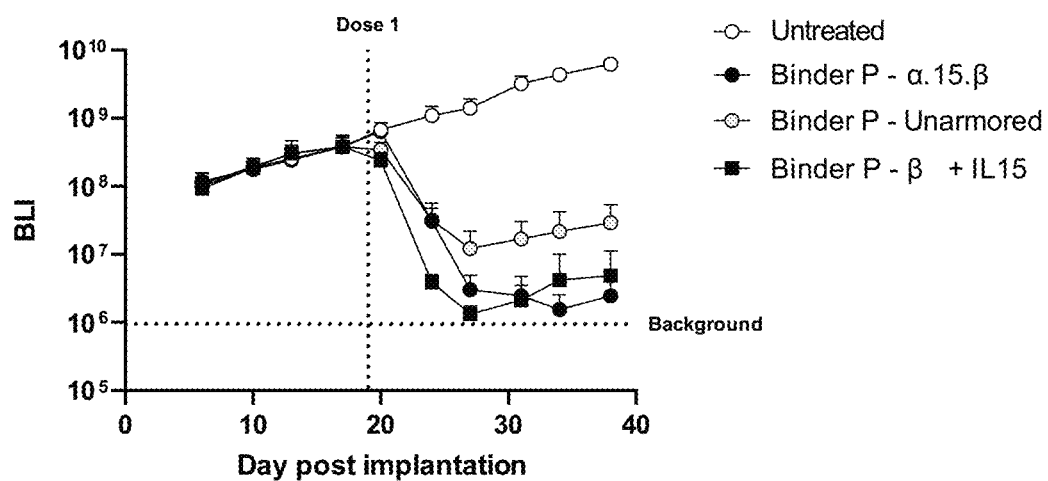

To confirm the in vitro findings gained with armoured mesothelin-targeting CAR Vδ1 T cells, the in vivo efficacy of the drug products was assessed in a disseminated A549-Meso-FLuc tumour model. NSG mice aged 6-8 weeks were implanted with $1\times10^6$ A549-MSLN-fluc-GFP cells via intravenous (IV) injection. On day 19 post-implantation, mice were injected with vehicle (n=7, Cryostor CS5, group 1), P4 unarmored γδ CAR T cells at 10 million total cells per mouse (n=7, group 2), P4 α.15.β γδ CAR T cells at 10 million total cells per mouse (n=7, group 3) or P4 β γδ CAR T cells at 10 million total cells per mouse (n=7, group 4). Tumour burden was tracked via non-invasive bioluminescence imaging (BLI) twice per week (FIG. 16A). FIG. 16B shows that, in the absence of exogenous IL-15, α.15.β armored Vδ1 P4 CAR T cells demonstrated greater tumor control than unarmored Vδ1 P4 CAR T cells, with P4 α.15.β treated mice having greater than 10-fold lower BLI signal on average than mice dosed with unarmored cells at study end (day 19 post-dosing). In line with the in vitro experiments, in the presence of IL-15, β armored γδ CAR T cells demonstrate an initial faster tumour elimination kinetics, but overall comparable tumour control to the α.15.β armored (non IL-15 supported) γδ CAR T treated arm.

OTHER EMBODIMENTS

All publications, patents, and patent applications mentioned in this specification are herein incorporated by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. An engineered γδ T cell comprising a transgene encoding an armoring protein comprising the amino acid sequence set forth in SEQ ID NO: 1.

2. The engineered γδ T cell of claim 1, further expressing a chimeric antigen receptor (CAR).

3. The engineered γδ T cell of claim 2, wherein the CAR lacks an intracellular signaling domain.

4. The engineered γδ T cell of claim 1, wherein the engineered γδ T cell:
   (i) lacks an endogenous gene encoding IL-15 ligand;
   (ii) expresses a membrane-bound IL-15 ligand or variant thereof; or
   (iii) any combination thereof.

5. An isolated population of engineered γδ T cells, wherein at least 10% of the population of engineered γδ T cells comprise a transgene encoding an armoring protein comprising the amino acid sequence set forth in SEQ ID NO: 1.

6. A method of producing a population of engineered γδ T cells comprising a transgene encoding an armoring protein comprising the amino acid sequence set forth in SEQ ID NO: 1, comprising:
   (a) providing a population of γδ T cells; and
   (b) engineering the population of γδ T cells with a transgene encoding the armoring protein, thereby producing the population of engineered γδ T cells expressing the armoring protein.

7. A method expanding engineered γδ T cells comprising:
   (a) providing a population of γδ T cells comprising the engineered γδ T cell of claim 1; and
   (b) culturing the population of engineered γδ T cells in the presence of exogenous IL-2 and/or IL-15 ligand or a variant thereof.

8. The engineered γδ T cell of claim 1, wherein the armoring protein acts as receptor for native IL-15 ligand.

9. The engineered γδ T cell of claim 8, wherein the native IL-15 ligand comprises the amino acid sequence set forth in SEQ ID NO: 2.

10. The engineered γδ T cell of claim 1, wherein the γδ T cell is a Vδ1+γδ T cell.

11. The engineered γδ T cell of claim 1, wherein the γδ T cell is a blood-derived Vδ1+γδ T cell.

12. The engineered γδ T cell of claim 1, wherein the engineered γδ T cell provides increased sensitivity to native IL-15 ligand compared to a γδ T cell that does not comprise a transgene expressing an armoring protein comprising the amino acid sequence set forth in SEQ ID NO: 1.

13. The engineered γδ T cell of claim 1, wherein the engineered γδ T cell lacks an endogenous gene encoding IL-15 ligand.

14. The engineered γδ T cell of claim 1, wherein the engineered γδ T cell expresses a secreted IL-15 ligand or variant thereof.

15. The engineered γδ T cell of claim 1, wherein the engineered γδ T cell expresses a membrane-bound IL-15Rβ.

16. The engineered γδ T cell of claim 1, wherein the engineered γδ T cell lacks an endogenous gene encoding TL-15 ligand and wherein the engineered γδ T cell expresses a recombinant IL-15 ligand or a variant thereof.

17. The engineered γδ T cell of claim 1, wherein the engineered γδ T cell lacks an endogenous gene encoding IL-15 ligand and wherein the engineered γδ T cell expresses a secreted IL-15 ligand or variant thereof.

18. The method of claim 6, wherein the armoring protein acts as receptor for native IL-15 ligand.

19. The method of claim 18, wherein the native IL-15 ligand comprises the amino acid sequence set forth in SEQ ID NO: 2.

20. The method of claim 6, wherein the γδ T cell is a Vδ1+γδ T cell.

21. The method of claim 6, wherein the γδ T cell is a blood-derived Vδ1+γδ T cell.

22. The method of claim 6, wherein the engineered γδ T cell provides increased sensitivity to native IL-15 ligand compared to a γδ T cell that does not comprise a transgene expressing an armoring protein comprising the amino acid sequence set forth in SEQ ID NO: 1.

23. The method of claim 6, wherein the engineered γδ T cell lacks an endogenous gene encoding IL-15 ligand.

24. The method of claim 6, wherein the engineered γδ T cell expresses a secreted IL-15 ligand or variant thereof.

25. The method of claim 9, wherein the engineered γδ T cell expresses a recombinant IL-15 ligand or a variant thereof.

26. The method of claim 6, wherein the engineered γδ T cell lacks an endogenous gene encoding IL-15 ligand and wherein the engineered γδ T cell expresses a recombinant IL-15 ligand or a variant thereof.

27. The method of claim 6, wherein the engineered γδ T cell lacks an endogenous gene encoding IL-15 ligand and wherein the engineered γδ T cell expresses a secreted IL-15 ligand or variant thereof.

28. The isolated population of engineered γδ T cells of claim 5, wherein the armoring protein acts as receptor for native IL-15 ligand.

29. The isolated population of engineered γδ T cells of claim 28, wherein the native IL-15 ligand comprises the amino acid sequence set forth in SEQ ID NO: 2.

30. The isolated population of engineered γδ T cells of claim 5, wherein the γδ T cell is a blood-derived Vδ1+γδ T cell.

* * * * *

SEQUENCE LISTING

```
Sequence total quantity: 35
SEQ ID NO: 1             moltype = AA  length = 525
FEATURE                  Location/Qualifiers
source                   1..525
                         mol_type = protein
                         note = IL-2R(beta) construct
                         organism = synthetic construct
SEQUENCE: 1
AVNGTSQFTC FYNSRANISC VWSQDGALQD TSCQVHAWPD RRRWNQTCEL LPVSQASWAC   60
NLILGAPDSQ KLTTVDIVTL RVLCREGVRW RVMAIQDFKP FENLRLMAPI SLQVVHVETH  120
RCNISWEISQ ASHYFERHLE FEARTLSPGH TWEEAPLLTL KQKQEWICLE TLTPDTQYEF  180
QVRVKPLQGE FTTVSPWSQP LAFRTKPAAL GKDTIPWLGH LLVGLSGAFG FIILVYLLIN  240
CRNTGPWLKK VLKCNTPDPS KFFSQLSSEH GGDVQKWLSS PFPSSSFSPG GLAPEISPLE  300
VLERDKVTQL LLQQDKVPEP ASLSSNHSLT SCFTNQGYFF FHLPDALEIE ACQVYFTYDP  360
YSEEDPDEGV AGAPTGSSPQ PLQPLSGEDD AYCTFPSRDD LLLFSPSLLG GPSPPSTAPG  420
GSGAGEERMP PSLQERVPRD WDPQPLGPPT PGVPDLVDFQ PPPELVLREA GEEVPDAGPR  480
EGVSFPWSRP PGQGEFRALN ARLPLNTDAY LSLQELQGQD PTHLV                 525

SEQ ID NO: 2             moltype = AA  length = 114
FEATURE                  Location/Qualifiers
source                   1..114
                         mol_type = protein
                         note = IL-15
                         organism = synthetic construct
SEQUENCE: 2
NWVNVISDLK KIEDLIQSMH IDATLYTESD VHPSCKVTAM KCFLLELQVI SLESGDASIH   60
```

```
DTVENLIILA NNSLSSNGNV TESGCKECEE LEEKNIKEFL QSFVHIVQMF INTS            114

SEQ ID NO: 3              moltype = AA   length = 237
FEATURE                   Location/Qualifiers
source                    1..237
                          mol_type = protein
                          note = IL-15R(alpha)
                          organism = synthetic construct
SEQUENCE: 3
ITCPPPMSVE HADIWVKSYS LYSRERYICN SGFKRKAGTS SLTECVLNKA TNVAHWTTPS       60
LKCIRDPALV HQRPAPPSTV TTAGVTPQPE SLSPSGKEPA ASSPSSNNTA ATTAAIVPGS      120
QLMPSKSPST GTTEISSHES SHGTPSQTTA KNWELTASAS HQPPGVYPQG HSDTTVAIST      180
STVLLCGLSA VSLLACYLKS RQTPPLASVE MEAMEALPVT WGTSSRDEDL ENCSHHL         237

SEQ ID NO: 4              moltype = AA   length = 22
FEATURE                   Location/Qualifiers
source                    1..22
                          mol_type = protein
                          note = P2A Linker
                          organism = synthetic construct
SEQUENCE: 4
GSGATNFSLL KQAGDVEENP GP                                               22

SEQ ID NO: 5              moltype = AA   length = 21
FEATURE                   Location/Qualifiers
source                    1..21
                          mol_type = protein
                          note = T2A Linker
                          organism = synthetic construct
SEQUENCE: 5
GSGEGRGSLL TCGDVEENPG P                                                21

SEQ ID NO: 6              moltype = AA   length = 5
FEATURE                   Location/Qualifiers
source                    1..5
                          mol_type = protein
                          note = Gly-Ser Linker
                          organism = synthetic construct
SEQUENCE: 6
GGGGS                                                                   5

SEQ ID NO: 7              moltype = AA   length = 10
FEATURE                   Location/Qualifiers
source                    1..10
                          mol_type = protein
                          note = Gly-Ser Linker
                          organism = synthetic construct
SEQUENCE: 7
GGGGSGGGGS                                                             10

SEQ ID NO: 8              moltype = AA   length = 15
FEATURE                   Location/Qualifiers
source                    1..15
                          mol_type = protein
                          note = Gly-Ser Linker
                          organism = synthetic construct
SEQUENCE: 8
GGGGSGGGGS GGGGS                                                       15

SEQ ID NO: 9              moltype = AA   length = 20
FEATURE                   Location/Qualifiers
source                    1..20
                          mol_type = protein
                          note = Gly-Ser Linker
                          organism = synthetic construct
SEQUENCE: 9
GGGGSGGGGS GGGGSGGGGS                                                  20

SEQ ID NO: 10             moltype = AA   length = 24
FEATURE                   Location/Qualifiers
source                    1..24
                          mol_type = protein
                          note = Gly-Ser Linker
                          organism = synthetic construct
SEQUENCE: 10
GGGGSGGGGS GGGGSGGGGS GGGS                                             24

SEQ ID NO: 11             moltype = AA   length = 19
FEATURE                   Location/Qualifiers
```

```
source                   1..19
                         mol_type = protein
                         note = Gly-Ser Linker
                         organism = synthetic construct
SEQUENCE: 11
GGGGSGGGGS GGGGSGGGS                                                19

SEQ ID NO: 12            moltype = AA   length = 14
FEATURE                  Location/Qualifiers
source                   1..14
                         mol_type = protein
                         note = Gly-Ser Linker
                         organism = synthetic construct
SEQUENCE: 12
GGGGSGGGGS GGGS                                                     14

SEQ ID NO: 13            moltype = AA   length = 9
FEATURE                  Location/Qualifiers
source                   1..9
                         mol_type = protein
                         note = Gly-Ser Linker
                         organism = synthetic construct
SEQUENCE: 13
GGGGSGGGS                                                           9

SEQ ID NO: 14            moltype = AA   length = 10
FEATURE                  Location/Qualifiers
source                   1..10
                         mol_type = protein
                         note = Anti-Meso. HC-CDR1
                         organism = synthetic construct
SEQUENCE: 14
GDSVSSNSAT                                                          10

SEQ ID NO: 15            moltype = AA   length = 9
FEATURE                  Location/Qualifiers
source                   1..9
                         mol_type = protein
                         note = Anti-Meso. HC-CDR2
                         organism = synthetic construct
SEQUENCE: 15
TYYRSKWYN                                                           9

SEQ ID NO: 16            moltype = AA   length = 13
FEATURE                  Location/Qualifiers
source                   1..13
                         mol_type = protein
                         note = Anti-Meso. HC-CDR3
                         organism = synthetic construct
SEQUENCE: 16
ARGMMTYYYG MDV                                                      13

SEQ ID NO: 17            moltype = AA   length = 9
FEATURE                  Location/Qualifiers
source                   1..9
                         mol_type = protein
                         note = Anti-Meso. LC-CDR1
                         organism = synthetic construct
SEQUENCE: 17
SGINVGPYR                                                           9

SEQ ID NO: 18            moltype = AA   length = 7
FEATURE                  Location/Qualifiers
source                   1..7
                         mol_type = protein
                         note = Anti-Meso. LC-CDR2
                         organism = synthetic construct
SEQUENCE: 18
YKSDSDK                                                             7

SEQ ID NO: 19            moltype = AA   length = 9
FEATURE                  Location/Qualifiers
source                   1..9
                         mol_type = protein
                         note = Anti-Meso. LC-CDR3
                         organism = synthetic construct
SEQUENCE: 19
MIWHSSAAV                                                           9
```

```
SEQ ID NO: 20            moltype = AA  length = 128
FEATURE                  Location/Qualifiers
source                   1..128
                         mol_type = protein
                         note = Anti-Meso. VH
                         organism = synthetic construct
SEQUENCE: 20
QVQLQQSGPG LVTPSQTLSL TCAISGDSVS SNSATWNWIR QSPSRGLEWL GRTYYRSKWY    60
NDYAVSVKSR MSINPDTSKN QFSLQLNSVT PEDTAVYYCA RGMMTYYYGM DVWGQGTTVT   120
VSSGILGS                                                           128

SEQ ID NO: 21            moltype = AA  length = 116
FEATURE                  Location/Qualifiers
source                   1..116
                         mol_type = protein
                         note = Anti-Meso. VL
                         organism = synthetic construct
SEQUENCE: 21
QPVLTQSSSL SASPGASASL TCTLRSGINV GPYRIYWYQQ KPGSPPQYLL NYKSDSDKQQ    60
GSGVPSRFSG SKDASANAGV LLISGLRSED EADYYCMIWH SSAAVFGGGT QLTVLS      116

SEQ ID NO: 22            moltype = AA  length = 6
FEATURE                  Location/Qualifiers
source                   1..6
                         mol_type = protein
                         note = Anti-Meso. HC-CDR1
                         organism = synthetic construct
SEQUENCE: 22
FYFYAC                                                               6

SEQ ID NO: 23            moltype = AA  length = 18
FEATURE                  Location/Qualifiers
source                   1..18
                         mol_type = protein
                         note = Anti-Meso. HC-CDR2
                         organism = synthetic construct
SEQUENCE: 23
CIYTAGSGST YYASWAKG                                                 18

SEQ ID NO: 24            moltype = AA  length = 13
FEATURE                  Location/Qualifiers
source                   1..13
                         mol_type = protein
                         note = Anti-Meso. HC-CDR3
                         organism = synthetic construct
SEQUENCE: 24
TANTRSTYYL NLW                                                      13

SEQ ID NO: 25            moltype = AA  length = 10
FEATURE                  Location/Qualifiers
source                   1..10
                         mol_type = protein
                         note = Anti-Meso. LC-CDR1
                         organism = synthetic construct
SEQUENCE: 25
ASQRISSYLS                                                          10

SEQ ID NO: 26            moltype = AA  length = 7
FEATURE                  Location/Qualifiers
source                   1..7
                         mol_type = protein
                         note = Anti-Meso. LC-CDR2
                         organism = synthetic construct
SEQUENCE: 26
GASTLAS                                                              7

SEQ ID NO: 27            moltype = AA  length = 13
FEATURE                  Location/Qualifiers
source                   1..13
                         mol_type = protein
                         note = Anti-Meso. LC-CDR3
                         organism = synthetic construct
SEQUENCE: 27
SYAYFDSNNW HAF                                                      13

SEQ ID NO: 28            moltype = AA  length = 123
FEATURE                  Location/Qualifiers
source                   1..123
                         mol_type = protein
```

```
                              note         = Anti-Meso. VH
                              organism     = synthetic construct
SEQUENCE: 28
MEVQLVESGG GLVQPGGSLR LSCAASGFDL GFYFYACWVR QAPGKGLEWV SCIYTAGSGS    60
TYYASWAKGR FTISRDNSKN TLYLQMNSLR AEDTAVYYCA RSTANTRSTY YLNLWGQGTL   120
VTV                                                                 123

SEQ ID NO: 29                 moltype = AA   length = 110
FEATURE                       Location/Qualifiers
source                        1..110
                              mol_type     = protein
                              note         = Anti-Meso. VL
                              organism     = synthetic construct
SEQUENCE: 29
DIQMTQSPSS LSASVGDRVT ITCQASQRIS SYLSWYQQKP GKVPKLLIYG ASTLASGVPS    60
RFSGSGSGTD FTLTISSLQP EDVATYYCQS YAYFDSNNWH AFGGGTKVEI              110

SEQ ID NO: 30                 moltype = AA   length = 39
FEATURE                       Location/Qualifiers
source                        1..39
                              mol_type     = protein
                              note         = Hinge Region (CD28)
                              organism     = synthetic construct
SEQUENCE: 30
IEVMYPPPYL DNEKSNGTII HVKGKHLCPS PLFPGPSKP                            39

SEQ ID NO: 31                 moltype = AA   length = 27
FEATURE                       Location/Qualifiers
source                        1..27
                              mol_type     = protein
                              note         = TM Domain (CD28)
                              organism     = synthetic construct
SEQUENCE: 31
FWVLVVVGGV LACYSLLVTV AFIIFWV                                         27

SEQ ID NO: 32                 moltype = AA   length = 40
FEATURE                       Location/Qualifiers
source                        1..40
                              mol_type     = protein
                              note         = Hinge Region (CD8)
                              organism     = synthetic construct
SEQUENCE: 32
TTTPAPRPPT PAPTIASQPL SLRPEACRPA AGGAVHTRGL                           40

SEQ ID NO: 33                 moltype = AA   length = 29
FEATURE                       Location/Qualifiers
source                        1..29
                              mol_type     = protein
                              note         = TM Domain (CD8)
                              organism     = synthetic construct
SEQUENCE: 33
DFACDIYIWA PLAGTCGVLL LSLVITLYC                                       29

SEQ ID NO: 34                 moltype = AA   length = 42
FEATURE                       Location/Qualifiers
source                        1..42
                              mol_type     = protein
                              note         = Costim. Region (4-1BB)
                              organism     = synthetic construct
SEQUENCE: 34
KRGRKKLLYI FKQPFMRPVQ TTQEEDGCSC RFPEEEEGGC EL                        42

SEQ ID NO: 35                 moltype = AA   length = 112
FEATURE                       Location/Qualifiers
source                        1..112
                              mol_type     = protein
                              note         = Intra-cellular signaling domain (CD3z)
                              organism     = synthetic construct
SEQUENCE: 35
RVKFSRSADA PAYQQGQNQL YNELNLGRRE EYDVLDKRRG RDPEMGGKPR RKNPQEGLYN    60
ELQKDKMAEA YSEIGMKGER RRGKGHDGLY QGLSTATKDT YDALHMQALP PR            112
```